US012449217B2

(12) United States Patent
Bombaugh, Jr. et al.

(10) Patent No.: US 12,449,217 B2
(45) Date of Patent: Oct. 21, 2025

(54) SYSTEMS AND METHODS TO MAKE SAFE A FIREARM

(71) Applicant: Bombach Solutions LLC, Tampa, FL (US)

(72) Inventors: Keith D. Bombaugh, Jr., Tampa, FL (US); Benjamin R. Pauza, Champaign, IL (US)

(73) Assignee: Bombach Solutions LLC, Dunedin, FL (US)

( * ) Notice: Subject to any disclaimer, the term of this patent is extended or adjusted under 35 U.S.C. 154(b) by 0 days.

(21) Appl. No.: 18/585,795

(22) Filed: Feb. 23, 2024

(65) Prior Publication Data

US 2024/0295373 A1   Sep. 5, 2024

Related U.S. Application Data

(60) Provisional application No. 63/458,814, filed on Apr. 12, 2023, provisional application No. 63/449,105, filed on Mar. 1, 2023.

(51) Int. Cl.
*F41A 17/42* (2006.01)
*F41A 17/32* (2006.01)

(52) U.S. Cl.
CPC .............. *F41A 17/42* (2013.01); *F41A 17/32* (2013.01)

(58) Field of Classification Search
CPC ................................ F41A 17/42; F41A 17/32
See application file for complete search history.

(56) References Cited

U.S. PATENT DOCUMENTS

| | | | |
|---|---|---|---|
| 4,987,693 A | 1/1991 | Brooks | |
| 6,415,542 B1 | 7/2002 | Bates et al. | |
| 6,474,011 B1 | 11/2002 | Sato | |
| 6,591,532 B1 | 7/2003 | Gilbertson et al. | |
| 7,827,720 B1 | 11/2010 | Erdem | |
| 8,037,632 B2 | 10/2011 | Pikielny | |
| 8,046,948 B2 | 11/2011 | Mauch et al. | |
| 8,418,391 B2 | 4/2013 | Kemmerer et al. | |
| 8,881,443 B2 | 11/2014 | Westwood et al. | |
| 9,459,064 B1 | 10/2016 | Xu | |
| 9,746,266 B1 | 8/2017 | Barido et al. | |
| 9,784,516 B2 | 10/2017 | Murphy, II et al. | |
| 9,857,133 B1 | 1/2018 | Kloepfer et al. | |

(Continued)

FOREIGN PATENT DOCUMENTS

WO    WO2014/130625    8/2014

OTHER PUBLICATIONS

U.S. Appl. No. 11/768,046, filed Sep. 26, 2023, Bombaugh, Jr. et al.

*Primary Examiner* — Jonathan C Weber

(74) *Attorney, Agent, or Firm* — Mills IP Law, PLLC

(57) ABSTRACT

Systems and methods are provided for the making safe of a firearm. A safety system includes a lock mechanism coupled to an engagement member and a user interface. The engagement member is movably coupled to the firearm and rotatable between an unlock position and a lock position. A contact face of the engagement member is in contact with an outer surface of a distal portion of a breechblock in the lock position and precludes a distal movement of the breechblock. The engagement member is configured to transition between the lock position and the unlock position while remaining movably coupled to the handgun. Movement of the engagement member from the lock position is restricted by the lock mechanism until disengaged via the user interface.

14 Claims, 30 Drawing Sheets

(56) References Cited

U.S. PATENT DOCUMENTS

| | | |
|---|---|---|
| 10,139,178 B2 | 11/2018 | Lyren et al. |
| 10,190,837 B1 | 1/2019 | Vafadar |
| 10,571,209 B1 | 2/2020 | Dagan |
| 10,591,237 B1 | 3/2020 | Cannon |
| 10,914,543 B2 | 2/2021 | Dulude et al. |
| 10,982,919 B2 | 4/2021 | Dagan |
| 11,085,722 B2 | 8/2021 | Aaronson |
| 11,168,952 B2 | 11/2021 | Palkow |
| 11,514,735 B2 | 11/2022 | Kloepfer et al. |
| 2002/0069570 A1 | 6/2002 | Lee |
| 2008/0134556 A1 | 6/2008 | Remelin |
| 2011/0056108 A1 | 3/2011 | McCord et al. |
| 2012/0291327 A1 | 11/2012 | Boutot, Jr. |
| 2013/0019510 A1 | 1/2013 | Kemmerer et al. |
| 2014/0259841 A1 | 9/2014 | Carlson |
| 2014/0366422 A1 | 12/2014 | Henry |
| 2016/0165192 A1 | 6/2016 | Saatchi et al. |
| 2016/0320154 A1 | 11/2016 | Krieger |
| 2016/0327356 A1 | 11/2016 | Milde, Jr. et al. |
| 2016/0341506 A1 | 11/2016 | Steele |
| 2017/0010062 A1 | 1/2017 | Black et al. |
| 2018/0164060 A1 | 6/2018 | Alok |
| 2018/0224231 A1 | 8/2018 | Weinberg |
| 2018/0238649 A1 | 8/2018 | Winiecki |
| 2018/0259280 A1 | 9/2018 | Martin |
| 2019/0086169 A1 | 3/2019 | Hopkins et al. |
| 2019/0162493 A1 | 5/2019 | Hopkins et al. |
| 2019/0285373 A1 | 9/2019 | Palkow |
| 2019/0376756 A1 | 12/2019 | Neih et al. |
| 2020/0025509 A1 | 1/2020 | Pickerill et al. |
| 2021/0055069 A1 | 2/2021 | Neih et al. |
| 2021/0080208 A1 | 3/2021 | Wu et al. |
| 2022/0178639 A1 | 6/2022 | Song et al. |
| 2022/0307786 A1 | 9/2022 | Kloepfer et al. |
| 2022/0349665 A1 | 11/2022 | Owens et al. |
| 2022/0373284 A1 | 11/2022 | Thiesen et al. |
| 2023/0010591 A1 | 1/2023 | Malichen-Snyder |
| 2023/0010645 A1 | 1/2023 | Kloepfer et al. |
| 2023/0014931 A1 | 1/2023 | Kelley et al. |
| 2023/0113679 A1 | 4/2023 | Kloepfer et al. |
| 2023/0366647 A1 | 11/2023 | Bombaugh, Jr. et al. |

SYSTEMS AND METHODS TO MAKE SAFE A FIREARM

CROSS-REFERENCE TO RELATED APPLICATIONS

This application claims priority to and the benefit of U.S. Provisional Patent Application No. 63/449,105, filed Mar. 1, 2023, and entitled "Systems and Methods to Make Safe a Firearm" and to U.S. Provisional Patent Application No. 63/458,814, filed Apr. 12, 2023, and entitled "Systems and Methods to Make Safe a Firearm" the disclosure of each is incorporated herein by reference in its entirety.

BACKGROUND

The embodiments described herein relate to firearms, and more specifically to systems and methods for securing a firearm.

In order to prevent the unauthorized or accidental discharge of a firearm, the firearm is typically made safe. Safing the firearm establishes the firearm in a safe condition, versus a state of readiness. To make the firearm safe, the firearm may be equipped with a lock and/or secured within a locking container.

A general approach to safing a firearm is to secure a fully functional firearm in a secure container, such as a safe or a lockbox. To access and employ the firearm, an authorized user must typically unlock the secure container via a combination, a mechanical key, a magnetic key, an electronic key, a biometric identifier, and/or other similar means. While this approach is generally an effective way to secure a fully functional firearm, the secure container is often placed in a single, fixed location. Such a location may not coincide with a desired deployment location of the firearm. Thus, the location may limit access to the firearm in an exigent situation. Additionally, the amount of time required to open the secure container (e.g., via the entry of the code or the locating and employment of the key) may be significantly greater than desired during an emergency. Therefore, it may be desirable to employ systems and methods that facilitate the securing of a firearm in such a manner that the fully-functional firearm is readily accessible.

Another approach to making a firearm safe is to secure a locking apparatus to, or about the firearm. Such an apparatus is generally configured to prevent an operation of a mechanism of the firearm. For example, various known trigger locks surround the trigger and/or trigger guard of the firearm to prevent access thereto, while additional trigger guards may interfere with the actuation of the trigger and/or the firing mechanism of the firearm. Similarly, barrel locks, cable locks, or other similar devices may obstruct the chamber of the firearm. This prevents the unauthorized or accidental discharge of the firearm by precluding the insertion of a cartridge (e.g., a live round). However, such systems must generally be unlocked and completely removed from the firearm prior to transitioning the firearm to a fully-functional state. As a result, the amount of time required to unlock the apparatus and transition the firearm to a fully-functional state may be unacceptable for a given deployment scenario. Therefore, a need exists for systems and methods that facilitate the securing of the firearm while allowing the fully-functional firearm to be employed within a requisite timeframe.

An additional approach to safing a firearm is to employ a user verification system to correlate an actuation of the firing mechanism to an authorized user prior to each shot of the firearm. Generally, these approaches operatively disengage the trigger from the firing mechanism of the firearm unless it is confirmed that the operation (e.g., the trigger squeeze) is being executed by an authorized user. The verification is typically accomplished via biometric, radio-frequency identification, or other similar electronic systems for each actuation (e.g., pull) of the trigger. In the event of the actuation of the trigger by an unauthorized user, the firearm typically remains in a default, non-operable state. However, the default to a non-operable state may also result in an authorized user being unable to employ the firearm following a malfunction of the verification system. Therefore, it may be desirable to employ systems and methods for securing the firearm that facilitate the reliable employment of the firearm when accessed by an authorized user.

Thus, a need exists for new and improved systems and methods for securing a firearm.

SUMMARY

This summary introduces certain aspects of the embodiments described herein to provide a basic understanding. This summary is not an extensive overview of the inventive subject matter, and it is not intended to identify key or critical elements or to delineate the scope of the inventive subject matter.

In some embodiments, the present disclosure is directed to a safety system for a handgun. The handgun has a slide movably coupled to a frame. A longitudinal axis of the handgun is defined by a midline of the slide. The safety system includes an engagement member that is movably coupled to the frame. The engagement member is rotatable between an unlock position and a lock position while remaining movably coupled to the frame. The engagement member has a contact face that is in contact with an outer surface of a distal portion of the slide in the lock position. A distal end of a primer actuator of the handgun is maintained spaced apart from a primer activation plane of the handgun by a separation distance in response to the engagement member being in the lock position. A lock mechanism is operably coupled to the engagement member and positioned to restrict a movement of the engagement member from the lock position while the lock mechanism is in an engaged state. A user interface is operably coupled to the lock mechanism and configured to transition the lock mechanism between the engaged state and a disengaged state.

In some embodiments, the engagement member is rotatable about a pivot axis that is parallel to the longitudinal axis. The contact face is at a first lateral location in response to the engagement member being in the lock position and a second lateral location in response to the engagement member being in the unlock position. The second lateral location is displaced from the longitudinal axis a greater distance than the first lateral location.

In some embodiments, the first lateral location of the contact face is laterally offset from longitudinal axis when the engagement member is in the lock position.

In some embodiments, the engagement member is rotatable about a pivot axis that is perpendicular to the longitudinal axis. The pivot axis is laterally displaced from the longitudinal axis. The contact face is on a plane that is orthogonal to the longitudinal axis on a condition that the engagement member is in the lock position. The contact face is configured to traverse an arc of at least 90 degrees on a condition that the engagement member is rotated to the unlock position.

In some embodiments, the engagement member is rotatable about a pivot axis that is perpendicular to the longitudinal axis. The pivot axis is vertically displaced from the longitudinal axis. The contact face is at a first longitudinal location when the engagement member is in the lock position and a second longitudinal location when the engagement member is in the unlock position. The second longitudinal location is distal to the first longitudinal location.

In some embodiments, the engagement member is configured to rotate from the lock position to the unlock position in response to a motive force applied to the engagement member.

In some embodiments, the safety system includes a spring positioned to apply the motive force to the engagement member. The spring has a potential state on a condition that the engagement member is in the lock position and a released state on a condition that the engagement member is in the unlock position.

In some embodiments, the safety system includes an electrical machine positioned to apply the motive force to the engagement member in response to the lock mechanism being transitioned to the disengaged state.

In some embodiments, the motive force is applied to the engagement member by a distal movement of the slide of the handgun. The distal movement of the slide is in response to a force exerted on the slide by a recoil spring assembly of the handgun.

In some embodiments, the engagement member is shaped such that a force vector resulting from the motive force is non-parallel to the longitudinal axis and produces the rotation of the engagement member.

In some embodiments, the lock mechanism includes a sear removably coupled to the engagement member on a condition that the engagement member is at the lock position and the sear is at a restrain position. The sear is configured to preclude the rotation of the engagement member from the lock position when the sear is coupled to the engagement member. The sear is movable to a release position that permits the rotation of the engagement member from the lock position to the unlock position. The lock mechanism includes an electrical machine that is operably coupled to the user interface. The electrical machine is configured to generate a rotational force to transition the lock mechanism from the engaged state to the disengaged state. The lock mechanism also includes a cam operably coupled to the electrical machine. The cam is positioned to move the sear from the restrain position to the release position in response to the rotational force of the electrical machine.

In some embodiments, the slide is in a fully-retracted position in response to the engagement member being in the lock position. Additionally, the transition of the lock mechanism to the disengaged state facilitates a distal movement of the slide and the chambering of a cartridge to place the handgun in an operational condition.

In some embodiments, the safety system includes a housing supporting the user interface. The housing includes a coupling portion oriented to receive a mounting structure of the handgun and a lock cavity defined by an inner face of the housing. The lock cavity contains at least a portion of the lock mechanism. The housing also includes an interface orifice oriented to facilitate the operable coupling of the engagement member to the lock mechanism.

In some embodiments, the safety system includes a fastener positioned adjacent the coupling portion and oriented to secure the mounting structure of the handgun within the coupling portion. The fastener is at least partially occluded by the engagement member when in the lock position thereby precluding a loosening of the fastener.

In some embodiments, the user interface includes at least one of a fingerprint reader, a radio frequency identification reader, a numerical input apparatus, a microphone, a magnetic key, or a mechanical key.

In an additional aspect, the present disclosure is directed to a method of operating a handgun with a safety system. The handgun has a slide movably coupled to a frame. A longitudinal axis of the handgun is defined by a midline of the slide. The safety system is coupled to the frame. The safety system includes a lock mechanism operably coupled to an engagement member and a user interface operably coupled to the lock mechanism. The method includes moving the slide in a proximal direction relative to the frame and rotating the engagement member from an unlock position to a lock position. The engagement member has a contact face that is in contact with an outer surface of a distal portion of the slide when the engagement member is in the lock position. The movement of the engagement member from the lock position is restricted via the lock mechanism in an engaged state. The method also includes maintaining a separation distance between a distal end of a primer actuator of the handgun and a primer activation plane of the handgun via the engagement member in the lock position. The separation distance precludes contact between the primer actuator and a cartridge primer in response to an actuation of a firing mechanism of the handgun. Additionally, the method includes transitioning the lock mechanism to a disengaged state in response to a user input via the user interface. In response to the transition of the lock mechanism to the disengaged state, the engagement member is rotated from the lock position to the unlock position and the slide is moved in a distal direction relative to the frame. The method further includes actuating the firing mechanism of the handgun to discharge a cartridge while maintaining the coupling of the safety system to the handgun.

In some embodiments, rotating the engagement member from the lock position to the unlock position includes rotating the engagement member about a pivot axis that is parallel to the longitudinal axis in response to a motive force applied to the engagement member by a spring.

In some embodiments, rotating the engagement member from the lock position to the unlock position includes rotating the engagement member about a pivot axis that is perpendicular to the longitudinal axis in response to a motive force applied to the engagement member by a distal movement of the slide of the handgun.

In some embodiments, after rotating the engagement member from the unlock position to the lock position, the method includes actuating a slide release of the handgun to bring the distal portion of the slide into contact with the contact face of the engagement member in the lock position.

In some embodiments, the method includes maintaining the coupling of the engagement member to the handgun when the engagement member is in the lock position, the unlock position, and during a transition between the lock position and the unlock position.

In an additional aspect, the present disclosure is directed to a safety system for firearm. The firearm has a breechblock movably coupled to a frame. The safety system includes an engagement member movably coupled to the frame. The engagement member is rotatable between an unlock position and a lock position while remaining movably coupled to the frame. The engagement member has a contact face that is in contact with an outer surface of a distal portion of the breechblock in the lock position. A distal end of a primer actuator of the firearm being maintained spaced apart from a primer activation plane of the firearm by a separation distance in response to the engagement member being in the lock position. A lock mechanism is operably coupled to the engagement member and positioned to restrict a movement of the engagement member from the lock position while the lock mechanism is in an engaged state. A user interface operably coupled to the lock mechanism and configured to transition the lock mechanism between the engaged state and a disengaged state.

In some embodiments, the lock mechanism is positioned within a housing of the safety system, and the user interface is coupled to a portion of the firearm at a distance from the housing.

DETAILED DESCRIPTION

Figure 1:
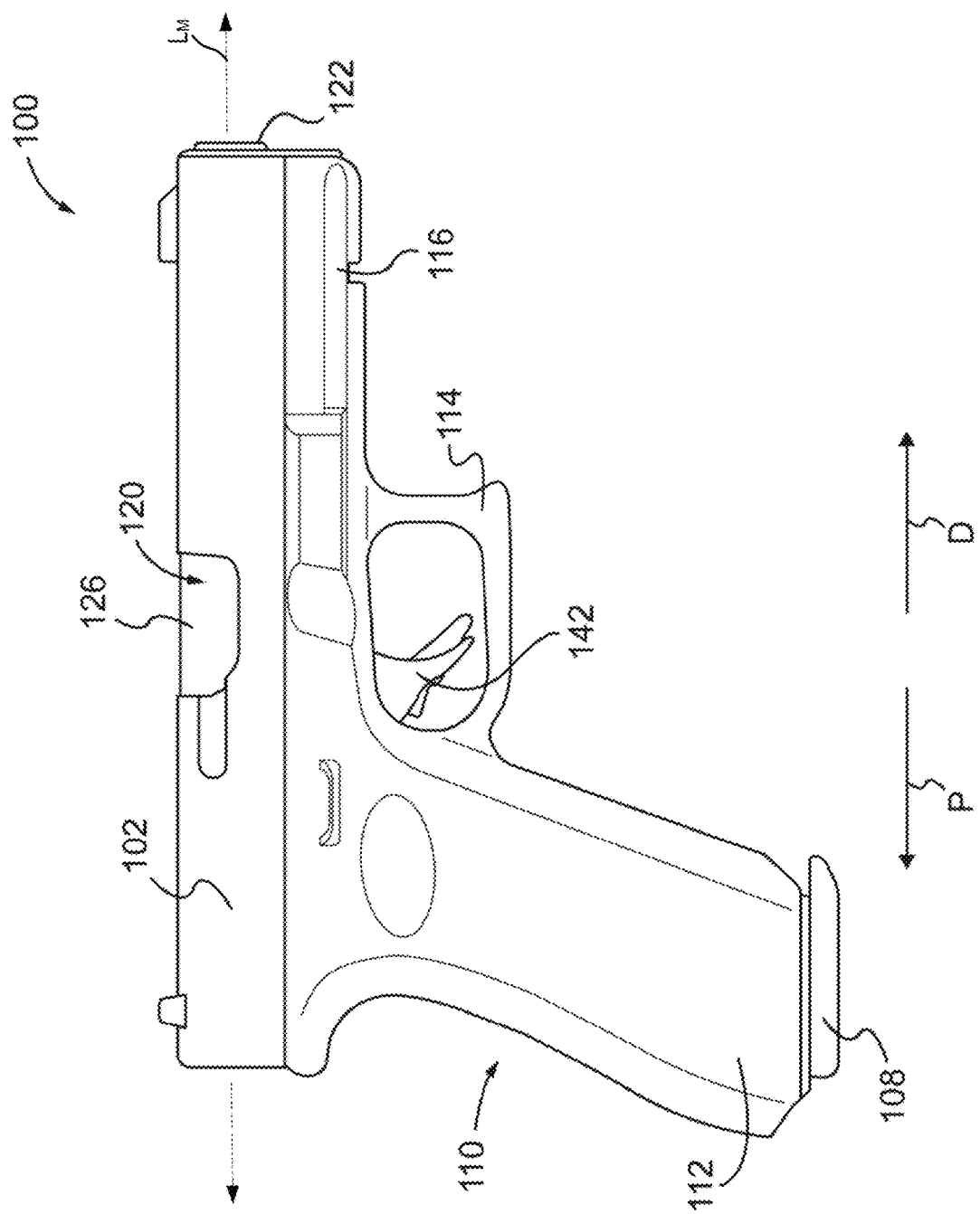
FIG. 1 is a side view of a firearm configured as a semi-automatic handgun.

Generally, the present disclosure is directed to systems and methods for making safe a firearm. In particular, the systems and methods described herein can be used for safing a handgun or a firearm equipped with a breechblock (e.g., a pump-action shotgun, a semi-automatic shotgun, a bolt-action rifle, and/or an automatic/semi-automatic rifle, such as an AR-style carbine). As used herein, the making safe of a firearm includes the transitioning of the firearm from a state of readiness, in which a chambered cartridge may be discharged, to a safe condition, in which the unauthorized or accidental discharge of the firearm is precluded, even with a cartridge remaining in the chamber. Accordingly, the systems and methods disclosed herein may be employed to establish and maintain a separation distance between the firing pin of the firearm and the primer of a cartridge.

In some embodiments, the separation distance maintained by the safety systems disclosed herein is greater than the maximal distal travel of the firing pin. Accordingly, the firing pin is unable to contact the primer of the cartridge even if the firing mechanism of the firearm is actuated. In other words, the separation distance established by the safety system prevents the distal tip of the firing pin from contacting the primer (or a plane on which the primer would lie if a cartridge were seated in the chamber) under all locked conditions. To establish the separation distance, the safety systems described herein include an engagement member that engages with a portion of a breechblock of the firearm. As used herein, the term "breechblock" refers to a movable component (or assembly of components) that occludes the proximal end of the barrel (e.g., the chamber) such that propellant gases resulting from the discharge of a cartridge are directed distally down the barrel to propel a bullet. In other words, the breechblock is a component of the action of the firearm that maintains the cartridge in the chamber of the firearm in a position to be fired. For example, as used herein, the breechblock can be a bolt of the firearm, a bolt assembly of the firearm, and/or a bolt carrier group of the firearm, to include the slide of a handgun.

The proximal movement of the breechblock (e.g., the slide or bolt assembly) is resisted by a recoil spring. The recoil spring is configured to exert a force on the breechblock in the distal direction so that, unless prevented, the breechblock will return to a default forward (e.g., slide-forward or bolt-forward) position. The default forward position is considered the design position of the breechblock, wherein the handgun may be discharged by the actuation (e.g., pulling or squeezing) of the trigger. Therefore, in order to maintain the separation distance, the engagement member is secured in a locked position via a lock mechanism. When the engagement member is secured in the lock position, the engagement member prevents the distal movement of the breechblock. In other words, in the lock position, the engagement member maintains the breechblock in a position that is shifted proximally from the design position of the breechblock.

To place the firearm in an operational state (e.g., with the slide in the design position), the lock mechanism is disengaged via a user interface. The user interface is configured to receive an input from an authorized user and disengage the lock mechanism. The user interface may, for example, include a fingerprint reader, a radio frequency identification reader, a numerical input apparatus, a microphone, a magnetic key, a mechanical key, and/or other input system configured to authenticate an authorized user. Once unlocked, the safety system remains unlocked until the locking mechanism is affirmatively reengaged by the operator.

As used herein, the term "about" when used in connection with a referenced numeric indication means the referenced numeric indication plus or minus up to 10 percent of that referenced numeric indication. For example, the language "about 50" covers the range of 45 to 55. Similarly, the language "about 5" covers the range of 4.5 to 5.5.

As used in this specification and the appended claims, the word "distal" refers to direction towards a target and away from a midline of an operator holding the handgun by the handle, such as in a firing orientation. Similarly, the word "proximal" refers to a direction away from the target and toward the midline of the operator. Thus, for example, the end of the barrel (e.g., the muzzle) from which a bullet departs under a designed operation is closest to the target and would be the distal end of the handgun, and the end opposite the distal end (e.g., the portion of the handgun held by the operator when firing the handgun) would be the proximal end.

Further, specific words chosen to describe one or more embodiments and optional elements or features are not intended to limit the invention. For example, spatially relative terms—such as "beneath", "below", "lower", "above", "upper", "proximal", "distal", and the like—may be used to describe the relationship of one element or feature to another element or feature as illustrated in the figures. These spatially relative terms are intended to encompass different positions (i.e., translational placements) and orientations (i.e., rotational placements) of a device in use or operation in addition to the position and orientation shown in the figures. For example, if a device in the figures is turned over, elements described as "below" or "beneath" other elements or features would then be "above" or "over" the other elements or features. Thus, the term "below" can encompass both positions and orientations of above and below. A device may be otherwise oriented (e.g., rotated 90 degrees or at other orientations) and the spatially relative descriptors used herein interpreted accordingly. Likewise, descriptions of movement along (translation) and around (rotation) various axes includes various spatial device positions and orientations.

Similarly, geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

In addition, the singular forms "a", "an", and "the" are intended to include the plural forms as well, unless the context indicates otherwise. The terms "comprises", "includes", "has", and the like specify the presence of stated features, steps, operations, elements, components, etc. but do not preclude the presence or addition of one or more other features, steps, operations, elements, components, or groups.

Figure 2:
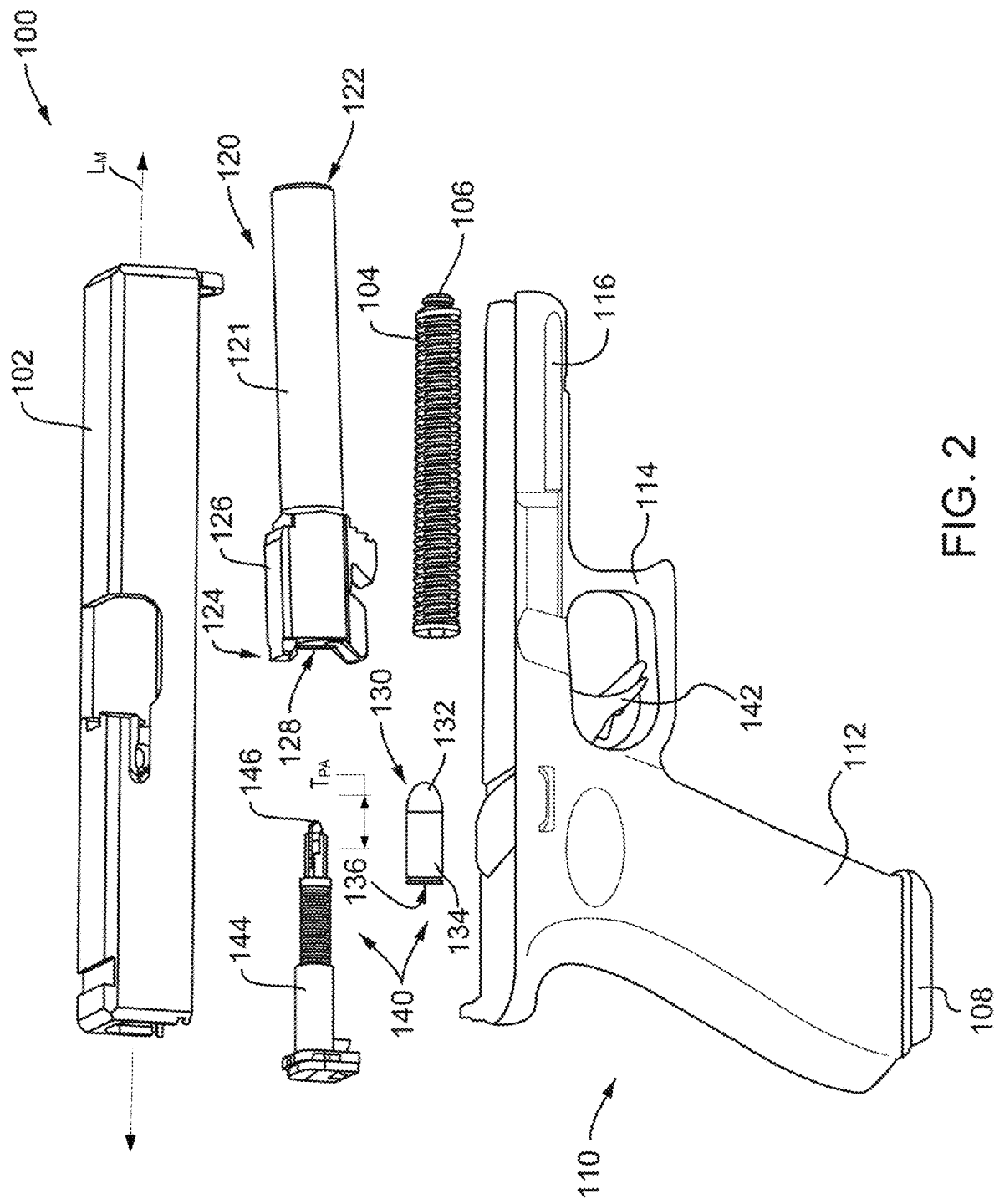
FIG. 2 is an exploded perspective view of the firearm of FIG. 1.

FIGS. 1 and 2 are a side view and an exploded perspective view of a firearm configured as a semi-automatic handgun 100. Although FIGS. 1 and 2 depict the handgun 100, the systems and methods described herein can be employed with other firearms that include a breechblock, such as a pump-action shotgun, a semi-automatic shotgun, a bolt-action rifle, an automatic/semi-automatic rifle, such as an AR-style carbine, and/or suitable firearms. The handgun 100 includes a frame 110. The frame 110 is a unitary body that includes a grip portion 112. The grip portion 112 is oriented and shaped to be received by a hand of an operator of the handgun 100. The grip portion 112 defines a cavity for receiving a magazine 108. The magazine 108 may contain ammunition for the handgun 100. The frame 110 also includes a trigger guard 114 positioned distally (e.g., forward) of the grip portion 112. The trigger guard 114 at least partially surrounds the trigger 142 and partially restricts access thereto.

The frame 110 may also include a mounting structure 116 positioned distally relative to the trigger guard 114. In some embodiments, such as depicted in FIGS. 1 and 2, the mounting structure 116 is milled or otherwise formed into a lower surface of the frame 110. The mounting structure 116 may, for example, be a Picatinny rail, an accessory rail and/or other similar structure. The mounting structure 116 provides a mounting platform for firearm accessories, such as the safety system described herein, a tactical light, a laser aiming module, a camera, or other suitable accessory.

The handgun 100 also includes a slide 102 that is movably coupled (e.g., slidingly coupled) to the frame 110. The slide 102 is the top portion of the handgun 100 and has a long axis that extends generally horizontally when the handgun 100 is oriented a design employment orientation. Accordingly, in some embodiments, the longitudinal axis (L) of the handgun 100 is defined by a midline ($L_M$) of the slide. During operation of the handgun 100, the slide 102 is configured to translate first in a proximal direction (P) and then in a distal direction (D) relative to the frame 110 following the discharge of the handgun 100.

As illustrated in FIG. 2, the handgun 100 includes a recoil spring 104. The recoil spring 104 is axially aligned with and circumscribes a recoil spring guide 106. The recoil spring 104 is positioned so that a proximal movement of the slide 102 relative to the frame compresses the recoil spring 104. The recoil spring 104 is thus oriented to exert a force on the slide 102 in a distal direction. For example, under designed operations (e.g., an authorized, intentional actuation of the trigger 142), the discharge of the handgun 100 results in the proximal movement of the slide 102 relative to the frame 110 and, thus, the compression of the recoil spring 104. When the slide 102 encounters a proximal travel limit (e.g., a slide stop), the potential energy of the recoil spring 104 is released, thereby returning the slide 102 distally to a design position (e.g., a slide-forward position such as depicted in FIG. 1).

The handgun 100 also includes a barrel 120 supported by the slide 102. The barrel 120 is a tubular metallic structure through which a projectile 132 (e.g., a bullet) or shot charge is fired. The barrel 120 is a unitary body that extends between a muzzle 122 and a chamber end 124 (e.g., a proximal end of the barrel 120). The muzzle 122 corresponds to the distal end of the barrel from which the projectile 132 exits following discharge. The muzzle 122 is the distal end of a generally linear portion 121 of the barrel 120. The linear portion 121 of the barrel 120 has a generally uniform outer diameter and defines a hollow internal lumen (e.g., a bore) of the barrel 120. In some embodiments, the linear portion 121 extends distally from a barrel block 126. The barrel block 126 is an enlarged portion of the barrel 120 that may be configured to interface with the slide 102. The barrel block 126 also defines a chamber 128. The chamber 128 is a hollow internal lumen of the barrel 120 that is axially aligned with the bore and holds a cartridge 130 ready for firing/discharge. In some embodiments, the barrel 120 is axially aligned with the midline ($L_M$) of the slide 102 when the slide is in the design position.

In some embodiments, the firearm (e.g., the handgun 100) is configured to discharge a cartridge 130 in order to engage a target. The cartridge 130 includes a projectile 132 at least partially contained within the casing 134. The casing 134 may contain a quantity of a propellant in fluid communication with a primer 136. The projectile 132 has an outer diameter that is less than the bore, while the casing 134 has an outer diameter that is less than the inner diameter of the chamber but is greater than the bore. In other words, the casing 134 is configured to be seated at least partially within the chamber 128, with at least a portion of the projectile 132 extending distally into the bore. In embodiments, a transition of the barrel 120 from the chamber 128 to the bore may define a maximal insertion distance of the casing 134 within the barrel 120, therefore defining a position of the primer 136 relative to the frame 110 adjacent the chamber end 124.

In some embodiments, the handgun 100 may be discharged via a firing mechanism 140. The firing mechanism includes a trigger 142 operably coupled to a primer actuator 144 (e.g., a firing pin) via a linkage mechanism. The primer actuator 144 may be, for example, be a rigid rod or other suitable structure. The primer actuator 144 includes a distal end 146 configured to impart a force to the primer 136 of a chambered cartridge 130 in response to an actuation of the trigger 142 to discharge the handgun 100.

The distal end 146 of the primer actuator 144 has a design range of travel ($T_{PA}$). In some embodiments design range of travel ($T_{PA}$) is defined between a maximal proximal position of the distal end 146 when the handgun 100 is prepared to fire (e.g., cocked) and a point of maximal travel in the distal direction attained by the distal end 146 in response to a force imparted to the primer actuator 144. For example, in some embodiments, the handgun 100 is a striker-fired handgun with the primer actuator 144 being a striker assembly. In such an embodiment, the initial actuation of the trigger 142 exerts a force on the firing pin in the proximal direction to transition the distal end 146 from a design position ($P_N$) (FIG. 3) along the design range of travel ($T_{PA}$). This force also applies a tension to a spring of the striker assembly and fully cocks the handgun 100. As the actuation of the trigger 142 continues, the trigger 142 is operably decoupled from the striker assembly and the spring imparts a force on the firing pin in the distal direction, resulting in the positioning of the distal end 146 at the point of maximal distal travel. In an additional embodiment, the handgun 100 is a hammer-fired handgun 100 wherein cocking the handgun 100 places an external hammer under a tensile load. In such an embodiment, the distal end 146 is positioned at a design position ($P_N$) (FIG. 3) along the design range of travel ($T_{PA}$) when the handgun 100 is both cocked and uncocked. Upon actuation of the trigger, the hammer is released, and a force is imparted on the firing pin in the distal direction, resulting in the positioning of the distal end 146 at the point of maximal distal travel. It should be appreciated that the point of maximum travel in a distal direction extends distally beyond a point of contact (e.g., a primer activation plane ($PL_{ACT}$) (FIG. 3)) with the primer 136.

Figure 3:
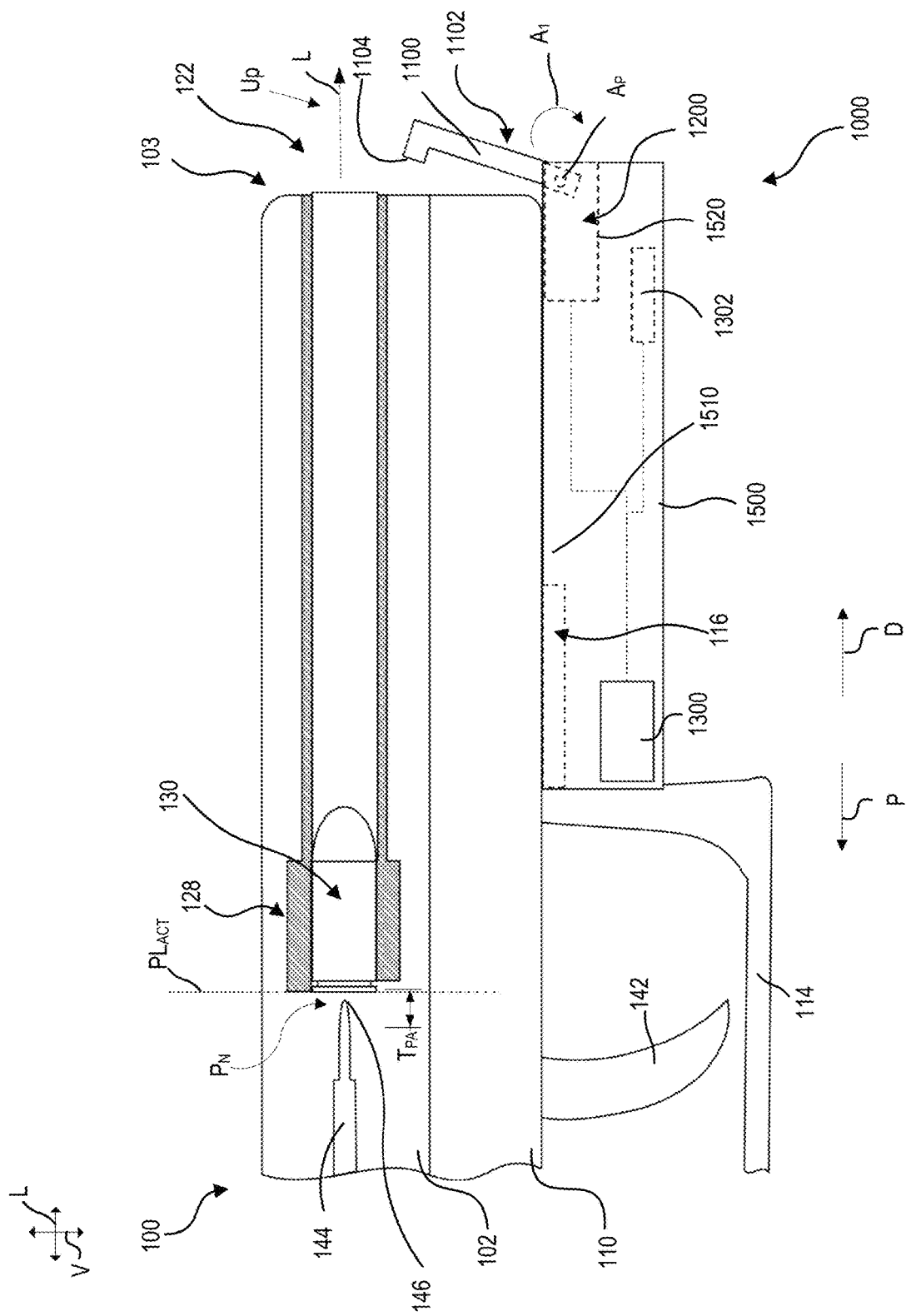
FIG. 3 is a diagrammatic illustration of a safety system for a handgun coupled to a portion of the handgun, with the safety system being depicted in an unlocked configuration.
Figure 4:
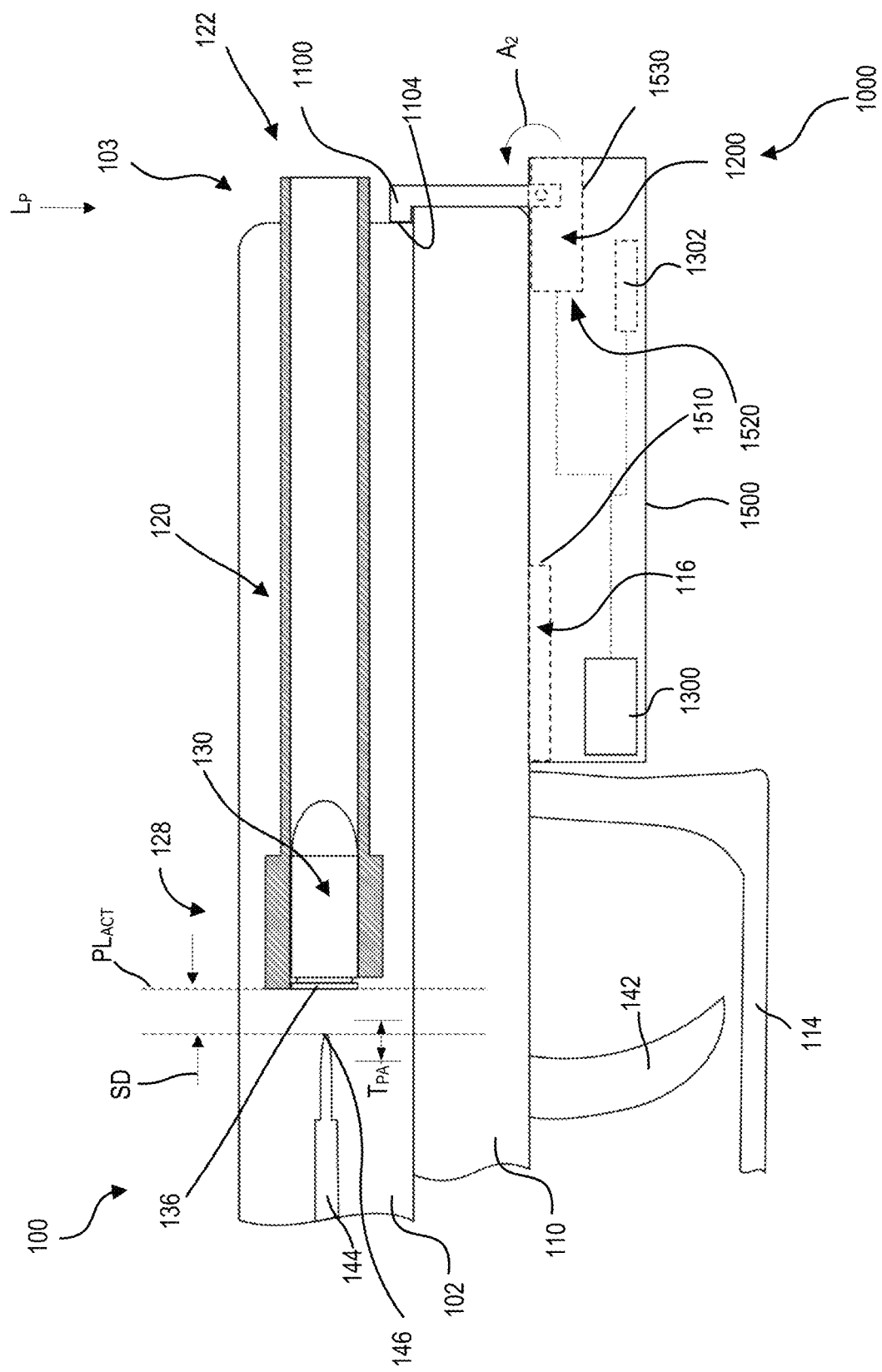
FIG. 4 is a diagrammatic illustration of the safety system of FIG. 3, with the safety system being depicted in a locked configuration wherein the slide of the handgun is maintained in a rearward (proximal) position via an engagement member of the safety system.

FIGS. 3 and 4 are diagrammatic illustrations of a safety system 1000 for a handgun coupled to a portion of the handgun 100. The safety system 1000 develops a forced malfunction of the handgun 100 that precludes the handgun 100 from discharging when the safety system 1000 is in a locked configuration. In some embodiments, the safety system 1000 is coupled to an existing handgun 100 as depicted in FIGS. 3 and 4. However, in additional embodiments, the safety system 1000 may be integrated into a newly manufactured handgun 100. Although shown and described as being coupled to the handgun 100, the safety system 1000 and any of the safety systems described herein can be coupled to and/or used with any suitable firearm.

In FIG. 3, the safety system 1000 is depicted in an unlocked configuration, while in FIG. 4, the safety system 1000 is depicted in a locked configuration. The safety system 1000 includes an engagement member 1100, a lock mechanism 1200, and a user interface 1300. As described in more detail below, the safety system 1000 can allow the handgun 100 to be selectively locked (or placed in a safe, "no-fire" condition) and unlocked while remaining coupled to the handgun 100. As depicted, the engagement member 1100 is movably coupled to the frame 110. The engagement member 1100 is rotatable between an unlock position ($U_P$) as depicted in FIG. 3 and a lock position ($L_P$) as depicted in FIG. 4. The engagement member 1100 is rotatable between the unlock position ($U_P$) and the lock position ($L_P$) while remaining movably coupled to the frame 110.

To transition between the unlock position ($U_P$) and the lock position ($L_P$), the engagement member 1100 is rotatable about a pivot axis ($A_P$). In some embodiments, such as depicted in FIGS. 3 and 4, the pivot axis ($A_P$) is perpendicular to the longitudinal axis (L). Additionally, in some embodiments, the pivot axis ($A_P$) is vertically displaced from the longitudinal axis (L). Said another way, on a condition that grip portion 112 is positioned in a hand of an operator of the handgun 100, the longitudinal axis (L) can lie on a plane that is generally horizontal and the pivot axis ($A_P$) can lie on a plane that is vertically below the generally horizontal plane of the longitudinal axis (L). In such embodiments, the engagement member 1100 pivots in the direction shown by arrow $A_1$ to transition from the lock position ($L_P$) to the unlock position ($U_P$) and in the direction shown by arrow $A_2$ to transition from the unlock position ($U_P$) to the lock position ($L_P$).

In some embodiments, the engagement member 1100 includes an actuator portion 1102. The rotation of the engagement member 1100 is the result of a motive force received by the actuator portion 1102 of the engagement member 1100. For example, in some embodiments the actuator portion 1102 can include a surface or portion that allows a user to manually grasp or manipulate the engagement member 1100 to move the engagement member 1100 relative to the frame 110. In other embodiments, the actuator portion 1102 is operably coupled to receive the motive force from a spring (e.g., spring 3210 depicted in FIG. 16) or an electrical machine (not shown).

As depicted in FIGS. 3 and 4, the engagement member 1100 includes a contact face 1104. The contact face 1104 is configured to contact an outer surface of a distal portion 103 of the slide 102 on a condition that the engagement member 1100 is in the lock position ($L_P$). The contact between contact face 1104 and the slide 102 can limit movement of the slide 102. For example, in the lock position ($L_P$), the engagement member 1100 can limit a distal movement of the slide 102 while permitting a proximal movement of the slide 102. In some embodiments, the contact face 1104 can be in contact with a portion of the slide 102 when the safety system 1000 is both in the locked configuration and in the unlocked configuration, but the engagement member 1100 limits a motion of the slide 102 only when the system is in the locked configuration. In other embodiments, a clearance may be established between the contact face 1104 and the portion of the slide 102 when the safety system 1000 is in the unlocked configuration, such as depicted in FIG. 3. Similarly stated, the contact face 1104 can be spaced apart from the slide 102 when the safety system 1000 is in the unlocked configuration. As depicted in FIG. 4, the contact face 1104 is at a first longitudinal location when the engagement member 1100 is in the lock position ($L_P$). The contact face 1104 is at second longitudinal location, as depicted in FIG. 3, when the engagement member 1100 is in the unlock position ($U_P$). The second longitudinal location is distal to the first longitudinal location.

The lock position ($L_P$) corresponds to a separation distance (SD) between the distal end 146 of the primer actuator 144 of the handgun 100 and a primer activation plane ($PL_{ACT}$) of the handgun 100. In other words, the distal end 146 of the primer actuator 144 of the handgun 100 is maintained spaced apart from the primer activation plane ($PL_{ACT}$) by the separation distance (SD) in response to the engagement member 1100 being in the lock position ($L_P$). Said another way, since the primer actuator is supported by the slide 102, a proximal positioning of the slide 102 stemming from the proximal movement of the slide 102 results in a proximal shift of the design range of travel ($T_{PA}$) of the primer actuator 144 relative to the frame 110 and thus the barrel 120. In some embodiments, the proximal position of the slide 102 when the engagement member 1100 is in the lock position ($L_P$) can be a fully-retracted position (e.g., a slide-lock position) of the slide 102. It should be appreciated that, in some embodiments, the slide release of the handgun can be actuated after rotating the engagement member 1100 into the lock position ($L_P$). The actuation of the slide release can bring the distal portion 103 of the slide 102 into contact with the contact face 1104 of the engagement member 1100 in the lock position ($L_P$).

The separation distance (SD) has a magnitude that precludes contact between the distal end 146 of the primer actuator 144 (e.g., the firing pin) and the primer 136 of a chambered cartridge 130 even if the firing mechanism 140 is actuated. Said another way, the magnitude of the separation distance (SD) is such that the point of maximal distal travel (e.g., the distal limit of the design range of travel ($T_{PA}$)) is proximal to, and separated from, the primer activation plane ($PL_{ACT}$). Insofar as the separation distance (SD) precludes any contact between the primer actuator 144 and the primer 136, the handgun 100 is rendered inoperable (e.g., made safe) so long as the separation distance (SD) is maintained.

The primer activation plane ($PL_{ACT}$) is a plane orthogonal to the longitudinal axis (L) of the handgun 100. The primer activation plane ($PL_{ACT}$) corresponds to the design longitudinal position at which a proximal face of the primer 136 would lie if/when a cartridge 130 were/is seated in the chamber 128. In other words, the primer activation plane ($PL_{ACT}$) corresponds to the longitudinal position at which the distal end 146 would first contact the primer 136 during the discharging of the handgun 100. In some embodiments, the primer activation plane ($PL_{ACT}$) may be congruent with a plane defined by a maximal proximal portion of the chamber end 124 of the barrel 120.

As depicted in FIG. 3, the unlock position ($U_P$) corresponds to a design position ($P_N$) of the distal end 146 of the primer actuator 144 along the design range of travel ($T_{PA}$). The design position ($P_N$) may be proximal to the primer activation plane ($PL_{ACT}$) such that a design clearance exists between the distal end 146 and the primer 136. In some embodiments, the design position ($P_N$) corresponds to the longitudinal position of the distal end 146 when the handgun 100 is in an uncocked state with the slide 102 in the default, slide-forward position, such as depicted in FIGS. 1 and 3. However, in additional embodiments, the design position ($P_N$) corresponds to the design longitudinal position of the distal end 146 when the handgun 100 is in a half-cocked state or a cocked (e.g., fully cocked) state with the slide 102 in the default, slide-forward position. In other words, when the engagement member 1100 is in the unlock position ($U_P$), the handgun 100 may be in an operational state/condition from which the handgun 100 may be discharged to engage a target.

In some embodiments, the safety system 1000 includes the lock mechanism 1200, which is operably coupled to the engagement member 1100. The lock mechanism 1200 is positioned to restrict the movement of the engagement member 1100 from the lock position ($L_P$) while the lock mechanism is engaged (e.g., in an engaged state). In other words, the lock mechanism 1200 maintains the engagement member 1100 (and therefore the engaged slide 102) in a fixed position (e.g., the lock position ($L_P$)) relative to the frame 110. In some embodiments, the lock mechanism 1200 may be a mechanical lock mechanism wherein the lock mechanism 1200 mechanically engages a portion of the engagement member 1100, such as via at least one pin, a catch, a locking bar, a cam, and/or other suitable structure as further described below. In some embodiments, the lock mechanism 1200 may utilize a magnetic force to restrict the movement of the engagement member 1100. For example, the lock mechanism 1200 may be configured to magnetically engage the engagement member 1100 directly or may utilize a magnetic field to restrict the rotation of a component of the safety system 1000 to which the engagement member 1100 is rotationally coupled.

On a condition that the lock mechanism 1200 is transitioned to a disengaged state, the engagement member 1100 is released to rotate relative to the frame 110 from the lock position ($L_P$) toward the unlock position ($U_P$). The rotation of the engagement member 1100 can be in response to a motive force applied to the engagement member 1100. In some embodiments, the motive force can be developed by the transition of a deformable member (e.g., a spring, such as spring 3210 (FIG. 16), and/or an elastomeric member) from a potential state to a released state. In some embodiments, the motive force can be developed by an electrical machine (e.g., a motor, a servo, or a piezoelectric motor). The electrical machine can be positioned to apply the motive force to the engagement member 1100 in response to the lock mechanism 1200 being transitioned to the disengaged state. In some embodiments, the motive force can be developed by the distal movement of the slide 102 in response to the force exerted on the slide 102 by the recoil spring assembly 104. In some embodiments, the engagement member 1100 is shaped such that a force vector resulting from a force (e.g., the motive force) applied to the engagement member 1100 by the distal movement of the slide 102 is non-parallel to the longitudinal axis (L) and produces a rotation of the engagement member 1100.

As further depicted in FIGS. 3 and 4, the safety system 1000 includes the user interface 1300, which is operably coupled to the lock mechanism 1200. The user interface 1300 is configured to transition the lock mechanism 1200 between an engaged state and a disengaged state. In other words, the user interface 1300 is employed by an authorized user to facilitate the movement of the engagement member 1100 between the lock position ($L_P$) and the unlock position ($U_P$) by locking or unlocking the lock mechanism 1200. Once unlocked, the safety system 1000 remains unlocked until the locking mechanism 1200 is affirmatively reengaged by an operator.

The user interface 1300 can include a biometric user identification (e.g., fingerprint identification) unit, a radio frequency identification reader, a numerical input apparatus, a microphone, a magnetic key, a mechanical key, and/or other input system configured to authenticate an authorized user. For example, the user interface 1300 may, in some embodiments, include a fingerprint sensor operably coupled to a biometric processor and a data storage device containing stored identification data for authorized users. The fingerprint sensor may be an optical sensor, a thermal sensor, and/or a pressure sensor and may be configured as a static sensor or a swipe sensor. Additionally, in some embodiments the user interface 1300 includes a wireless communication unit that facilitates the remote operation of the safety system 1000 via a wireless network, a cellular network, and/or a Bluetooth connection.

In some embodiments, a GPS module 1302 is operably coupled to the user interface 1300. The GPS module 1302 facilitates position tracking of the handgun 100 via the safety system 1000 coupled thereto. For example, the GPS module 1302 may be employed in conjunction with a geo-fence (e.g., a region with boundaries that are defined by GPS coordinates). In some embodiments an embodiment, an authorized user of the handgun 100 may be alerted in the event the handgun 100 departs the geo-fence. In additional embodiments, the user interface 1300 may be disabled upon the departure of the handgun 100 from the geo-fence. In further embodiments, the user interface 1300 may be configured to transition the lock mechanism 1200 to, or maintain the lock mechanism 1200 in, the engaged state following the departure of the handgun 100 from the geo-fence.

In some embodiments, the safety system 1000 includes a housing 1500. The housing 1500 provides the structure for support and mounting of the safety system 1000 to the handgun 100. The housing 1500 is formed from materials having sufficient strength to prevent access to internal components of the safety system 1000. For example, in various embodiments, the housing 1500 is formed from a metal, a reinforced plastic, and/or composite. In some embodiments, the housing 1500 is the unitary structure defining at least one internal cavity. In other embodiments, the housing 1500 is formed by the coupling of multiple housing members that are separately formed. For example, the housing 1500 may be formed at least from a first housing half and a second housing half.

As depicted in FIGS. 3 and 4, the housing 1500 supports the user interface 1300. For example, the housing 1500 may define an external recess in which the user interface 1300 may be secured. The housing 1500 includes a coupling portion 1510. The coupling portion 1510 is configured to receive a portion of the handgun 100, such as the mounting structure 116. In other words, the housing 1500, and thus the safety system 1000, may be fixedly coupled to the handgun 100 via an interface between the coupling portion 1510 and the mounting structure 116. The housing 1500 may, for example, be coupled to the handgun 100 and a position that is forward of the trigger guard 114. As depicted in FIGS. 3 and 4 the positioning of safety system 1000, in some embodiments, establishes a spacing between the housing 1500 and the trigger guard 114. However, in some embodiments, the housing 1500 is formed to conform with a portion of the trigger guard 114 and is positioned in contact therewith.

In some embodiments, the housing 1500 also defines a lock cavity 1520 containing at least a portion of the lock mechanism 1200. The lock cavity 1520 can, for example, be defined by an inner face of the housing 1500. Additionally, the housing 1500 defines an interface orifice 1530. The interface orifice 1530 is arranged to facilitate the operable coupling of the engagement member 1100 to the lock mechanism 1200. The interface orifice 1530 can, for example, correspond to a slot or hole through which a portion of the engagement member 1100 may be inserted. The interface orifice 1530 is sized to facilitate a desired degree of travel of the engagement member 1100.

Figure 5:
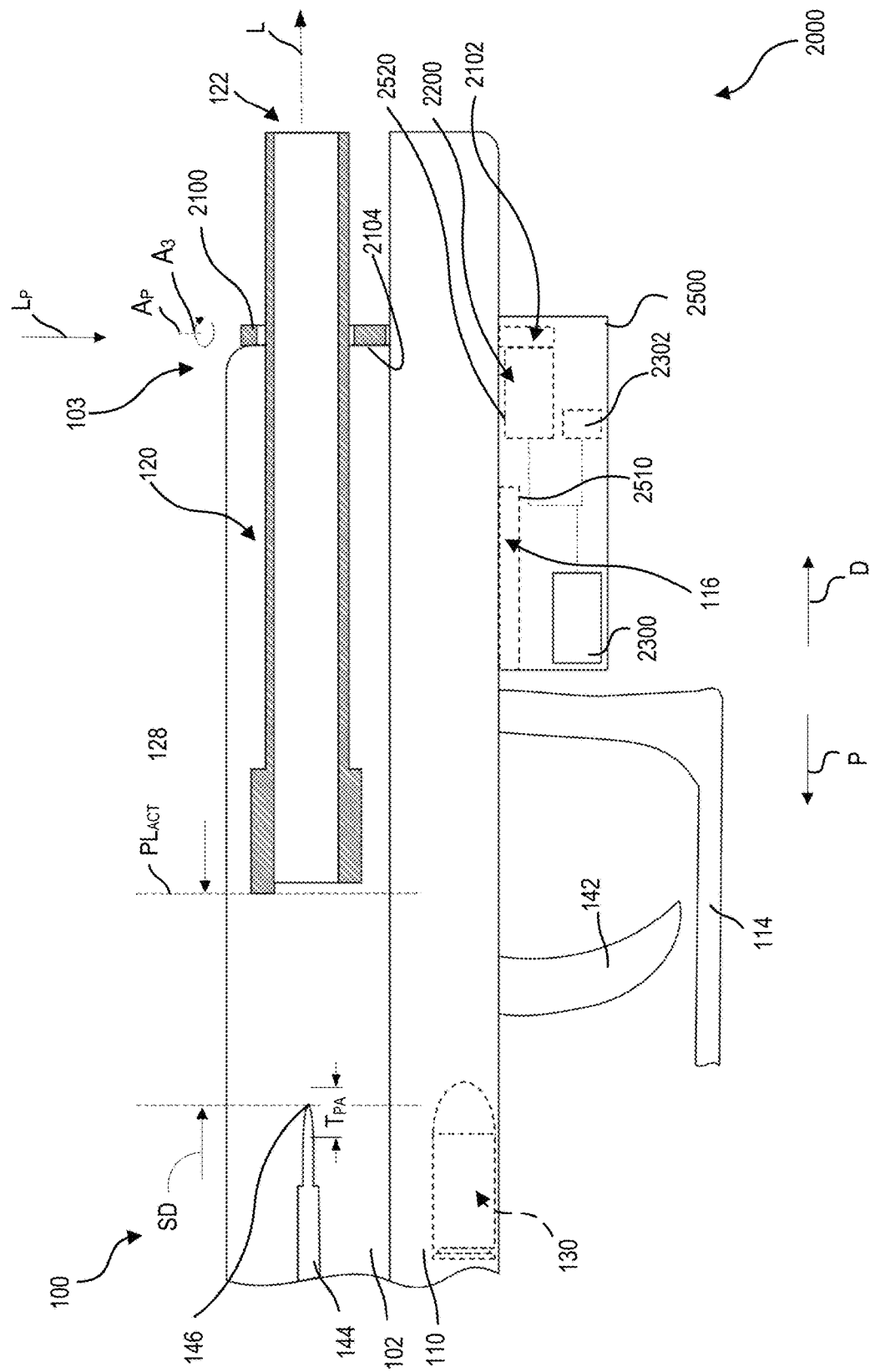
FIG. 5 is a diagrammatic illustration of a safety system for a handgun coupled to a portion of the handgun, with the safety system being depicted in an unlocked configuration.
Figure 6:
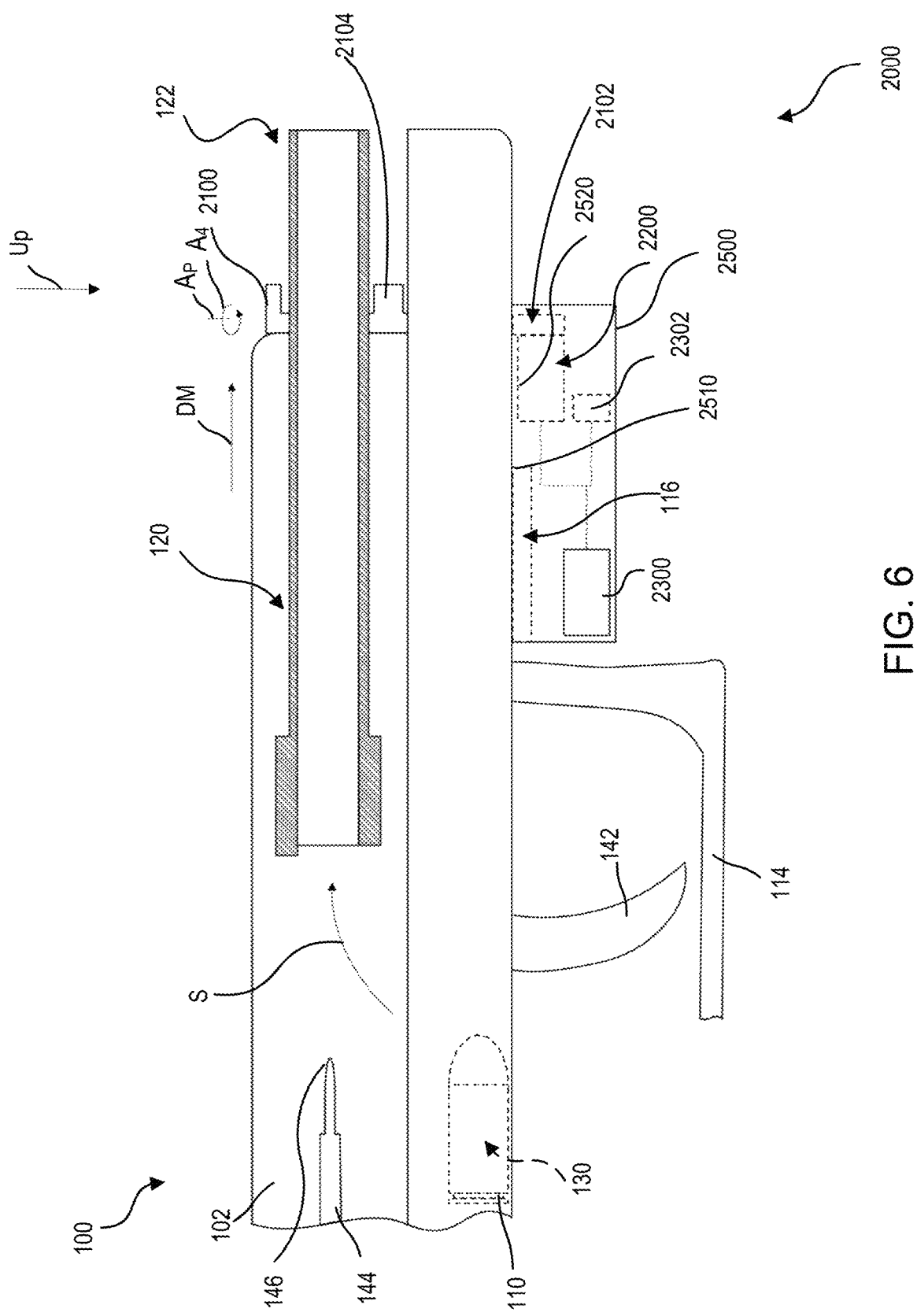
FIG. 6 is a diagrammatic illustration of the safety system of FIG. 5, particularly illustrating the chambering of a cartridge during the unlocking of the safety system.

Although as described above, the engagement member 1100 of the safety system 1000 is rotatable about the pivot axis ($A_P$) that is perpendicular to the longitudinal axis (L), in other embodiments, any of the safety systems described herein can include pivot axis in different orientations relative to the longitudinal axis (L). For example, FIGS. 5 and 6 are diagrammatic illustrations of a safety system 2000 for a handgun coupled to a portion of the handgun 100. As described for previous embodiments, in some embodiments the safety system 2000 develops a forced malfunction of the handgun 100 that precludes the handgun 100 from discharging when the safety system 2000 is in a locked configuration. In some embodiments, the safety system 2000 is coupled to an existing handgun 100 as depicted in FIGS. 5 and 6. Although shown and described as being coupled to the handgun 100, the safety system 2000 can be coupled to and/or used with any suitable firearm.

In FIG. 5, the safety system 2000 is depicted in a locked configuration, while in FIG. 6, the safety system 2000 is depicted in an unlocked configuration. The safety system 2000 includes a housing 2500, an engagement member 2100, a lock mechanism 2200, a user interface 2300. As described in more detail below, the safety system 2000 can allow the handgun 100 to be selectively locked (or placed in a safe, "no-fire" condition) and unlocked while remaining coupled to the handgun 100. The engagement member 2100 is movably coupled to the handgun 100 and includes an actuator portion 2102 and a contact face 2104. In other words, the engagement member 2100 may, in various embodiments, be configured to rotate relative to the frame 110 in accordance with the locked/unlocked configuration of the safety system 2000. The rotation of the engagement member 2100 is the result of a motive force received by the engagement member 2100. For example, in some embodiments the actuator portion 2102 can include a surface or portion that allows a user to manually grasp or manipulate the engagement member 2100 to move the engagement member 2100 relative to the frame 110. In other embodiments, the actuator portion 2102 is operably coupled to receive the motive force from a spring (e.g., spring 3210 depicted in FIG. 16) or an electrical machine (not shown).

To transition between the unlock position ($U_P$) and the lock position ($L_P$), the engagement member 2100 is rotatable about a pivot axis ($A_P$). In some embodiments, such as depicted in FIGS. 5 and 6, the pivot axis ($A_P$) is perpendicular to the longitudinal axis (L). Also, the pivot axis ($A_P$) is substantially vertical on a condition that the longitudinal axis (L) is substantially horizontal. Additionally, in some embodiments, the pivot axis ($A_P$) is laterally displaced from the longitudinal axis (L). In such embodiments, the engagement member 2100 pivots in the direction shown by arrow $A_3$ to transition from the lock position ($L_P$) to the unlock position ($U_P$) and in the direction shown by arrow $A_4$ to transition from the unlock position ($U_P$) to the lock position ($L_P$).

As depicted in FIGS. 5 and 6, the engagement member 2100 includes the contact face 2104. The contact face 2104 is configured to contact an outer surface of the distal portion 103 of the slide 102 on a condition that the engagement member 2100 is in the lock position ($L_P$). The contact between contact face 2104 and the slide 102 can limit movement of the slide 102. A portion of the engagement member 2100 forming the contact face 2004 can have a length that is less than the width of the slide 102. For example, in some embodiments, the engagement member 2100 can extend radially outward from the pivot axis ($A_P$) by a distance that is less than 50% (e.g., 25%) more than 5% of the width of the slide 102. In some embodiments, it is desirable that the length of the extension of the engagement member 2100 in the lock position ($L_P$) from the pivot axis ($A_P$) limit the motion of the slide 102 while also being minimized. Minimizing the length of the extension of the engagement member 2100 can frustrate efforts to force the contact face 24 out of contact with the distal portion 103 of the slide 102 2 gain unauthorized access to the handgun in an operational state.

In some embodiments, the contact face 2104 can be in contact with a portion of the slide 102 when the safety system 2000 is both in the locked configuration and in the unlocked configuration, but the engagement member 2100 limits a motion of the slide 102 only when the system is in the locked configuration. In some embodiments, a clearance can be established between the contact face 2104 and the portion of the slide 102 when the safety system 2000 is in the unlocked configuration. Similarly stated, the contact face 2104 can be spaced apart from the slide 102 when the safety system 2000 is in the unlocked configuration. As depicted in FIG. 5, the contact face 2104 is on a plane that is substantially orthogonal to the longitudinal axis (L) on a condition that the engagement member 2100 is in the lock position ($L_P$). The contact face 2104 is configured to traverse an arc of at least 90 degrees on a condition that the engagement between 100 is rotated to the unlock position ($U_P$) as depicted in FIG. 6.

As described for previous embodiments, in some embodiments, the lock position ($L_P$) corresponds to a separation distance (SD) between the distal end 146 of the primer actuator 144 of the handgun 100 and a primer activation plane ($PL_{ACT}$) of the handgun 100. In other words, the movement of the slide 102 (and the resultant longitudinal movement of the supported primer actuator 144) in response to the portion of the motive force transferred by the engagement member 2100 transitioning to the lock position ($L_P$) establishes the separation distance (SD). Said another way, the proximal movement of the slide 102 results in a proximal shift of the design range of travel ($T_{PA}$) of the primer actuator 144 relative to the frame 110, and thus the barrel 120. Therefore, the separation distance (SD) has a magnitude that precludes contact between the distal end 146 of the primer actuator 144 (e.g., the firing pin) and the primer 136 of a chambered cartridge 130 even if the firing mechanism 140 is actuated, and the handgun 100 is rendered inoperable (e.g., made safe) so long as the separation distance (SD) is maintained.

In some embodiments, the lock position ($L_P$) corresponds to a fully-retracted position of the slide 102. In other words, when the engagement member 2100 is in the lock position ($L_P$), the slide 102 is generally at a point of maximal proximal travel (e.g., in contact with a proximal stop and/or aligned with a slide lock of the handgun 100). Said another way, in some embodiments, when the engagement member 2100 is in the lock position ($L_P$), the slide 102 is to the rear. The lock position ($L_P$) corresponding to the fully-retracted position of the slide 102 also corresponds to a maximal separation distance (SD) between the distal end 146 of the primer actuator 144 of the handgun 100 and the primer activation plane ($PL_{ACT}$) of the handgun 100. The movement of the slide 102 in the proximal direction to the fully-retracted position can eject a cartridge 130 from the chamber 128 of the barrel 120. The cartridge 130 is the ejected via an ejector mechanism (not shown) of the handgun 100. It should be appreciated that ejecting the cartridge 130 during the making safe of the handgun 100 may facilitate the storage of the handgun 100 with an empty chamber 128.

The unlock position ($U_P$) corresponds to a design position of the distal end 146 of the primer actuator 144 along the design range of travel ($T_{PA}$). The design position may be proximal to the primer activation plane ($PL_{ACT}$) such that a nominal clearance exists between the distal end 146 and the primer 136. In some embodiments, the design position corresponds to the longitudinal position of the distal end 146 when the handgun 100 is in an uncocked state with the slide 102 in the default, slide-forward position. However, in additional embodiments, the design position corresponds to the design longitudinal position of the distal end 146 when the handgun 100 is in a half-cocked state or a cocked (e.g., fully cocked) state with the slide 102 in the default, slide-forward position. In other words, when the engagement member 2100 is in the unlock position ($U_P$), the handgun 100 may be in, or may transition to an operational state/condition from which the handgun 100 may be discharged to engage a target.

As depicted in FIG. 6, in some embodiments transitioning the engagement member 2100 from the lock position ($L_P$) to the unlock position ($U_P$) (such as via the rotation of the engagement member 2100 in the direction indicated by arrow $A_4$) facilitates a distal movement (see the arrow DM) of the slide 102. In other words, the transition (e.g., the rotation) of the engagement member 2100 to the unlock position ($U_P$) may remove a restriction on the longitudinal movement (e.g., movement in the distal direction relative to the frame 110) of the slide 102, thereby allowing the slide 102 to return to the design, default slide-forward position (as depicted in FIG. 1) in response to the force applied via the recoil spring 104.

In some embodiments, the distal movement (DM) of the slide 102 seats (shown by the arrow S) a cartridge 130 in the chamber 128 of the handgun 100. For example, unlocking of the safety system 2000 permits the transition of the engagement member 2100 from the lock position ($L_P$) to the unlock position ($U_P$). This transition allows the slide 102 to move distally. In accordance with the designed operation of the handgun 100, the distal movement of the slide 102 strips a cartridge 130 from a loaded magazine (not shown) inserted in the handgun 100 and seats (S) the cartridge 130 in the chamber 128. In other words, in some embodiments, the unlocking of the safety system 2000 results in the chambering of a cartridge 130 (e.g., seating (S) a cartridge 130 in the chamber 128) and the placing of the handgun 100 in an operational state, from which the handgun 100 may be discharged/employed.

In some embodiments, the safety system 2000 includes the lock mechanism 2200, which is operably coupled to the engagement member 2100. The lock mechanism 2200 is positioned to restrict the movement of the engagement member 2100 from the lock position ($L_P$) while the lock mechanism is engaged. In other words, the lock mechanism 2200 maintains the engagement member 2100 (and therefore the engaged slide 102) in a fixed position (e.g., the lock position ($L_P$)) relative to the frame 110. In some embodiments, the lock mechanism 2200 may be a mechanical lock mechanism wherein the lock mechanism 2200 mechanically engages a portion of the engagement member 2100, such as via at least one pin, a catch, a locking bar, a cam, and/or other suitable structure. In some embodiments, the lock mechanism 2200 may utilize a magnetic force to restrict the movement of the engagement member 2100. For example, the lock mechanism 2200 may be configured to magnetically engage the engagement member 2100 directly or may utilize a magnetic field to restrict the rotation of a component of the safety system 2000 to which the engagement member 2100 is rotationally coupled.

On a condition that the lock mechanism 2200 is transitioned to a disengaged state, the engagement member 2100 is released to rotate relative to the frame 110 from the lock position ($L_P$) toward the unlock position ($U_P$). The rotation of the engagement member 2100 can be in response to a motive force applied to the engagement member 2100. In some embodiments, the motive force can be developed by the transition of a deformable member (e.g., a spring, such as spring 3210 (FIG. 16), and/or an elastomeric member) from a potential state to a released state. In some embodiments, the motive force can be developed by an electrical machine (e.g., a motor, a servo, or a piezoelectric motor). The electrical machine can be positioned to apply the motive force to the engagement member 2100 in response to the lock mechanism 2200 being transitioned to the disengaged state. In some embodiments, the motive force can be developed by the distal movement of the slide 102 in response to the force exerted on the slide 102 by the recoil spring assembly 104. In some embodiments, the engagement member 2100 is shaped such that a force vector resulting from a force (e.g., the motive force) applied to the engagement member 2100 by the distal movement of the slide 102 is non-parallel to the longitudinal axis (L) and produces a rotation of the engagement member 2100.

As further depicted in FIGS. 5 and 6, the safety system 2000 includes the user interface 2300, which is operably coupled to the lock mechanism 2200. The user interface 2300 is configured to transition the lock mechanism 2200 between an engaged state and a disengaged state. In other words, the user interface 2300 is employed by an authorized user to facilitate the movement of the engagement member 2100 between the lock position ($L_P$) and the unlock position ($U_P$) by locking or unlocking the lock mechanism 2200. Once unlocked, the safety system 2000 remains unlocked until the locking mechanism 2200 is affirmatively reengaged by an operator.

The user interface 2300 may include a biometric user identification (e.g., fingerprint identification) unit, a radio frequency identification reader, a numerical input apparatus, a microphone, a magnetic key, a mechanical key, and/or other input system configured to authenticate an authorized user. For example, the user interface 2300 may, in some embodiments, include a fingerprint sensor operably coupled to a biometric processor and a data storage device containing stored identification data for authorized users. The fingerprint sensor may be an optical sensor, a thermal sensor, and/or a pressure sensor and may be configured as a static sensor or a swipe sensor. Additionally, in some embodiments the user interface 2300 includes a wireless communication unit that facilitates the remote operation of the safety system 2000 via a wireless network, a cellular network, and/or a Bluetooth connection.

In some embodiments, a GPS module 2302 is operably coupled to the user interface 2300. The GPS module 2302 facilitates position tracking of the handgun 100 via the safety system 2000 coupled thereto. For example, the GPS module 2302 may the employed in conjunction with a geo-fence (e.g., a region with boundaries that are defined by GPS coordinates). In some embodiments an embodiment, an authorized user of the handgun 100 may be alerted in the event the handgun 100 departs the geo-fence. In additional embodiments, the user interface 2300 may be disabled upon the departure of the handgun 100 from the geo-fence. In further embodiments, the user interface 2300 may be configured to transition the lock mechanism 2200 to, or maintain the lock mechanism 2200 in, the engaged state following the departure of the handgun 100 from the geo-fence.

In some embodiments, the safety system 2000 includes a housing 2500. The housing 2500 provides the structure for support and mounting of the safety system 2000 to the handgun 100. The housing 2500 is formed from materials having sufficient strength to prevent access to internal components of the safety system 2000. For example, in various embodiments, the housing 2500 is formed from a metal, a reinforced plastic, and/or composite. In some embodiments, the housing 2500 is the unitary structure defining at least one internal cavity. In other embodiments, the housing 2500 is formed by the coupling of multiple housing members that are separately formed. For example, the housing 2500 may be formed at least from a first housing half and a second housing half.

As depicted in FIGS. 5 and 6, the housing 2500 supports the user interface 2300. For example, the housing 2500 may define an external recess in which the user interface 2300 may be secured. The housing 2500 includes a coupling portion 2510. The coupling portion 2510 is configured to receive a portion of the handgun 100, such as the mounting structure 116. In other words, the housing 2500, and thus the safety system 2000, may be fixedly coupled to the handgun 100 via an interface between the coupling portion 2510 and the mounting structure 116. The housing 2500 may, for example, be coupled to the handgun 100 and a position that is forward of the trigger guard 114. As depicted in FIGS. 5 and 6 the positioning of safety system 2000, in some embodiments, establishes a spacing between the housing 2500 and the trigger guard 114. However, in some embodiments, the housing 2500 is formed to conform with a portion of the trigger guard 114 and is positioned in contact therewith.

In some embodiments, the housing 2500 also defines a lock cavity 2520 containing at least a portion of the lock mechanism 2200. The lock cavity 2520 may, for example, be defined by an inner face of the housing 2500. Additionally, the housing 2500 defines an interface orifice (not shown). The interface orifice is oriented to facilitate the operable coupling of the engagement member 2100 to the lock mechanism 2200. The interface orifice can, for example, correspond to a slot or hole through which a portion of the engagement member 2100 may be inserted. The interface orifice is sized to facilitate a desired degree of travel of the engagement member 2100.

Figure 7:
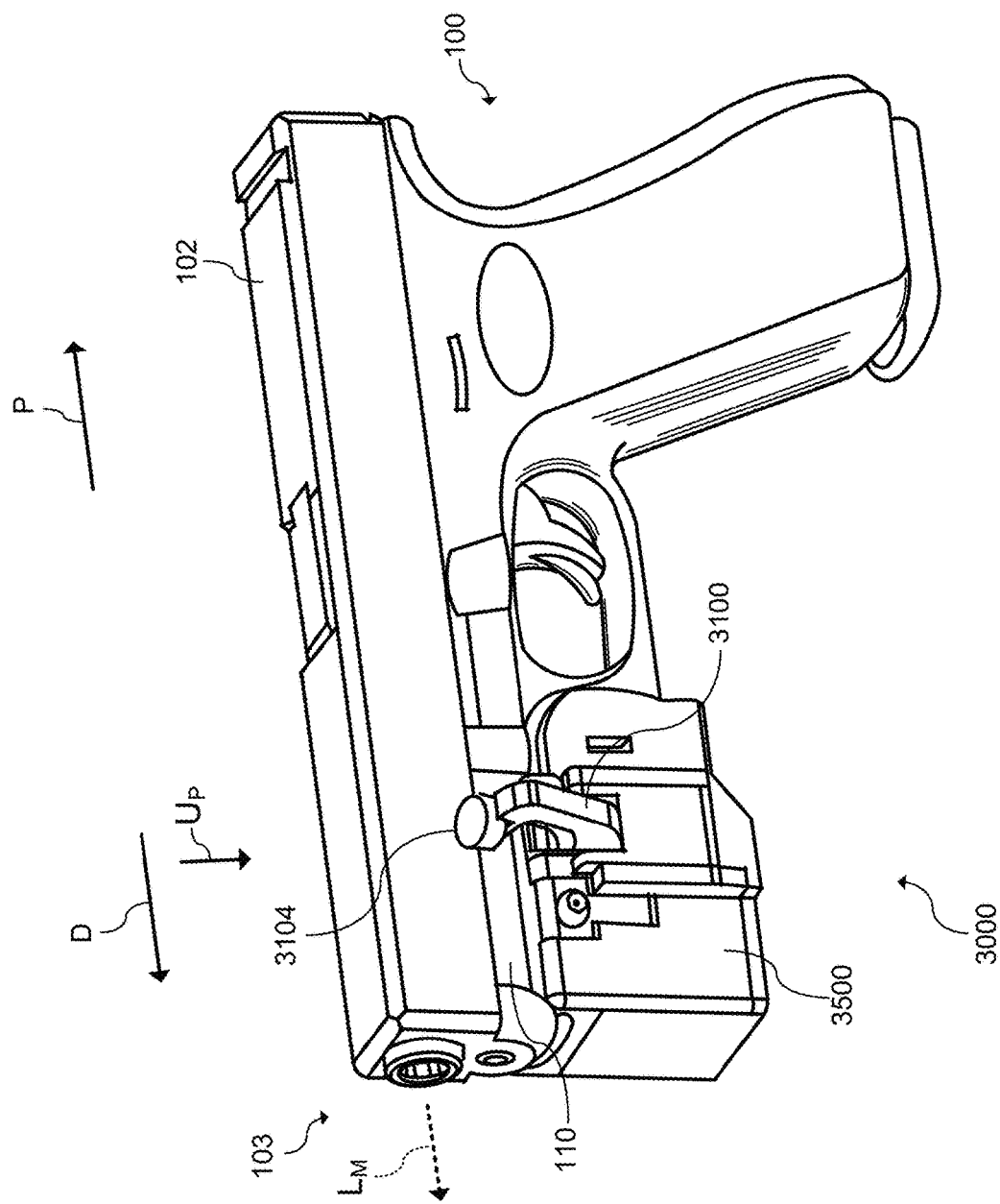
FIG. 7 is a perspective view of a handgun with a safety system coupled thereto, with the safety system being depicted in an unlock configuration.
Figure 8:
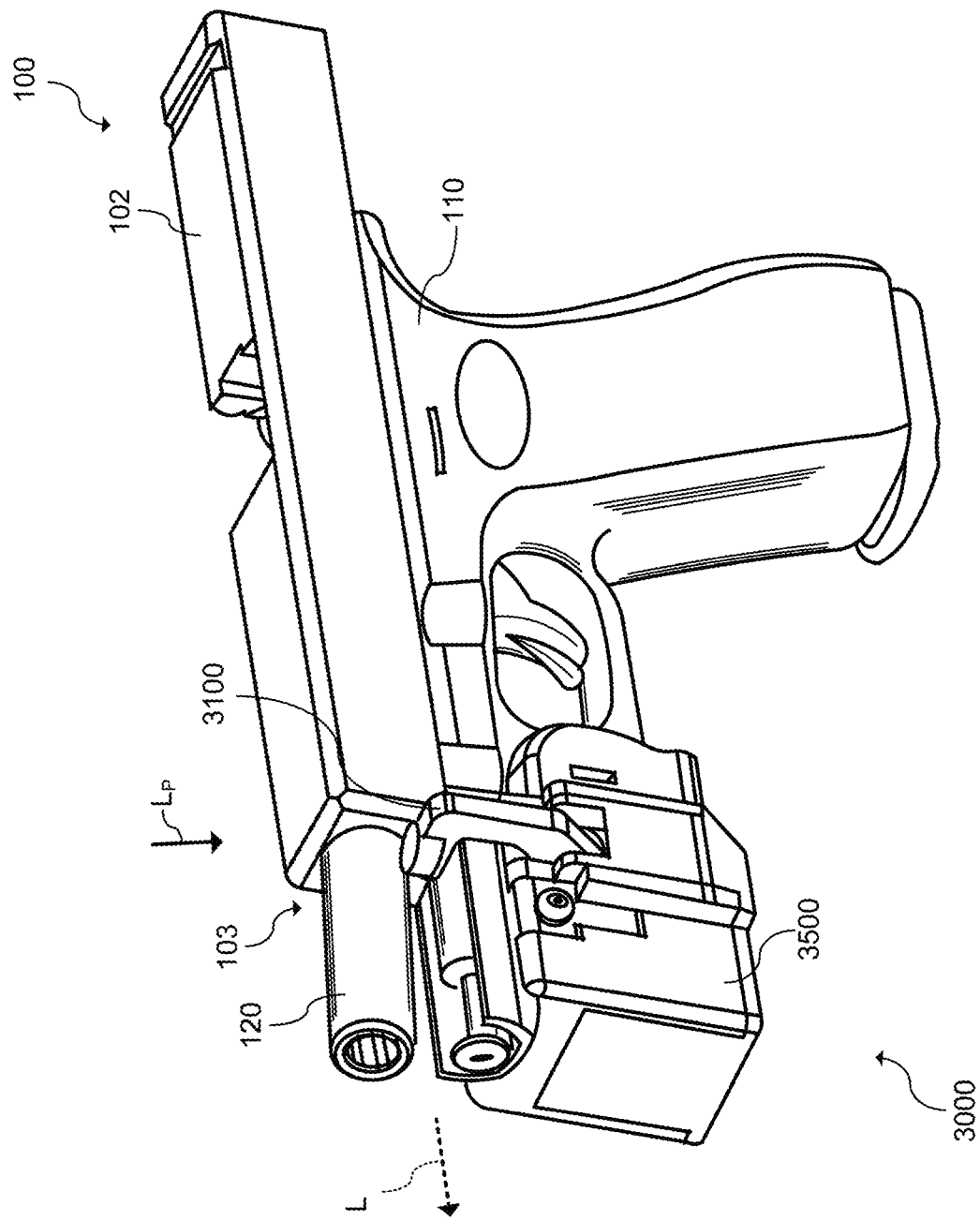
FIGS. 8 and 9 are a perspective side views of the handgun and safety system of FIG. 7, with the safety system being depicted in a lock configuration.
Figure 9:
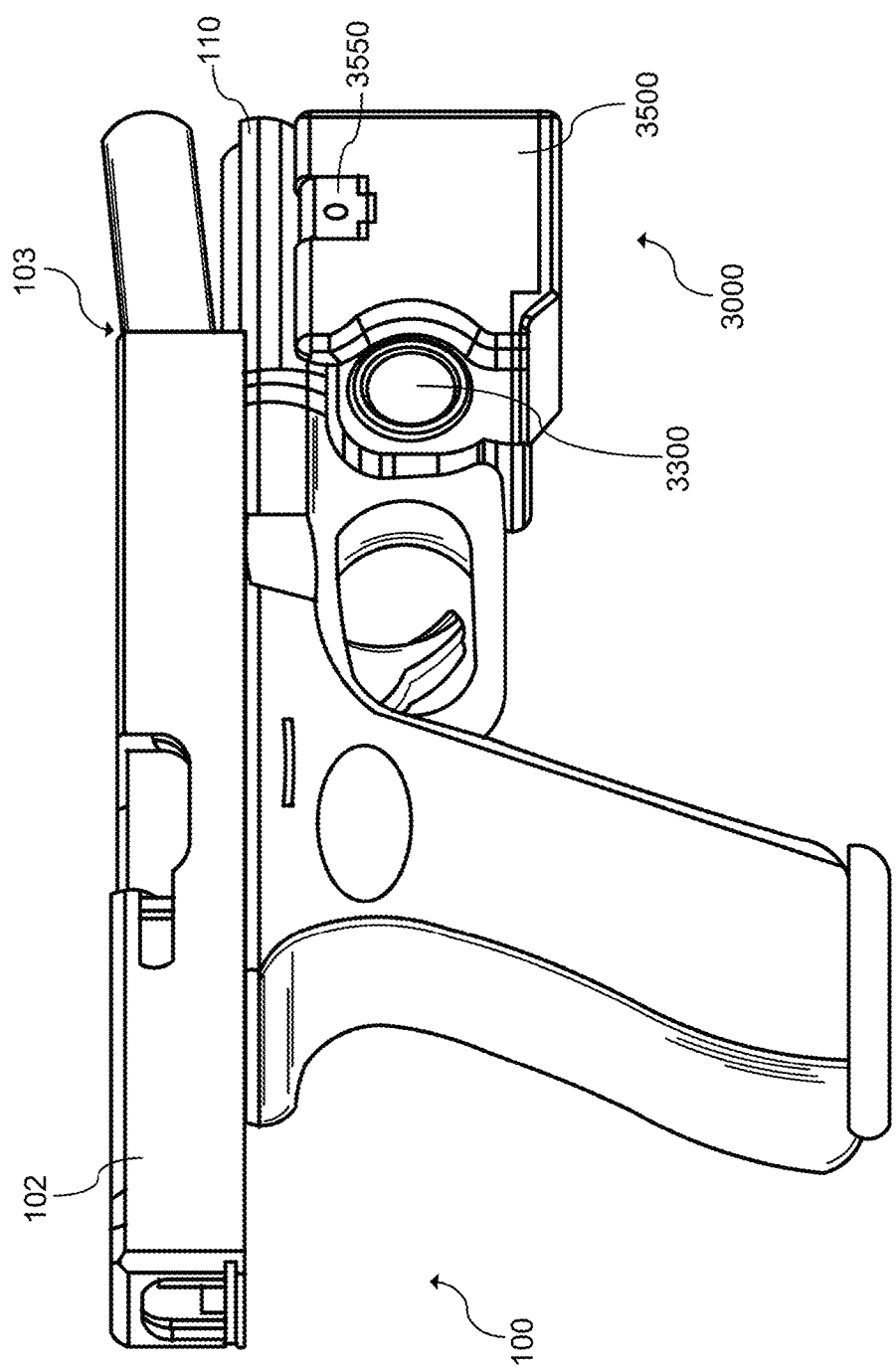

Although as described above, the engagement member 2100 of the safety system 2000 is rotatable about the pivot axis ($A_P$) that is perpendicular to the longitudinal axis (L), in other embodiments, any of the safety systems described herein can include pivot axis in different orientations relative to the longitudinal axis (L). For example, FIGS. 7-9 are perspective views of a safety system 3000 for a handgun coupled to a portion of the handgun 100. As described for previous embodiments, in some embodiments the safety system 3000 develops a forced malfunction of the handgun 100 that precludes the handgun 100 from discharging when the safety system 3000 is in a locked configuration. In some embodiments, the safety system 3000 is coupled to an existing handgun 100 as depicted in FIGS. 7-9. Although shown and described as being coupled to the handgun 100, the safety system 3000 can be coupled to and/or used with any suitable firearm. The safety system 3000 can include any of the features or elements described herein in reference to any other safety system. The handgun 100 can include any of the features or elements described herein with reference to any other handgun.

Figure 10:
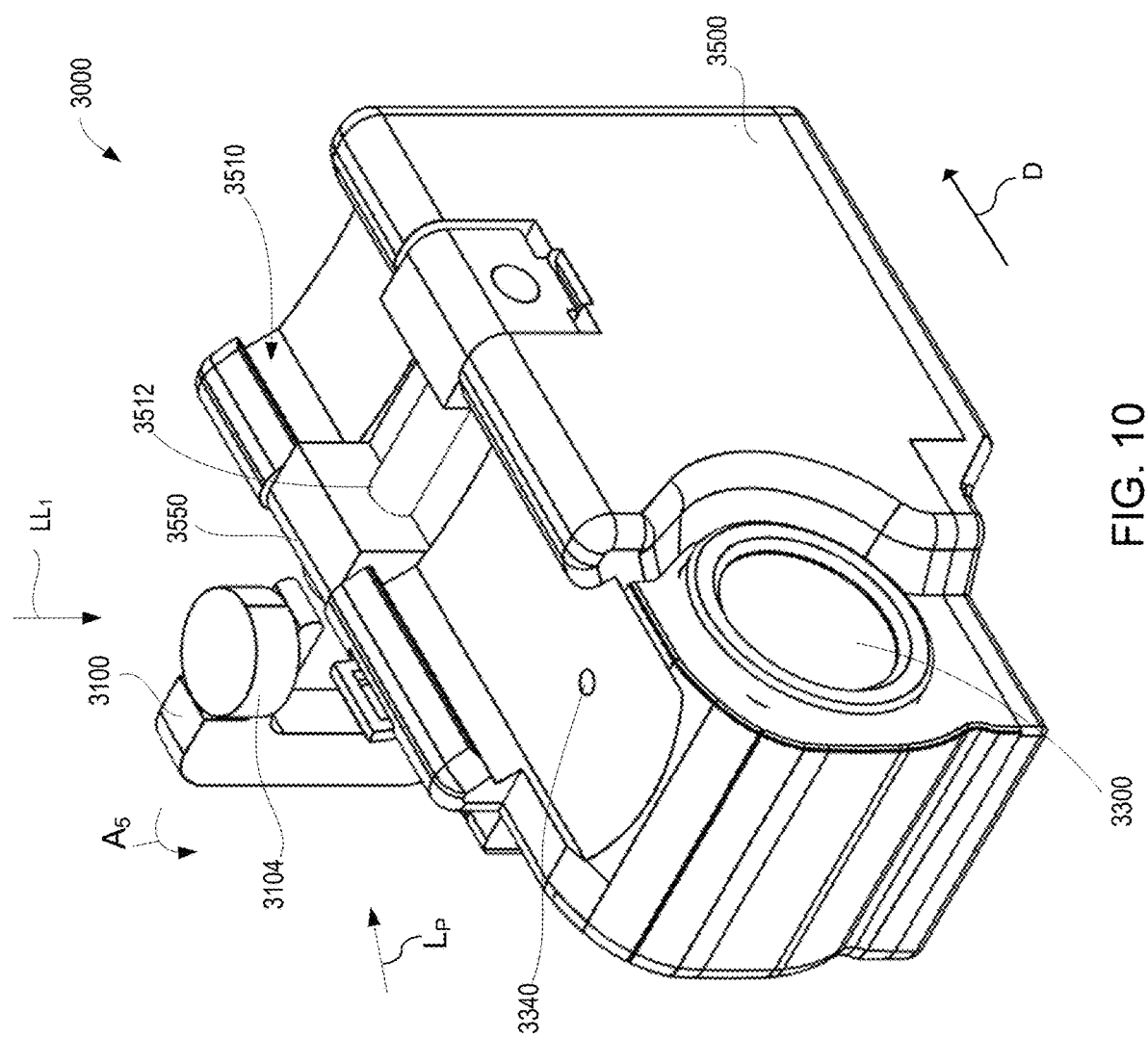
FIG. 10 is a perspective view of the safety system of FIG. 7 in the lock configuration.
Figure 11:
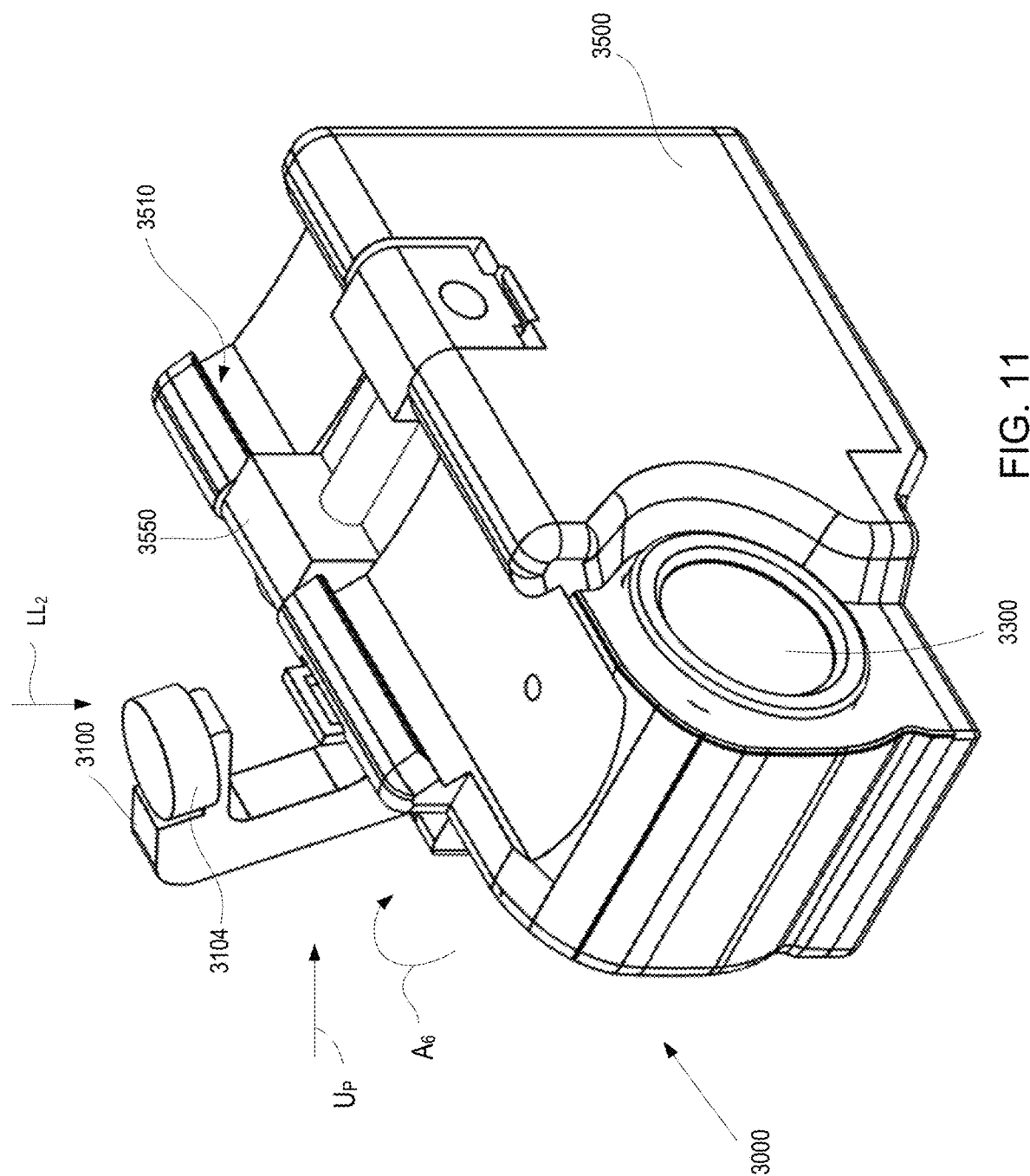
FIGS. 11 and 12 are perspective views of the safety system of FIG. 7 in the unlock configuration.
Figure 12:
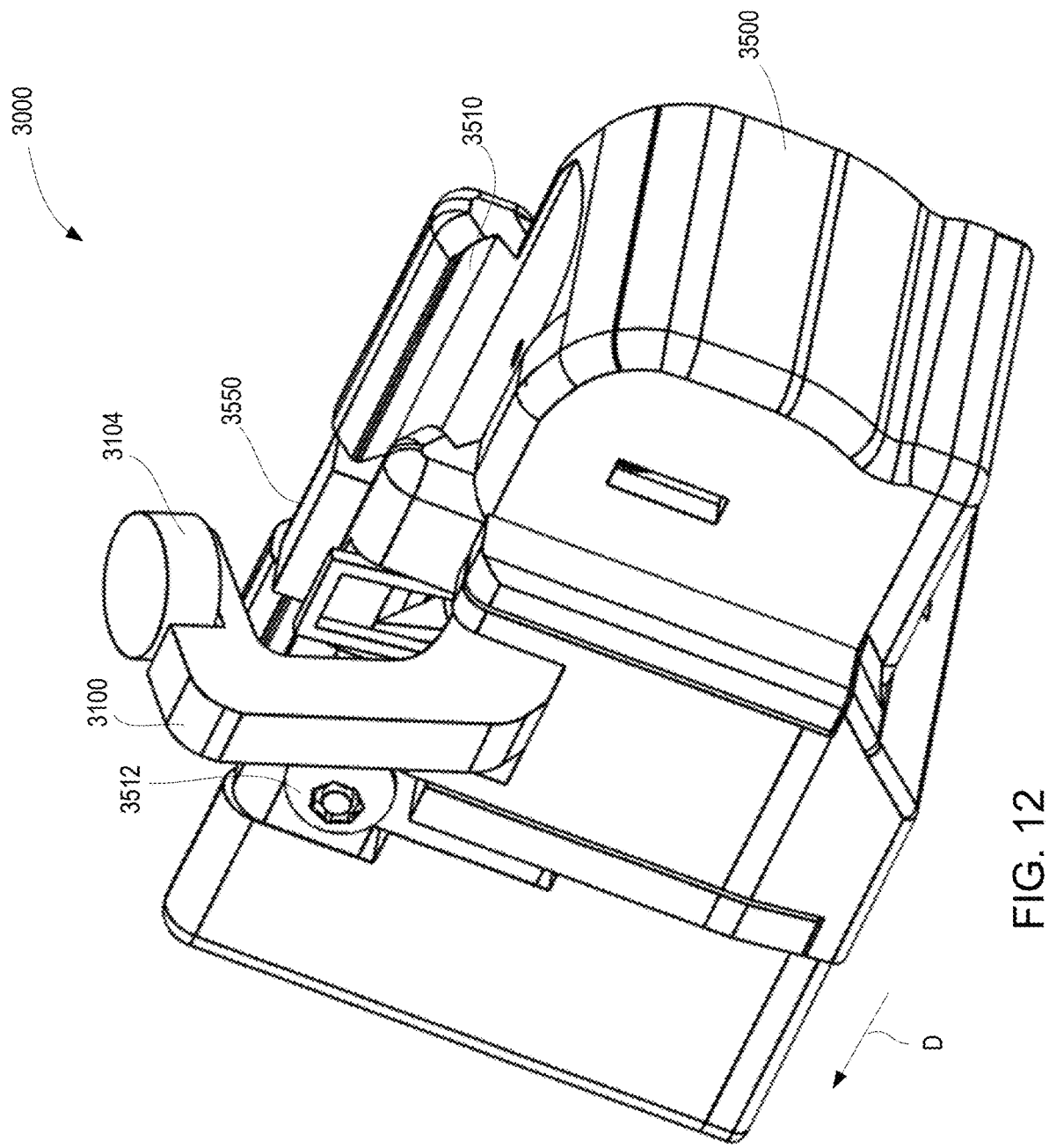
Figure 13:
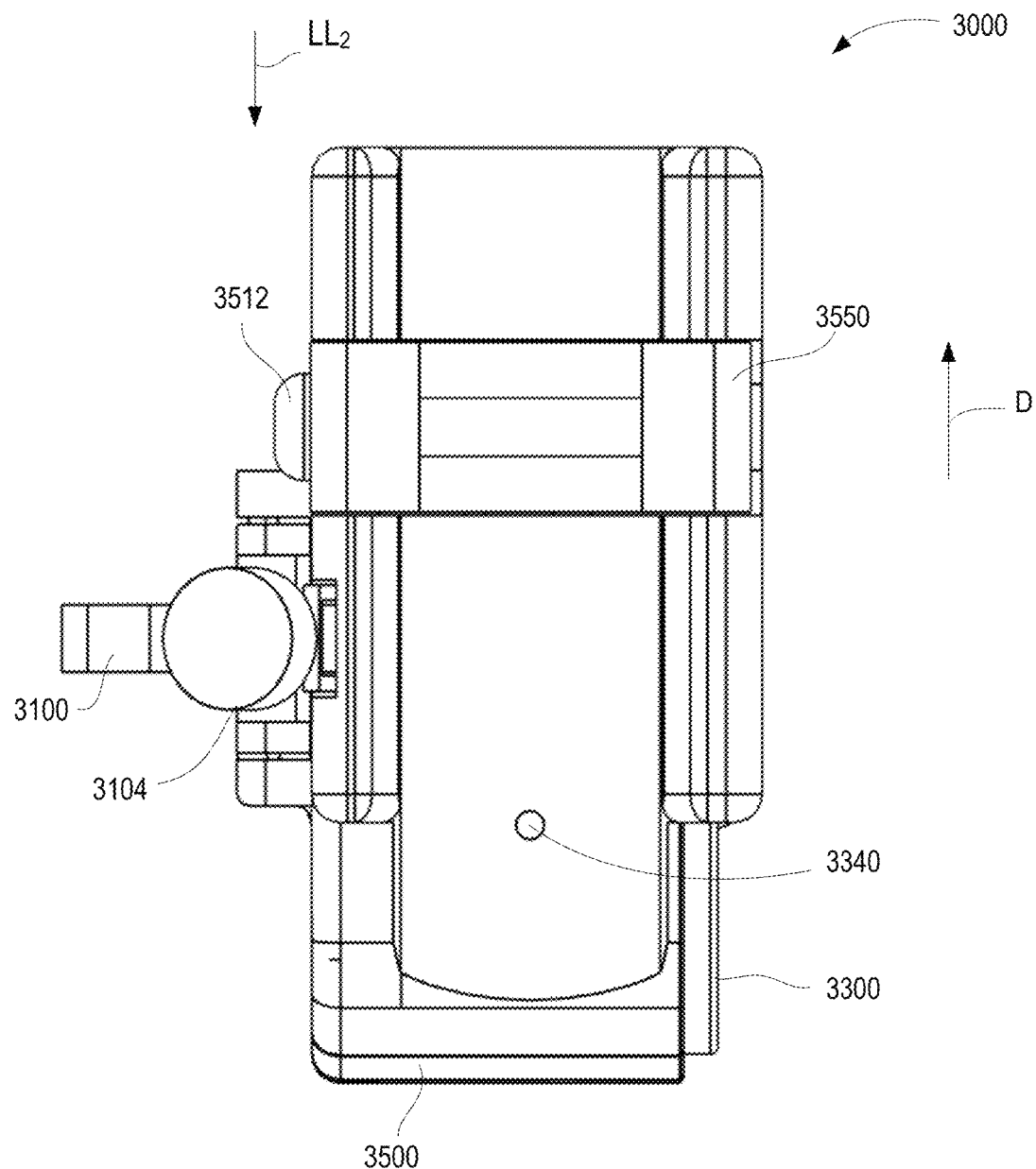
FIG. 13 is a top view of the safety system of FIG. 7 in the unlock configuration.
Figure 14:
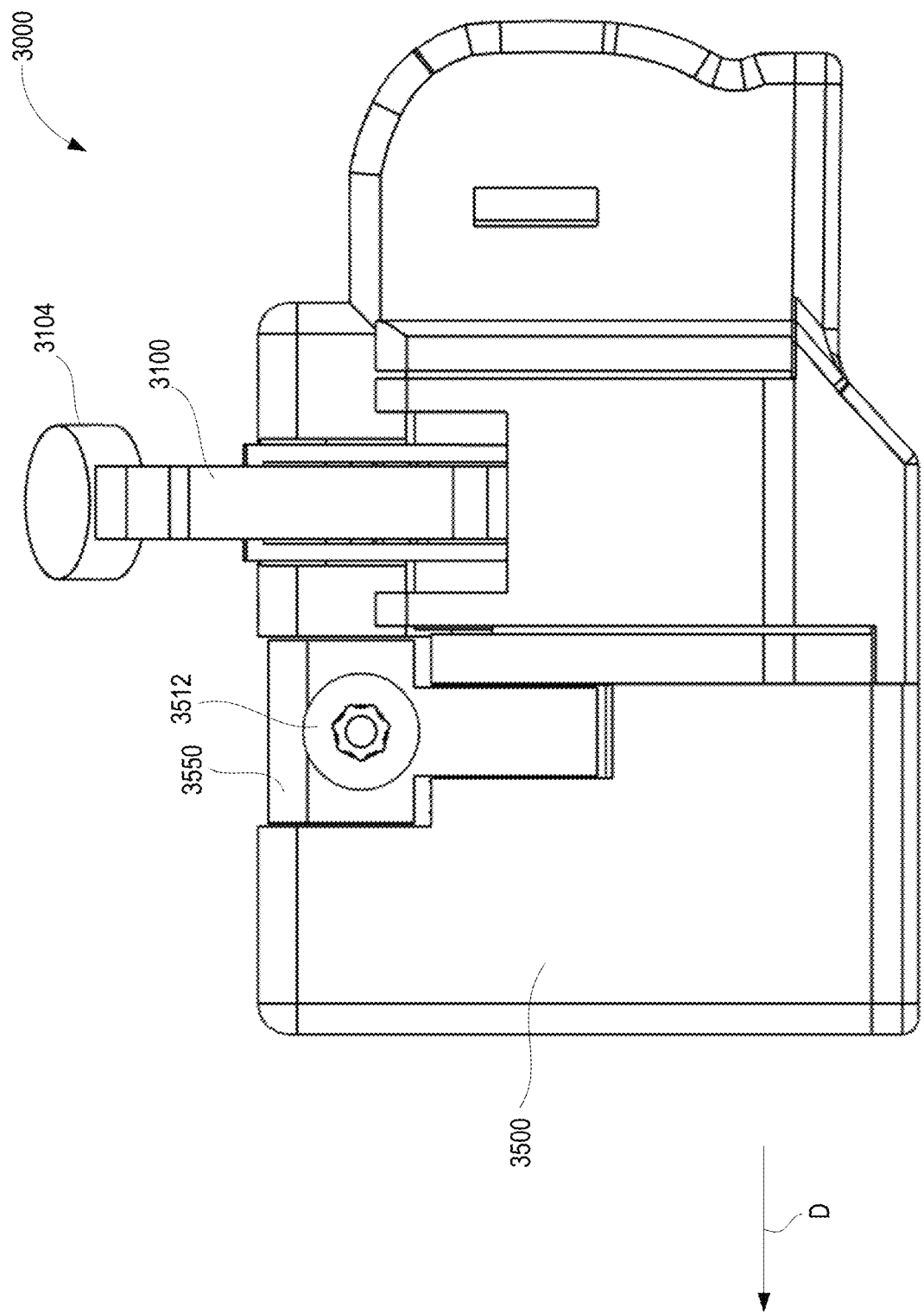
FIGS. 14 and 15 are side views of the safety system of FIG. 7 in the unlock configuration.
Figure 15:
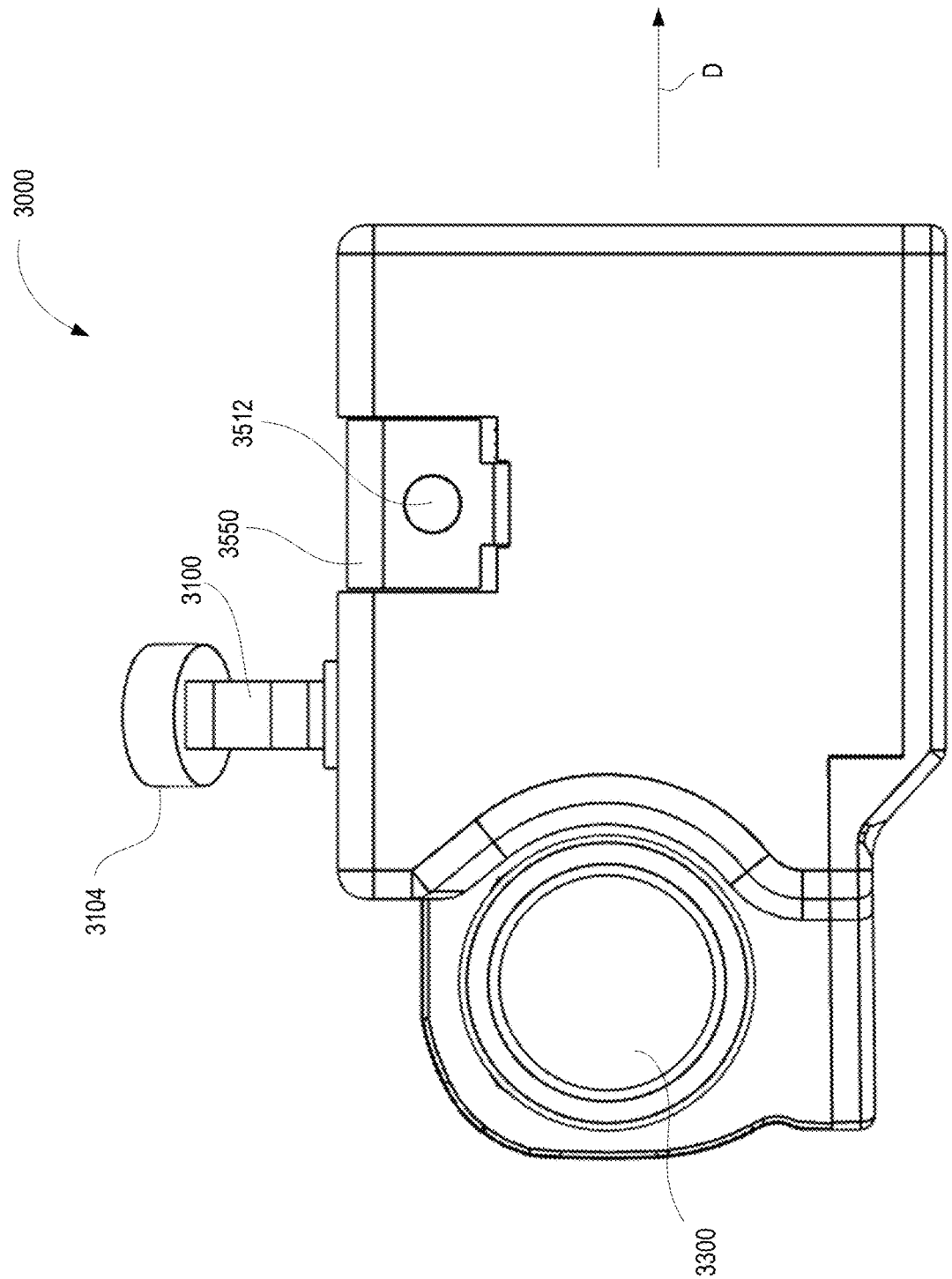
Figure 16:
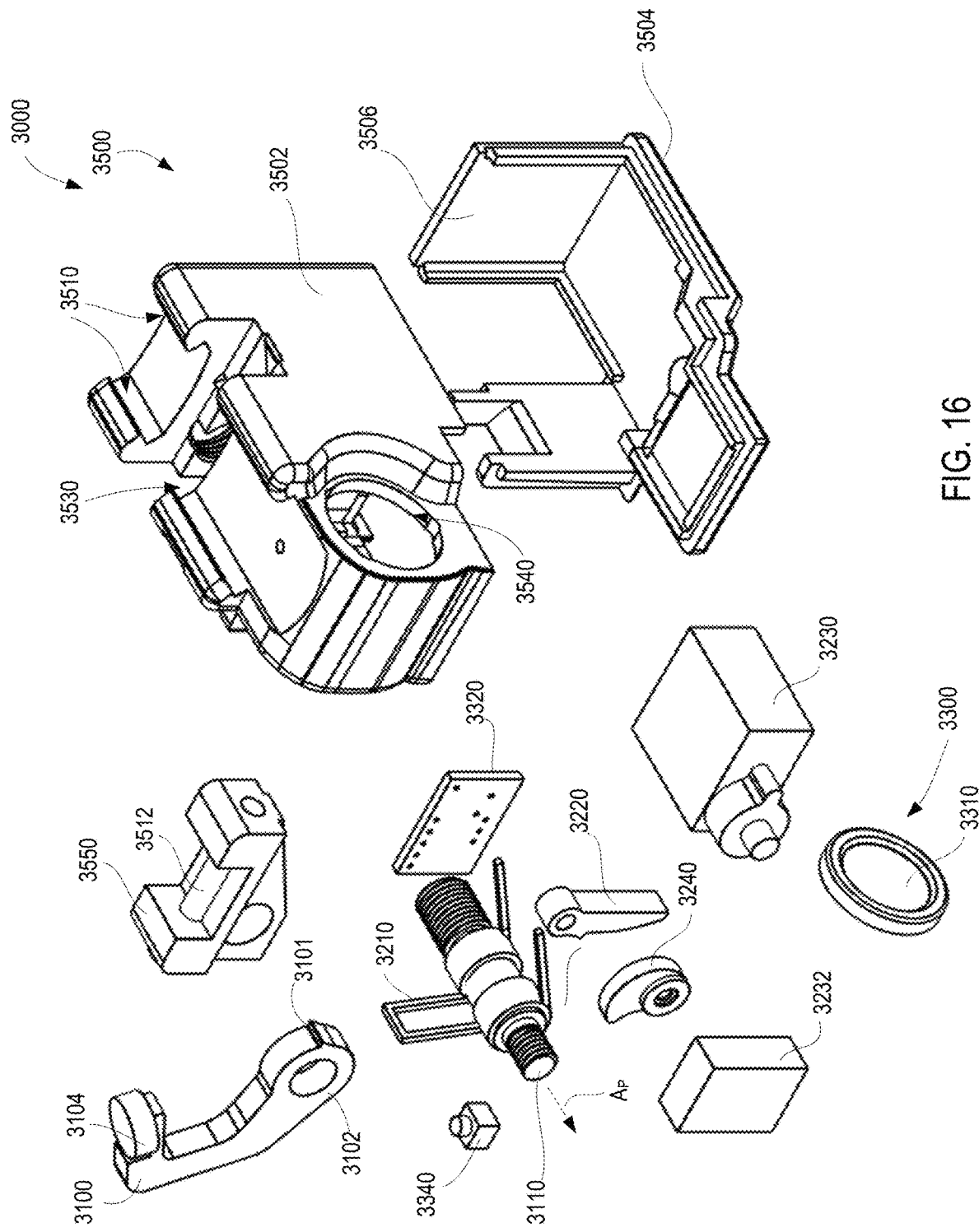
FIG. 16 is an exploded view of the safety system of FIG. 7.
Figure 17:
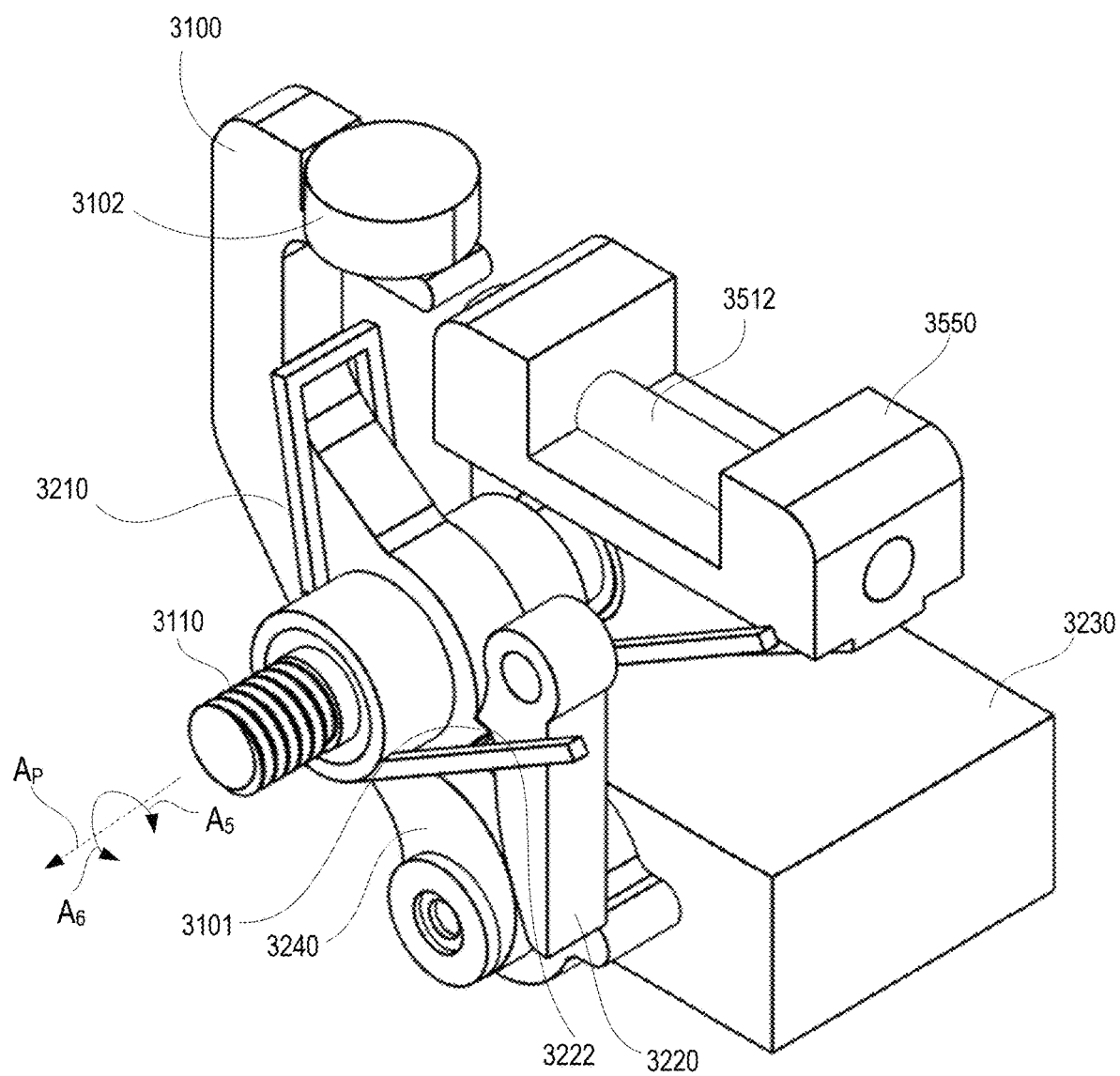
FIGS. 17 and 18 are perspective and front views of a portion of the safety system of FIG. 7 with the housing removed to display internal components of the safety system, the lock mechanism being depicted in an engaged state.
Figure 18:
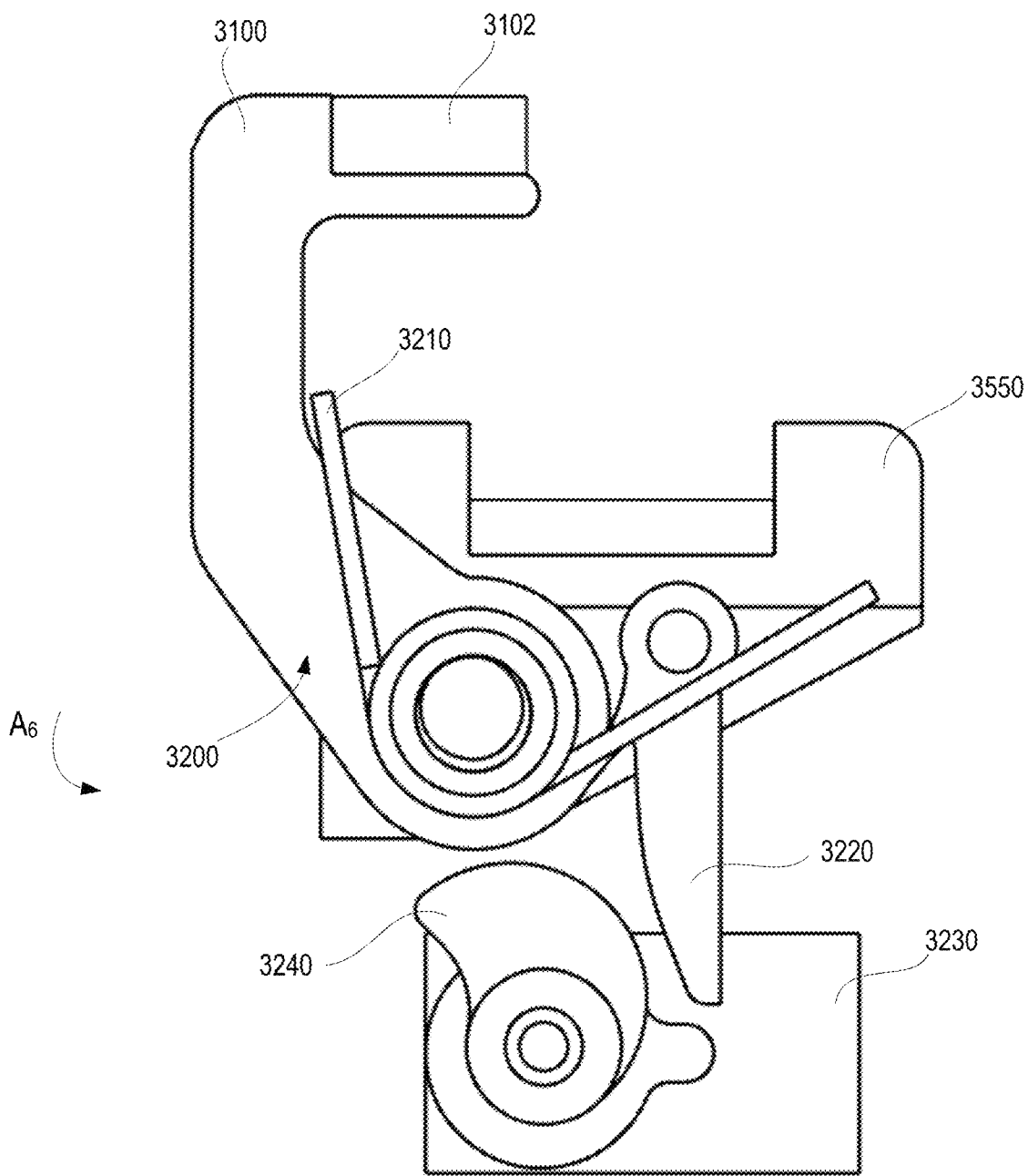

In FIG. 7, the safety system 3000 is depicted in an unlocked configuration, with an engagement member 3100 in an unlock position (UP), and the slide 102 in a default slide-forward position, wherein the handgun 100 may be discharged. FIG. 8 is a perspective view of the safety system 3000 coupled to the handgun 100 from a first perspective. In FIG. 8, the safety system 3000 is depicted in a locked configuration, with the engagement member 3100 in a lock position ($L_P$), and the slide 102 in a proximal position that precludes operation of the handgun 100. FIG. 9 is a perspective view of the safety system 3000 coupled to the handgun 100 from a second perspective that is opposite the first perspective. In FIG. 9, the configuration of the safety system 3000 is not depicted, but the slide 102 is shown in a proximal (e.g., rearward position). The slide 102 in FIG. 9 can be held in the proximal position either by the safety system 3000 with the engagement member 3100 in the lock position (LP) and/or via a slide lock (not shown) of the handgun 100. FIG. 10 is a perspective view of the safety system 3000 in the locked configuration. FIGS. 11 and 12 are perspective views of the safety system 3000 in an unlocked configuration. FIGS. 13-15 are top and side views of the safety system 3000 in the unlocked configuration. FIG. 16 is an exploded view of the safety system 3000. FIGS. 17 and 18 are perspective and front views of a portion of the safety system 3000 with the housing 3500 removed to display a portion of the internal components of the safety system 3000.

Referring to FIGS. 7-18, in some embodiments, the safety system 3000 includes an engagement member 3100, a lock mechanism 3200, a user interface 3300. As described in more detail below, the safety system 3000 can allow the handgun 100 to be selectively locked (or placed in a safe, "no-fire" condition) and unlocked while remaining coupled to the handgun 100. The engagement member 3100 is formed from a rigid material selected to resist tampering (e.g., prying) for a specified interval. The rigid material can have a yield strength of at least 340 mega pascals (e.g., at least 750 MPa), such as hardcoat anodized aluminum, a steel-iron-nickel alloy, stainless steel, tungsten, a titanium alloy, or other similar metals. In some embodiments, the engagement member 3100 is interchangeable or includes an interchangeable portion facilitating the use of the safety system 3000 on different handgun models.

The engagement member 3100 is movably coupled to the handgun 100 and can include an actuator portion 3102 and a contact face 3104. In other words, the engagement member 3100 may, in various embodiments, be configured to rotate relative to the frame 110 in accordance with the locked/unlocked configuration of the safety system 3000. The rotation of the engagement member 3100 is the result of a motive force received by the engagement member 3100. For example, in some embodiments the actuator portion 3102 can include a surface or portion that allows a user to manually grasp or manipulate the engagement member 2100 to move the engagement member 3100 relative to the frame 110. In other embodiments, the actuator portion 3102 is operably coupled to receive the motive force from a spring 3210 or an electrical machine (not shown).

To transition between the unlock position ($U_P$) and the lock position ($L_P$), the engagement member 3100 is rotatable with, or about, a shaft 3110 (such as depicted in FIGS. 16-18). In some embodiments, the shaft 3110 is positioned within a housing 3500 of the safety system 3000. The shaft 3110 defines a pivot axis ($A_P$). In some embodiments, such as depicted in FIGS. 7-18, the pivot axis ($A_P$) is parallel to the longitudinal axis (L). Additionally, in some embodiments, the pivot axis ($A_P$) is laterally displaced from the longitudinal axis (L). Said another way, on a condition that grip portion 112 is positioned in a hand of an operator of the handgun 100, the longitudinal axis (L) and the pivot axis ($A_P$) can lie on a plane that is substantially horizontal, with the pivot axis ($A_P$) being laterally offset from the longitudinal axis (L). In such embodiments, the engagement member 3100 pivots in the direction shown by arrow $A_5$ (FIG. 10) to transition from the lock position ($L_P$) to the unlock position ($U_P$) and in the direction shown by arrow $A_6$ (FIG. 11) to transition from the unlock position ($U_P$) to the lock position ($L_P$).

In some embodiments, the engagement member 3100 includes the contact face 3104 The contact face 1104 is configured to contact an outer surface of a distal portion 103 of the slide 102 on a condition that the engagement member 3100 is in the lock position ($L_P$). The contact between the contact face 3104 and the slide 102 can limit movement of the slide 102. In some embodiments, the contact face 3104 can be in contact with a portion of the slide 102 when the safety system 3000 is both in the locked configuration and in the unlocked configuration, but the engagement member 3100 limits a motion of the slide 102 only when the system is in the locked configuration. In other embodiments, a clearance may be established between the contact face 3104 and the portion of the slide 102 when the safety system 3000 is in the unlocked configuration, such as depicted in FIG. 7. Similarly stated, the contact face 3104 can be spaced apart from the slide 102 when the safety system 3000 is in the unlocked configuration, as depicted in FIG. 8. As depicted in FIG. 10, the contact face 3104 is at a first lateral location ($LL_1$) in response to the engagement member 3100 being in the lock position ($L_P$). In some embodiments, the first lateral location ($LL_1$) is laterally offset from longitudinal axis (L) defined by the midline of the slide 102. Said another way, in some embodiments, the engagement member 3100 does not cross the midline of the slide 102 when the safety system 3000 is in the locked configuration. As depicted in FIG. 13, the contact face 3104 is at second lateral location ($LL_2$) in response to the engagement member 3100 being in the unlock position ($U_P$). The second lateral location ($LL_2$) is displaced from the longitudinal axis (L) a greater distance than the first lateral location ($LL_1$). On a condition that the contact face 3104 is at the second lateral location ($LL_2$), the engagement member 3100 is a visual indication that the safety system is in the unlocked configuration. Although the contact face 3104 is shown as being a curved surface, in other embodiments, the contact face 3104 can have any suitable shape.

As described herein in reference to the safety system 1000 and the safety system 2000, a distal end of a primer actuator of the handgun 100 is maintained spaced apart from a primer activation plane of the handgun 100 by a separation distance in response to the engagement member 3100 being in the lock position ($L_P$). Said another way, a proximal positioning of the slide 102 stemming from the proximal movement of the slide 102 results in a proximal shift of the design range of travel of the primer actuator relative to the frame 110, and thus the barrel 120. In some embodiments, the proximal position of the slide 102 when the engagement member 3100 is in the lock position ($L_P$) can be a fully-retracted position (e.g., a slide-lock position as depicted in FIGS. 8 and 9) of the slide 102. It should be appreciated that, in some embodiments, the slide release of the handgun can be actuated after rotating the engagement member 3100 into the lock position ($L_P$). The actuation of the slide release can bring the distal portion 103 of the slide 102 into contact with the contact face 3104 of the engagement member 3100 in the lock position ($L_P$).

The separation distance has a magnitude that precludes contact between the distal end of the primer actuator (e.g., the firing pin) and the primer of a chambered cartridge even if the firing mechanism is actuated. Said another way, the magnitude of the separation distance is such that the point of maximal distal travel is proximal to, and separated from, the primer activation plane. Insofar as the separation distance precludes any contact between the primer actuator and the primer, the handgun 100 is rendered inoperable (e.g., made safe) so long as the separation distance is maintained.

As depicted in FIG. 8, in some embodiments, the lock position ($L_P$) corresponds to a fully-retracted position of the slide 102. In other words, when the engagement member 3100 is in the lock position ($L_P$), the slide 102 is near a point of maximal proximal travel at which a slide lock of the handgun 100 is configured to engage the slide 102. Said another way, in some embodiments, when the engagement member 3100 is in the lock position ($L_P$), the slide 102 is to the rear. The lock position ($L_P$) corresponding to the fully-retracted position of the slide 102 also corresponds to a maximal separation distance between the distal end of the primer actuator of the handgun 100 and the primer activation plane of the handgun 100.

The unlock position ($U_P$) corresponds to a design position (similar to the design position $P_N$ shown in FIG. 3) of the distal end of the primer actuator along the design range of travel. The design position may be proximal to the primer activation plane such that a nominal clearance exists between the distal end and the primer. In some embodiments, the design position corresponds to the longitudinal position of the distal end when the handgun 100 is in an uncocked state with the slide 102 in the default, slide-forward position. However, in additional embodiments, the design position corresponds to the design longitudinal position of the distal end when the handgun 100 is in a half-cocked state or a cocked (e.g., fully cocked) state with the slide 102 in the default, slide-forward position. In other words, when the engagement member 3100 is in the unlock position ($U_P$), the handgun 100 may be in an operational state/condition from which the handgun 100 may be discharged to engage a target.

In some embodiments transitioning the engagement member 3100 from the lock position ($L_P$) to the unlock position ($U_P$) facilitates a distal movement of the slide 102. In other words, the transition (e.g., the linear movement) of the engagement member 3100 to the unlock position ($U_P$) may remove a restriction on the longitudinal movement (e.g., movement in the distal direction relative to the frame 110) of the slide 102, thereby allowing the slide 102 to return to the design, default slide-forward position (as depicted in FIG. 1) in response to the force applied via the recoil spring 104.

In some embodiments, the distal movement of the slide 102 seats a cartridge in the chamber of the handgun 100. For example, unlocking of the safety system 3000 permits the transition of the engagement member 3100 from the lock position ($L_P$) to the unlock position ($U_P$). This transition allows the slide 102 to move distally (e.g., such as in response to the release of a slide lock of the handgun 100). In accordance with the designed operation of the handgun 100, the distal movement of the slide 102 strips a cartridge from a loaded magazine inserted in the handgun 100 and seats the cartridge in the chamber. In other words, in some embodiments, the unlocking of the safety system 3000 results in the chambering of a cartridge and the placing of the handgun 100 in an operational state, from which the handgun 100 may be discharged/employed.

As depicted in FIGS. 16-18, the safety system 3000 includes a lock mechanism 3200 operably coupled to the engagement member 3100. The lock mechanism 3200 is positioned to restrict the movement of the engagement member 3100 from the locked position ($L_P$) while the lock mechanism 3200 is in an engaged state (as depicted in FIGS. 17 and 18). In other words, the lock mechanism 3200 maintains the engagement member 3100 (and therefore the engaged slide 102) in a fixed position (e.g., the lock position ($L_P$)) relative to the frame 110. On a condition that the lock mechanism 3200 is transitioned to a disengaged state, the engagement member 3100 is released to rotate relative to the frame 110 from the lock position ($L_P$) toward the unlock position ($U_P$). The rotation of the engagement member 3100 can be in response to a motive force applied to the engagement member 3100. In some embodiments, the motive force can be developed by the transition of a deformable member (e.g., a spring and/or an elastomeric member) from a potential state to a released state. In some embodiments, the motive force can be developed by an electrical machine (e.g., a motor, a servo, or a piezoelectric motor). The electrical machine can be positioned to apply the motive force to the engagement member 3100 in response to the lock mechanism 3200 being transitioned to the disengaged state. In some embodiments, the motive force can be developed by the distal movement of the slide 102 in response to the force exerted on the slide 102 by the recoil spring assembly 104. In some embodiments, the engagement member 1100 is shaped such that a force vector resulting from a force (e.g., the motive force) applied to the engagement member 3100 by the distal movement of the slide 102 is non-parallel to the longitudinal axis (L) and produces a rotation of the engagement member 3100.

As depicted in FIGS. 16-18, and some embodiments, the deformable member is a spring 3210. The spring 3210 is positioned to apply the motive force to the engagement member 3100. The spring 3210 has a potential state on a condition that the engagement member 3100 is in the lock position ($L_P$). The spring 3210 has a released state on a condition that the engagement member 3100 is in the unlock position ($U_P$). In some embodiments, the spring 3210 is, as depicted, a torsion spring (e.g., a hammer spring). However, in other embodiments, the spring 3210 can have other suitable configurations configured to apply the motive force to the engagement member 3100.

As particularly depicted in FIGS. 17 and 18, in some embodiments, the lock mechanism 3200 includes a sear 3220, an electrical machine 3230, and a cam 3240. The sear 3220 is removably coupled to the engagement member 3100 on a condition that the engagement member 3100 is at the lock position ($L_P$) and the sear 3220 is at a restrain position, such as depicted in FIGS. 17 and 18. The sear 3220 is configured to preclude rotation of the engagement member 3100 from the lock position ($L_P$) when the sear 3220 is coupled to the engagement member 3100. The sear 3220 is movable to a release position that permits the rotation of the engagement member 3100 from the lock position ($L_P$) to the unlock position ($U_P$). In other words, the sear 3220 is positioned to engage the engagement member 3100 when the engagement member 3100 is rotated (e.g., in response to a manual force applied to the engagement member 3100) from the unlock position ($U_P$) to the lock position ($L_P$). Therefore, in some embodiments, the sear 3220 is biased toward the restrain position. Upon engaging a portion of the engagement member 3100, the sear 3220 precludes the rotation of the engagement member 3100 in response to the motive force applied by the spring 3210 so long as the sear 3220 is maintained at the restrain position.

In some embodiments, the sear 3220 is a lever and includes a restraining structure 3222. The restraining structure 3222 can, for example, be a protrusion, a tooth, a ledge, and/or other similar structure positioned to engage a mating structure 3101 of the engagement member 3100. The mating structure 3101 can, for example, define a recess, or be a protrusion, a tooth, a ledge, and/or other similar structure positioned to engage the restraining structure 3222 when the engagement member 3100 is rotated to the lock position ($L_P$). For example, in some embodiments, a manual force can be applied by an operator of the handgun to the engagement member 3100 on a condition that the safety system 3000 is in an unlocked condition. The manual force can cause the engagement member 3100 to rotate about the pivot axis ($A_P$) toward the lock position ($L_P$). This rotation causes the mating structure 3101 to approach the restraining structure 3222 of the sear 3220, which is biased toward the restrain position. Upon the engagement member 3100 achieving the lock position ($L_P$) the restraining structure 3222 engages the mating structure 3101 thereby removably coupling the sear 3220 to the engagement member 3100 and preventing a counter rotation of the engagement member 3100 in the direction of the unlock position ($U_P$).

In some embodiments, the cam 3240 is operably coupled to the electrical machine 3230. The electrical machine 3230 of the lock mechanism 3200 is operably coupled to the user interface 3300 and can be powered by an energy storage device 3232 (e.g., a battery). The electrical machine 3230 is configured to generate a rotational force that rotates the cam 3240. The rotational force transitions the lock mechanism 3200 from the engaged state to the disengaged state. Specifically, the cam 3240 is positioned to move the sear 3220 from the restrain position to the release position in response to the rotational force of the electrical machine 3230. In other words, as the cam 3240 rotates in response to the actuation of the electrical machine 3230, a portion of the cam 3240 is brought into contact with a portion of the sear 3220. Insofar as the sear 3220 is a lever, the contact between the cam 3240 and the sear 3220 causes the sear 3220 to pivot about a fulcrum toward the release position. The motion of the sear 3220 in response to the cam 3240 disengages the restraining structure 3222 from the mating structure 3101. The disengagement of the restraining structure 3222 from the mating structure 3101, permits the rotation of the engagement member 3100 from the lock position ($L_P$) to the unlock position ($U_P$).

In some embodiments, the safety system 3000 includes the user interface 3300, which is operably coupled to the lock mechanism 3200. The user interface 3300 is configured to transition the lock mechanism 3200 between an engaged state and a disengaged state. In other words, the user interface 3300 is employed by an authorized user to facilitate the movement of the engagement member 3100 between the lock position ($L_P$) and the unlock position ($U_P$) by locking or unlocking the lock mechanism 3200. Once unlocked, the safety system 3000 remains unlocked until the lock mechanism 3200 is affirmatively reengaged by an operator.

The user interface 3300 can include a biometric user identification (e.g., fingerprint identification) unit, a radio frequency identification reader, a numerical input apparatus, a microphone, a magnetic key, a mechanical key, and/or other input system configured to authenticate an authorized user. For example, in some embodiments, the user interface 3300 includes a fingerprint sensor 3310 operably coupled to a biometric processor 3320, a data storage device containing stored identification data for authorized users, and the energy storage device 3232. The fingerprint sensor may be an optical sensor, a thermal sensor, and/or a pressure sensor and may be configured as a static sensor or a swipe sensor. The user interface 3300 also be operably coupled to an energy storage device 3232. Additionally, in some embodiments the user interface 3300 includes a wireless communication unit that facilitates the remote operation of the safety system 3000 via a wireless network, a cellular network, and/or a Bluetooth connection.

In some embodiments, the user interface 3300 can include a program button 3340 that is occluded by the frame 110 on a condition that the safety system 3000 is coupled to the handgun 100. Actuating the program button 3340 can place the user interface 3300 in a record state during which the biometric parameters of a user can be stored via the data storage device. The occlusion of the program button 3340 while the safety system 3000 is coupled to the handgun 100 can preclude placing the user interface 3300 in the record state until the safety system 3000 is decoupled from the handgun 100. Accordingly, the positioning of the program button 3340 can preclude an unauthorized user from transitioning the lock mechanism 3200 to the disengaged state via the user interface 3300.

In some embodiments, a GPS module (not shown) may be operably coupled to the user interface 3300. The GPS module facilitates position tracking of the handgun 100 via the safety system 3000 coupled thereto. For example, the GPS module may the employed in conjunction with a geo-fence (e.g., a region with boundaries that are defined by GPS coordinates). In some embodiments an embodiment, an authorized user of the handgun 100 can be alerted in the event the handgun 100 departs the geo-fence. In additional embodiments, the user interface 3300 can be disabled upon the departure of the handgun 100 from the geo-fence. In further embodiments, the user interface 3300 can be configured to maintain the lock mechanism 3200 in, the engaged state following the departure of the handgun 100 from the geo-fence.

In some embodiments, the safety system 3000 includes a housing 3500. The housing 3500 provides the structure for support and mounting of the safety system 3000 to the handgun 100. The housing 3500 is formed from materials having sufficient strength to prevent access to internal components of the safety system 3000. For example, in various embodiments, the housing 3500 is formed from a metal, a reinforced plastic, and/or composite. In some embodiments, the housing 3500 is the unitary structure defining at least one internal cavity. In other embodiments, the housing 3500 is formed by the coupling of multiple housing members that are separately formed. For example, the housing 3500 may be formed at least from a first housing portion 3502 and a second housing portion 3504.

In some embodiments, the housing 3500 supports the user interface 3300. For example, the housing 3500 may define an external recess 3540 in which the user interface 3300 may be secured. The housing 3500 also includes a coupling portion 3510. The coupling portion 3510 is configured to receive a portion of the handgun 100, such as the mounting structure 116. In other words, the housing 3500, and thus the safety system 3000, may be fixedly coupled to the handgun 100 via an interface between the coupling portion 3510 and the mounting structure 116. Although shown as being against or engaged with the trigger guard 114, in other embodiments, the housing 3500 may, for example, be coupled to the handgun 100 and a position that is forward of the trigger guard 114. For example, the housing 3500 can be similar to the housing 1500 shown in FIGS. 3 and 4 and can establish a spacing between the housing 3500 and the trigger guard 114.

In some embodiments, safety system 3000 includes at least one fastener 3512. The fastener(s) 3512 is positioned adjacent the coupling portion 3510. For example, the fastener(s) 3512 may be inserted into a threaded passage defined by a mount bracket 3550. The mount bracket 3550 can be formed from a resilient material (e.g. hardcoat anodized aluminum). In some embodiments, the mount bracket 3550 can have a greater stiffness than the first housing portion 3502 and/or the second housing portion 3504. As depicted in FIGS. 17 and 18, the mount bracket 3550 can be positioned to support the engagement member 3100 (e.g., via supporting the shaft 3110). The mount bracket 3550 and the fastener(s) 3512 coupled thereto are positioned to secure the mounting structure 116 of the handgun 100 within the coupling portion 3510. In some embodiments, the fastener(s) 3512 is at least partially occluded by a portion of the engagement member 3100 when the engagement member 3100 is in the lock position ($L_P$). Therefore, the engagement member 3100 preclude the loosening and/or removal of the fastener(s) 3512 while the safety system 3000 is in the locked configuration. Correspondingly, the transitioning of the engagement member 3100 to the unlock position ($U_P$) may permit access to the fastener(s) 3512 so that the safety system 3000 may be decoupled from the handgun 100 only when in the unlocked configuration. In some embodiments, the fastener(s) 3512 can be a proprietary security screw that requires the use of a proprietary tool or extractor to loosen the fastener(s) 3512.

In some embodiments, the housing 3500 also defines a lock cavity 3520 supporting at least a portion of the lock mechanism 3200. The lock cavity 3520 may, for example, be defined by an inner face 3506 of the housing 3500. Additionally, the housing 3500 defines an interface orifice 3530.

The interface orifice 3530 is oriented to facilitate the operable coupling of the engagement member 3100 to the lock mechanism 3200. The interface orifice 3530 may, for example, correspond to a slot or hole through which a portion of the engagement member 3100 may be inserted. The interface orifice 3530 is sized to facilitate a desired degree of travel of the engagement member 3100.

Figure 21:
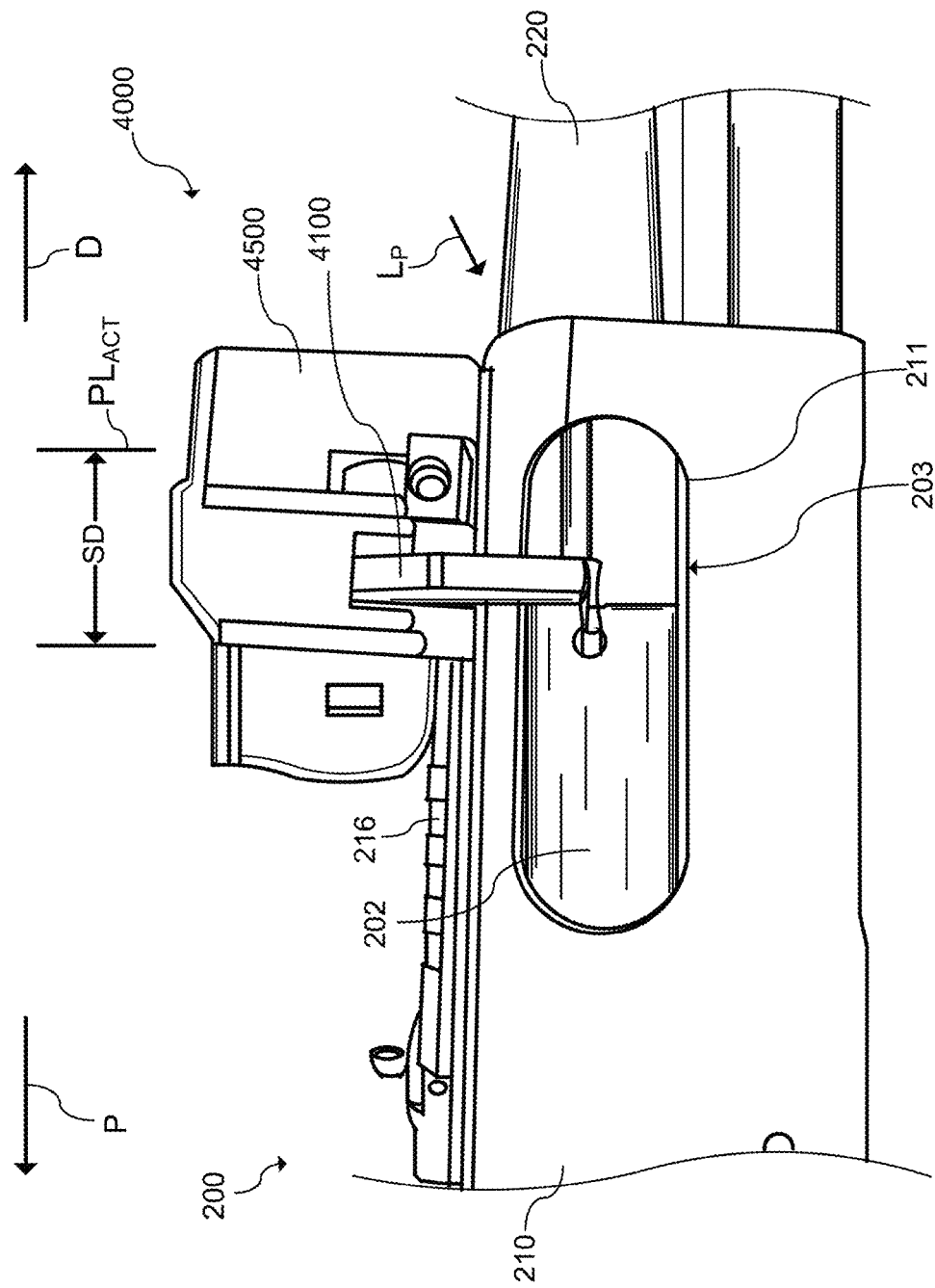
FIG. 21 is a perspective side view of a firearm with a safety system coupled thereto, with the safety system being depicted in a lock configuration, according to an embodiment.
Figure 22:
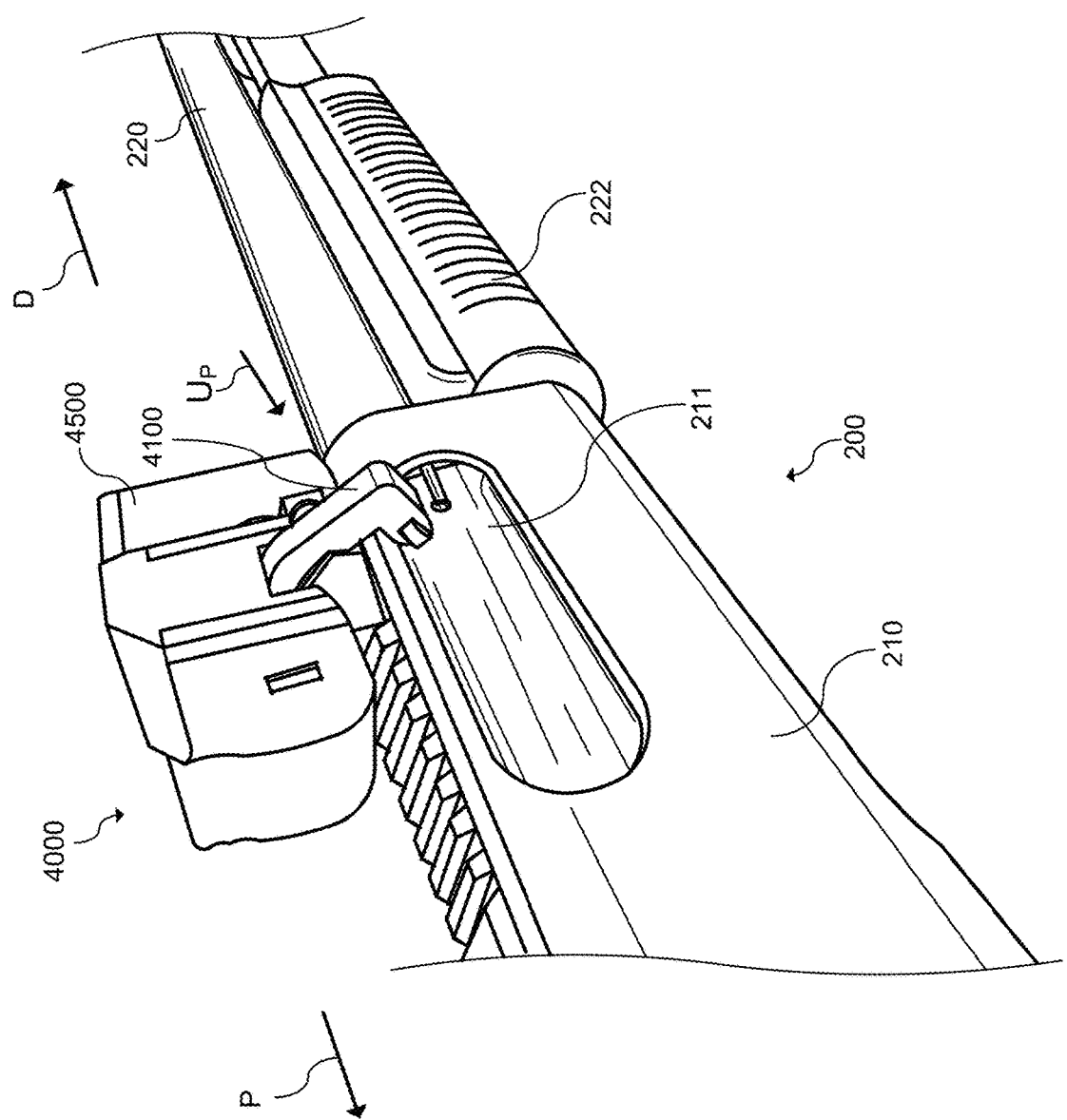
FIG. 22 is a perspective side view of the firearm and safety system of FIG. 21 with the safety system being depicted in an unlock configuration.

Although the safety systems described above are described as being coupled to a handgun 100 with the slide 102, any of the safety systems described herein (e.g., safety system 1000, safety system 2000, and/or safety system 3000) can be used with any suitable firearm having a movable component associated with the firing operation. For example, any of the safety systems described herein (e.g., safety system 1000, safety system 2000, and/or safety system 3000) can be used with a firearm that has a breechblock (e.g., a pump-action shotgun, a semi-automatic shotgun, a bolt-action rifle, an automatic/semi-automatic rifle, such as an AR-style carbine, and/or other suitable firearm). For example, FIGS. 21 and 22 are perspective side views of a safety system 4000 coupled to a portion of a shotgun 200. In FIG. 21, the safety system 4000 is depicted in a lock position $L_P$, while in FIG. 22, the safety system is depicted in an unlock position $U_P$. Although shown and described as being coupled to the shotgun 200, the safety system 4000 can be coupled to and/or used with any suitable firearm. The safety system 4000 can include any of the features or elements described herein in reference to any other safety system.

In some embodiments, the shotgun 200 can include a frame 210. The frame 210 can include a mounting structure 216. The mounting structure 216 can, for example, be positioned along an upper surface of the shotgun 200 vertically opposite a trigger (not shown). The mounting structure 216 may, for example, be a Picatinny rail, an accessory rail and/or other similar structure. The mounting structure 216 provides a mounting platform for firearm accessories, such as the safety system described herein, optics, a laser aiming module, a camera, or other suitable accessory.

As depicted, a barrel 220 is coupled to the frame 210. The barrel 220 is a tubular metallic structure through which a projectile (e.g., a bullet, a slug, and/or pellets) or shot charge is fired. The barrel 220 is a unitary body that extends between a muzzle and a chamber end (e.g., a proximal end of the barrel 220). The muzzle corresponds to the distal end of the barrel from which the projectile exits following discharge. The muzzle is the distal end of a generally linear portion of the barrel 220. The linear portion of the barrel 220 has a generally uniform outer diameter and defines a hollow internal lumen (e.g., a bore) of the barrel 220. In some embodiments, the linear portion extends distally from a chamber (not shown. The chamber is a hollow internal lumen of the barrel 220 that is axially aligned with the bore and holds a cartridge ready for firing/discharge.

The shotgun 200 includes a firearm action having components that are configured to load a cartridge in the chamber, lock the chamber, discharge the cartridge, extract the spent cartridge from the chamber, and eject the spent cartridge from the firearm. When, as depicted, the shotgun 200 is configured as a pump-action shotgun, the cartridge can be loaded into the chamber in response to an actuation of a forend 222 (e.g., a sliding grip) that is positioned parallel to the barrel 220. Specifically, a proximal movement of the forend 222 develops a corresponding proximal movement of a bolt assembly 202 (e.g., a breechblock). A subsequent distal movement of the forend 222 moves the bolt assembly 202 in the distal direction and positions the cartridge within the chamber. The bolt assembly 202 locks the cartridge within the chamber and poses the breech (e.g., the proximal end of the chamber) such that combustion gases propel the projectile down the barrel 220. In some embodiments, the bolt assembly 202 can include a firing pin (e.g., primer actuator 144). In some embodiments, the bolt assembly 202 can include an extractor (not shown). As discussed previously with reference to the slide 102 of the handgun 100 and the primer actuator 144, the positioning of a distal end of the firing pin is affected by the longitudinal position of the bolt assembly 202 relative to the chamber of the barrel 220. The extractor can be configured to secure the cartridge during the proximal movement of the bolt assembly 202 such that the cartridge can be ejected via an ejection port 211 defined by the frame 210 of the shotgun 200.

In FIG. 21, the safety system 4000 is depicted in a locked configuration, with the engagement member 4100 in a lock position ($L_P$), and the bolt assembly 202 in a proximal position that precludes operation of the shotgun 200. In FIG. 22, the safety system 4000 is depicted in an unlock position ($U_P$) in which the engagement member 4100 does not limit or otherwise affect the longitudinal position of the bolt assembly 202. The safety system 4000 depicted in FIGS. 21 and 22 can, for example, include any of the elements, components, features, and functions as described herein with reference to the safety system 3000 depicted in FIGS. 7-18.

As depicted, in some embodiments, the safety system 4000 includes an engagement member 4100, a lock mechanism, and a user interface (e.g., similar to the lock mechanism 3200 and user interface 3300). As described in more detail above, the safety system 4000 can allow the shotgun 200 to be selectively locked (or placed in a safe, "no-fire" condition) and unlocked while remaining coupled to the shotgun 200. Specifically, the engagement member 4100 of the safety system 4000 is configured to contact a distal portion 203 of the bolt assembly 202 to limit a distal movement of the bolt assembly 202 (e.g., the breechblock) on a condition that the engagement member 4100 is in the lock position ($L_P$). The engagement member 4100 is formed from a rigid material selected to resist tampering (e.g., prying) for a specified interval. The rigid material can have a yield strength of at least 340 mega pascals (e.g., at least 750 MPa), such as hardcoat anodized aluminum, a steel-iron-nickel alloy, stainless steel, tungsten, a titanium alloy, or other similar metals. In some embodiments, the engagement member 4100 is interchangeable or includes an interchangeable portion facilitating the use of the safety system 4000 on different firearm models.

The engagement member 4100 is movably coupled to the shotgun 200 and can include an actuator portion and a contact face. The engagement member 4100 may, in various embodiments, be configured to rotate relative to the frame 210 in accordance with the locked/unlocked configuration of the safety system 4000. The rotation of the engagement member 4100 can place the contact face in contact with a distal portion of the bolt assembly 202. For example, the engagement member 4100 can be rotated so that the contact face passes through the ejection port 211 to contact the distal portion 203 of the bolt assembly 202. The rotation of the engagement member 4100 is the result of a motive force received by the engagement member 4100. For example, in some embodiments the actuator portion can include a surface or portion that allows a user to manually grasp or manipulate the engagement member to move the engagement member relative to the frame. In other embodiments, the actuator portion is operably coupled to receive the motive force from a spring or an electrical machine.

To transition between the unlock position ($U_P$) and the lock position ($L_P$), the engagement member 4100 is rotatable with, or about, a shaft (such as shaft 3110 depicted in FIGS. 16-18). In some embodiments, the shaft is positioned within a housing 4500 of the safety system 4000. The shaft defines a pivot axis that, in some embodiments, is parallel to the longitudinal axis of the shotgun 200. Additionally, in some embodiments, the pivot axis is laterally displaced from the longitudinal axis. Said another way, on a condition that frame 210 is positioned in a hand of an operator of the shotgun 200, the longitudinal axis and the pivot axis can lie on a plane that is substantially horizontal, with the pivot axis being laterally offset from the longitudinal axis (L).

As described herein in reference to the safety system 1000, the safety system 2000, and the safety system 3000, a distal end of a primer actuator (e.g., firing pin) of the bolt assembly 202 of the shotgun 200 is maintained spaced apart from a primer activation plane ($PL_{ACT}$) of the shotgun 200 by a separation distance (SD) in response to the engagement member 4100 being in the lock position ($L_P$) as depicted in FIG. 21. Said another way, a proximal positioning of the bolt assembly 202 stemming from the proximal movement of the bolt assembly 202 results in a proximal shift of the design range of travel of the primer actuator relative to the frame 210, and thus the barrel 220.

The separation distance (SD) has a magnitude that precludes contact between the distal end of the primer actuator (e.g., the firing pin) and the primer of a chambered cartridge (e.g., shotgun shell) even if the firing mechanism is actuated. Said another way, the magnitude of the separation distance is such that the point of maximal distal travel is proximal to, and separated from, the primer activation plane ($PL_{ACT}$) of the chambered cartridge. Insofar as the separation distance precludes any contact between the primer actuator and the primer, the shot gun 200 is rendered inoperable (e.g., made safe) so long as the separation distance (SD) is maintained.

In some embodiments transitioning the engagement member 4100 from the lock position ($L_P$) to the unlock position ($U_P$) facilitates a distal movement of the bolt assembly 202. In other words, the transition of the engagement member 4100 to the unlock position ($U_P$) may remove a restriction on the longitudinal movement (e.g., movement in the distal direction relative to the frame 210) of the bolt assembly 202, thereby allowing the bolt assembly 202 to return to a design, default bolt-forward position in response to a force applied via the forend 222.

Figure 23:
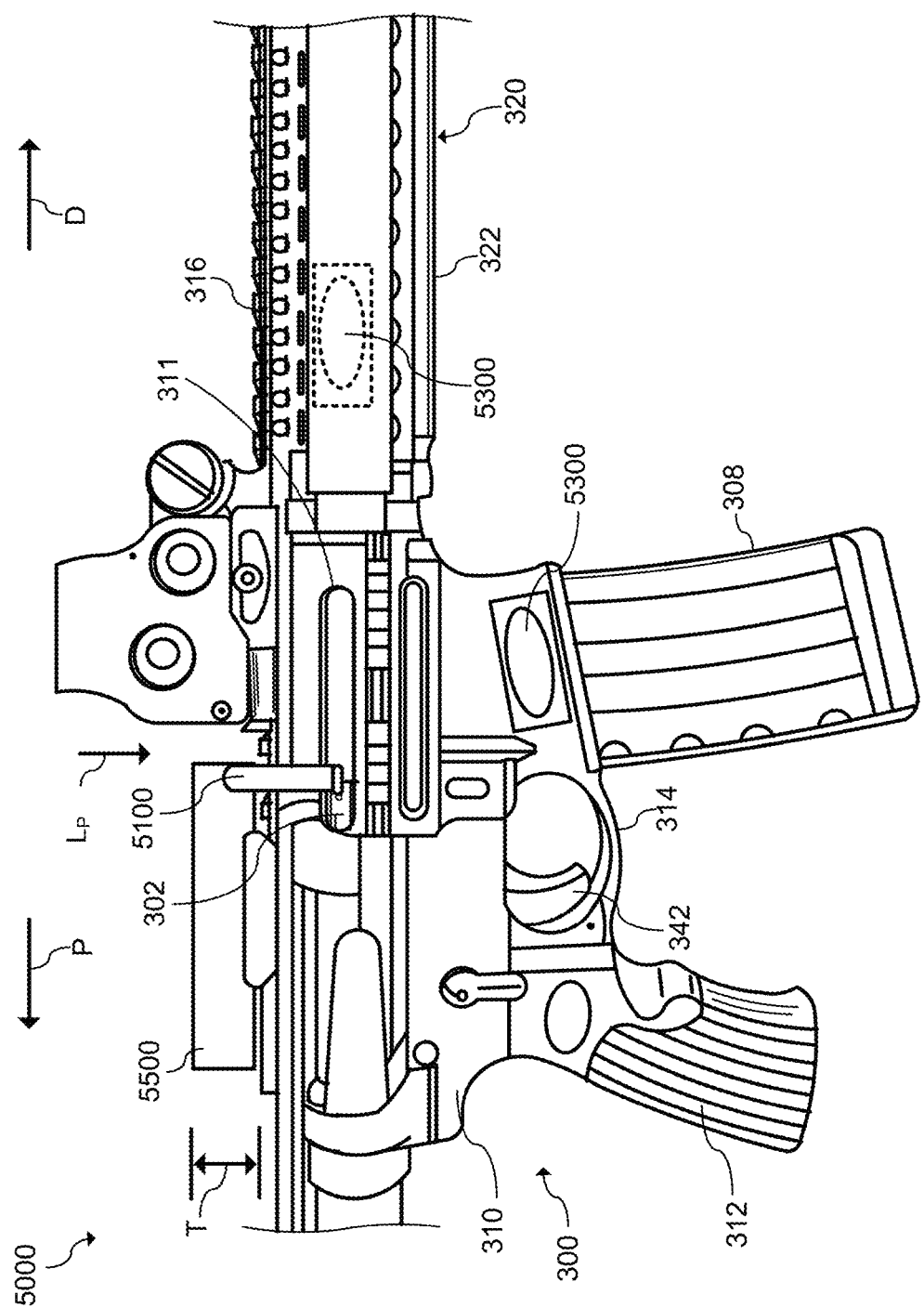
FIG. 23 is a perspective side view of a firearm with a safety system coupled thereto, with the safety system being depicted in a lock configuration, according to an embodiment.
Figure 24:
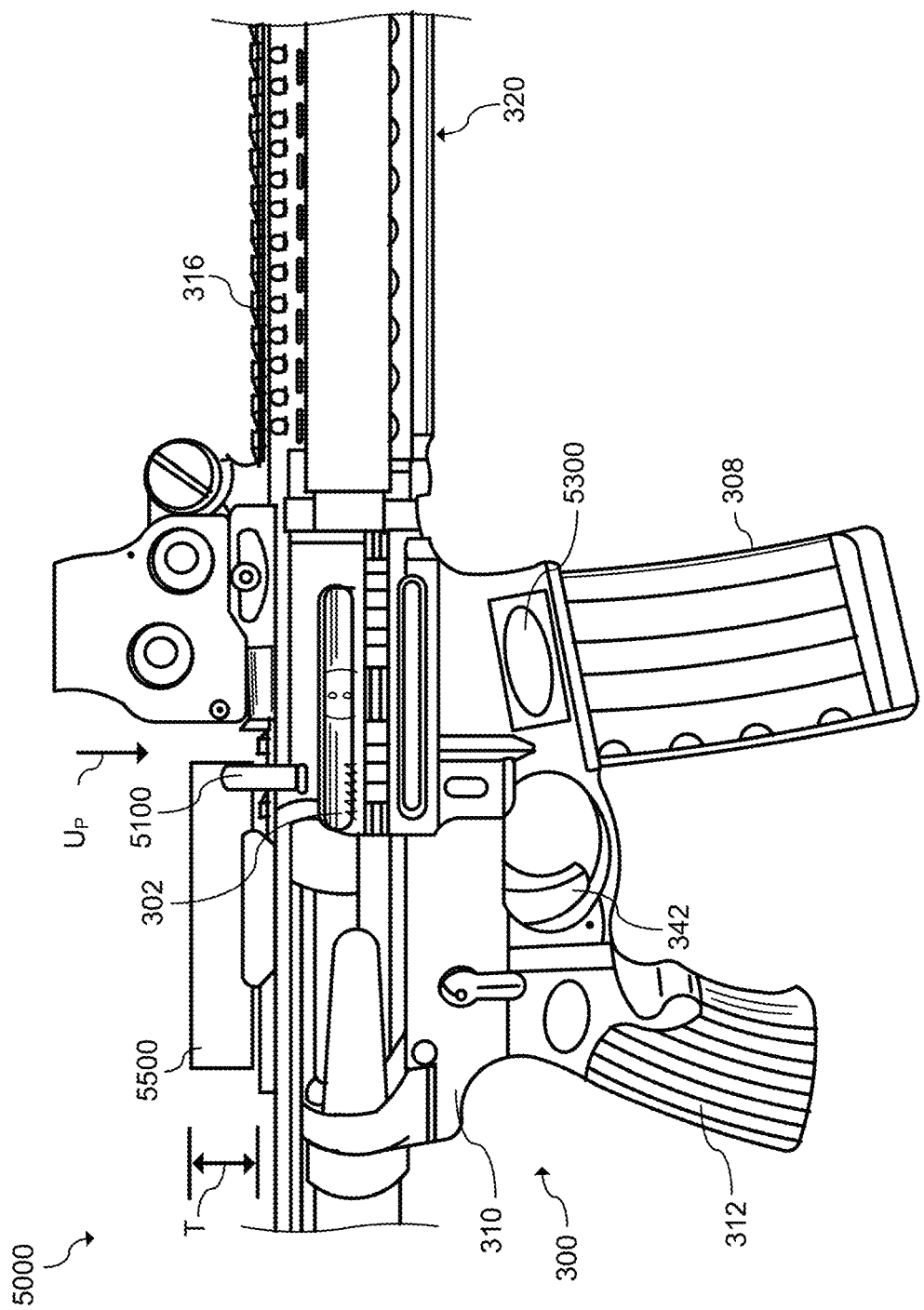
FIG. 24 is a perspective side view of the firearm and safety system of FIG. 21 with the safety system being depicted in an unlock configuration.

Although the safety systems described above are described as being coupled to a handgun 100 with the slide 102 and a shotgun 200 with the bolt assembly 202, any of the safety systems described herein (e.g., safety system 1000, safety system 2000, safety system 3000, and/or safety system 4000) can be used with any firearm having a movable component associated with the firing operation. For example, any of the safety systems described herein (e.g., safety system 1000, safety system 2000, and/or safety system 3000) can be used with a firearm that has a breechblock (e.g., a pump-action shotgun, a semi-automatic shotgun, a bolt-action rifle, an automatic/semi-automatic rifle, such as an AR-style carbine, and/or other suitable firearm). For example, FIGS. 23 and 24 are perspective side views of a safety system 5000 coupled to a portion of a rifle 300. The rifle 300 is depicted as semi-automatic, AR-style carbine. In FIG. 23, the safety system 5000 is depicted in a lock position $L_P$, while in FIG. 22, the safety system is depicted in an unlock position $U_P$. Although shown and described as being coupled to the shotgun 200, the safety system 4000 can be coupled to and/or used with any suitable firearm. The safety system 4000 can include any of the features or elements described herein in reference to any other safety system.

In some embodiments, the rifle 300 can include a frame 310. The frame 310 is a unitary body that includes a grip portion 312. The grip portion 312 is oriented and shaped to be received by a hand of an operator of the rifle 300. The frame 310 defines a cavity for receiving a magazine 308. The magazine 308 may contain ammunition for the rifle 300. The frame 310 also includes a trigger guard 314 positioned distally (e.g., forward) of the grip portion 312. The trigger guard 314 at least partially surrounds the trigger 342 and partially restricts access thereto.

The frame 310 can include a mounting structure 316. The mounting structure 316 can, for example, be positioned along an upper surface of the rifle 300 vertically opposite a trigger 342. The mounting structure 316 may, for example, be a Picatinny rail, an accessory rail and/or other similar structure. The mounting structure 316 provides a mounting platform for firearm accessories, such as the safety system described herein, optics, a laser aiming module, a camera, or other suitable accessory. As depicted, in some embodiments, a housing 5500 of the safety system 5000 has a form factor selected to preclude obstructing an optics system that is also coupled to the mounting structure 316. Said another way, a thickness (T) of the housing 5500 can be less than a distance between a line of sight of the optics and the mounting structure 316.

As depicted, a barrel 320 is coupled to the frame 310. The barrel 320 is a tubular metallic structure through which a projectile (e.g., a bullet, a slug, and/or pellets) or shot charge is fired. The barrel 320 is a unitary body that extends between a muzzle and a chamber end (e.g., a proximal end of the barrel 320). The muzzle corresponds to the distal end of the barrel from which the projectile exits following discharge. The muzzle is the distal end of a generally linear portion of the barrel 320. The linear portion of the barrel 320 has a generally uniform outer diameter and defines a hollow internal lumen (e.g., a bore) of the barrel 320. In some embodiments, the linear portion extends distally from a chamber (not shown). The chamber is a hollow internal lumen of the barrel 320 that is axially aligned with the bore and holds a cartridge ready for firing/discharge.

The rifle 300 includes a firearm action having components that are configured to load a cartridge in the chamber, lock the chamber, discharge the cartridge, extract the spent cartridge from the chamber, and eject the spent cartridge from the firearm. When, as depicted, the rifle 300 is configured as a semi-automatic, AR-style carbine, the firearm action can be a gas-operated action in which a portion of high-pressure gas from the cartridge being fired is diverted to cycle the action in preparation for firing a subsequent cartridge.

In some embodiments, the rifle 300 includes a bolt assembly 302 (e.g., a breechblock). The bolt assembly 302 can, for example, include a bolt carrier group, a bolt, a firing pin, and an extractor. The rifle 300 can also include a recoil spring (not shown). The recoil spring is positioned so that a proximal movement of the bolt assembly 302 relative to the frame 310 compresses the recoil spring. The recoil spring is thus oriented to exert a force on the bolt assembly 302 in a distal direction. For example, under designed operations (e.g., an authorized, intentional actuation of the trigger 342), the discharge of the rifle 300 results in the proximal movement of the bolt assembly 302 relative to the frame 310 and, thus, the compression of the recoil spring. When the bolt assembly 302 encounters a proximal travel limit, the potential energy of the recoil spring is released, thereby returning the bolt assembly 302 distally to a design position (e.g., a bolt-forward position such as depicted in FIG. 24). The distal movement of the bolt assembly 302 may strip a cartridge from the magazine 308 and insert the cartridge into the chamber of the barrel 320. The bolt assembly 302 can then seal a proximal end of the chamber (e.g., the breach) such that combustion gases are directed distally down the barrel 320. Following the discharge of the cartridge, the cartridge can be extracted from the chamber via the bolt assembly 302 and ejected via an ejection port 311 defined by the frame 310 of the rifle 300.

Figure 25:
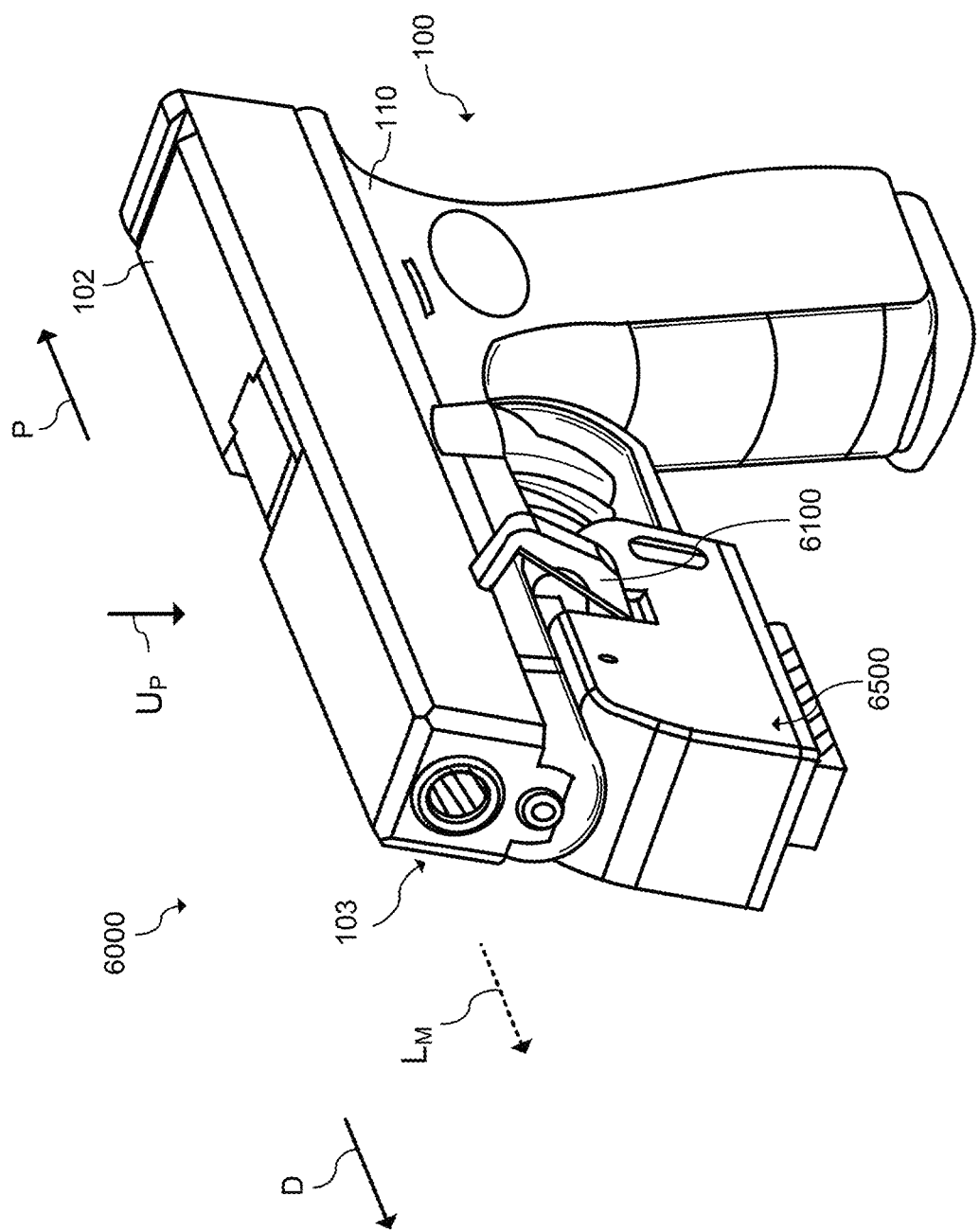
FIG. 25 is a perspective side view of a firearm with a safety system coupled thereto, with the safety system being depicted in an unlock configuration, according to an embodiment.

In FIG. 23, the safety system 5000 is depicted in a locked configuration, with the engagement member 5100 in a lock position ($L_P$), and the bolt assembly 302 in a proximal position that precludes operation of the rifle 300. In FIG. 25, the safety system 5000 is depicted in an unlock position ($U_P$) in which the engagement member 5100 does not limit or otherwise affect the longitudinal position of the bolt assembly 302. The safety system 5000 depicted in FIGS. 23 and 24 can, for example, include any of the elements, components, features, and functions as described herein with reference to the safety system 3000 depicted in FIGS. 7-18.

As depicted, in some embodiments, the safety system 5000 includes an engagement member 5100, a lock mechanism, and a user interface (e.g., lock mechanism 3200 and user interface 3300). As described in more detail above, the safety system 5000 can allow the rifle 300 to be selectively locked (or placed in a safe, "no-fire" condition) and unlocked while remaining coupled to the rifle 300. Specifically, the engagement member 5100 of the safety system 5000 is configured to contact a distal portion of the bolt assembly 302 to limit a distal movement of the bolt assembly 302 (e.g., the breechblock) on a condition that the engagement member 5100 is in the lock position ($L_P$). The engagement member 5100 is formed from a rigid material selected to resist tampering (e.g., prying) for a specified interval. The rigid material can have a yield strength of at least 340 mega pascals (e.g., at least 750 MPa), such as hardcoat anodized aluminum, a steel-iron-nickel alloy, stainless steel, tungsten, a titanium alloy, or other similar metals. In some embodiments, the engagement member 5100 is interchangeable or includes an interchangeable portion facilitating the use of the safety system 5000 on different firearm models.

The engagement member 5100 is movably coupled to the rifle 300 and can include an actuator portion and a contact face. The engagement member 5100 may, in various embodiments, be configured to rotate relative to the frame 310 in accordance with the locked/unlocked configuration of the safety system 5000. The rotation of the engagement member 5100 can place the contact face in contact with a distal portion of the bolt assembly 302. For example, the engagement member 5100 can be rotated so that the contact face passes through the ejection port 311 to contact the distal portion of the bolt assembly 302. The rotation of the engagement member 5100 is the result of a motive force received by the engagement member 5100. For example, in some embodiments the actuator portion can include a surface or portion that allows a user to manually grasp or manipulate the engagement member to move the engagement member relative to the frame. In other embodiments, the actuator portion is operably coupled to receive the motive force from a spring or an electrical machine.

To transition between the unlock position ($U_P$) and the lock position ($L_P$), the engagement member 5100 is rotatable with, or about, a shaft (such as shaft 3110 depicted in FIGS. 16-18). In some embodiments, the shaft is positioned within a housing 5500 of the safety system 5000. The shaft defines a pivot axis that, in some embodiments, is parallel to the longitudinal axis of the rifle 300. Additionally, in some embodiments, the pivot axis is laterally displaced from the longitudinal axis. Said another way, on a condition that frame 310 is positioned in a hand of an operator of the rifle 300, the longitudinal axis and the pivot axis can lie on a plane that is substantially horizontal, with the pivot axis being laterally offset from the longitudinal axis (L).

As described herein in reference to the safety system 1000, the safety system 2000, the safety system 3000, and the safety system 4000, a distal end of a primer actuator (e.g., firing pin) of the bolt assembly 302 of the rifle 300 is maintained spaced apart from a primer activation plane of the rifle 300 by a separation distance in response to the engagement member 4100 being in the lock position ($L_P$) as depicted in FIG. 21. Said another way, a proximal positioning of the bolt assembly 302 stemming from the proximal movement of the bolt assembly 302 results in a proximal shift of the design range of travel of the primer actuator relative to the frame 310, and thus the barrel 320.

The separation distance has a magnitude that precludes contact between the distal end of the primer actuator (e.g., the firing pin) and the primer of a chambered cartridge (e.g., shotgun shell) even if the firing mechanism is actuated. Said another way, the magnitude of the separation distance is such that the point of maximal distal travel is proximal to, and separated from, the primer activation plane of the chambered cartridge. Insofar as the separation distance precludes any contact between the primer actuator and the primer, the rifle 300 is rendered inoperable (e.g., made safe) so long as the separation distance is maintained.

In some embodiments transitioning the engagement member 4100 from the lock position ($L_P$) to the unlock position ($U_P$) facilitates a distal movement of the bolt assembly 302. In other words, the transition of the engagement member 4100 to the unlock position ($U_P$) may remove a restriction on the longitudinal movement (e.g., movement in the distal direction relative to the frame 310) of the bolt assembly 202, thereby allowing the bolt assembly 302 to return to a design, default bolt-forward position in response to a force applied via the recoil spring.

In some embodiments, the distal movement of the bolt assembly 302 seats a cartridge in the chamber of the rifle 300. For example, unlocking of the safety system 5000 permits the transition of the engagement member 5100 from the lock position ($L_P$) to the unlock position ($U_P$). This transition allows the bolt assembly 302 to move distally (e.g., such as in response to the actuation of a boat release of the rifle 300). In accordance with the designed operation of the 300, the distal movement of the bolt assembly 302 strips a cartridge from a loaded magazine 308 inserted in the rifle 300 and seats the cartridge in the chamber. In other words, in some embodiments, the unlocking of the safety system 5000 results in the chambering of a cartridge and the placing of the rifle 300 in an operational state, from which the rifle 300 may be discharged/employed.

In some embodiments, the safety system 5000 includes at least one user interface 5300, which is operably coupled to the lock mechanism of the safety system 5000. The user interface 5300 is configured to transition the lock mechanism between an engaged state and a disengaged state. In other words, the user interface 5300 is employed by an authorized user to facilitate the movement of the engagement member 5100 between the lock position ($L_P$) and the unlock position ($U_P$) by locking or unlocking the lock mechanism. Once unlocked, the safety system 5000 remains unlocked until the lock mechanism 5300 is affirmatively reengaged by an operator.

The user interface 5300 can include a biometric user identification (e.g., fingerprint identification) unit, a radio frequency identification reader, a numerical input apparatus, a microphone, a magnetic key, a mechanical key, and/or other input system configured to authenticate an authorized user. For example, in some embodiments, the user interface 5300 includes a fingerprint sensor operably coupled to a biometric processor, a data storage device containing stored identification data for authorized users, and the energy storage device. The fingerprint sensor may be an optical sensor, a thermal sensor, and/or a pressure sensor and may be configured as a static sensor or a swipe sensor. The user interface 5300 also be operably coupled to an energy storage device. Additionally, in some embodiments the user interface 5300 includes a wireless communication unit that facilitates the remote operation of the safety system 5000 via a wireless network, a cellular network, and/or a Bluetooth connection.

In some embodiments, the user interface 5300 is coupled to a portion of the rifle 300 at a distance from the housing 5500. For example, as depicted, the user interface 5300 can be coupled to the frame 310 at a natural resting location for a trigger finger of the operator when the trigger finger is maintained outside of the trigger guard 314. In some embodiments, the user interface 5300 can be coupled to a forend 322 of the rifle 300. The user interface 5300 can be positioned such that the user interface 5300 is contacted by a support hand of the operator on a condition that the operator assumes a firing stance.

Figure 26:
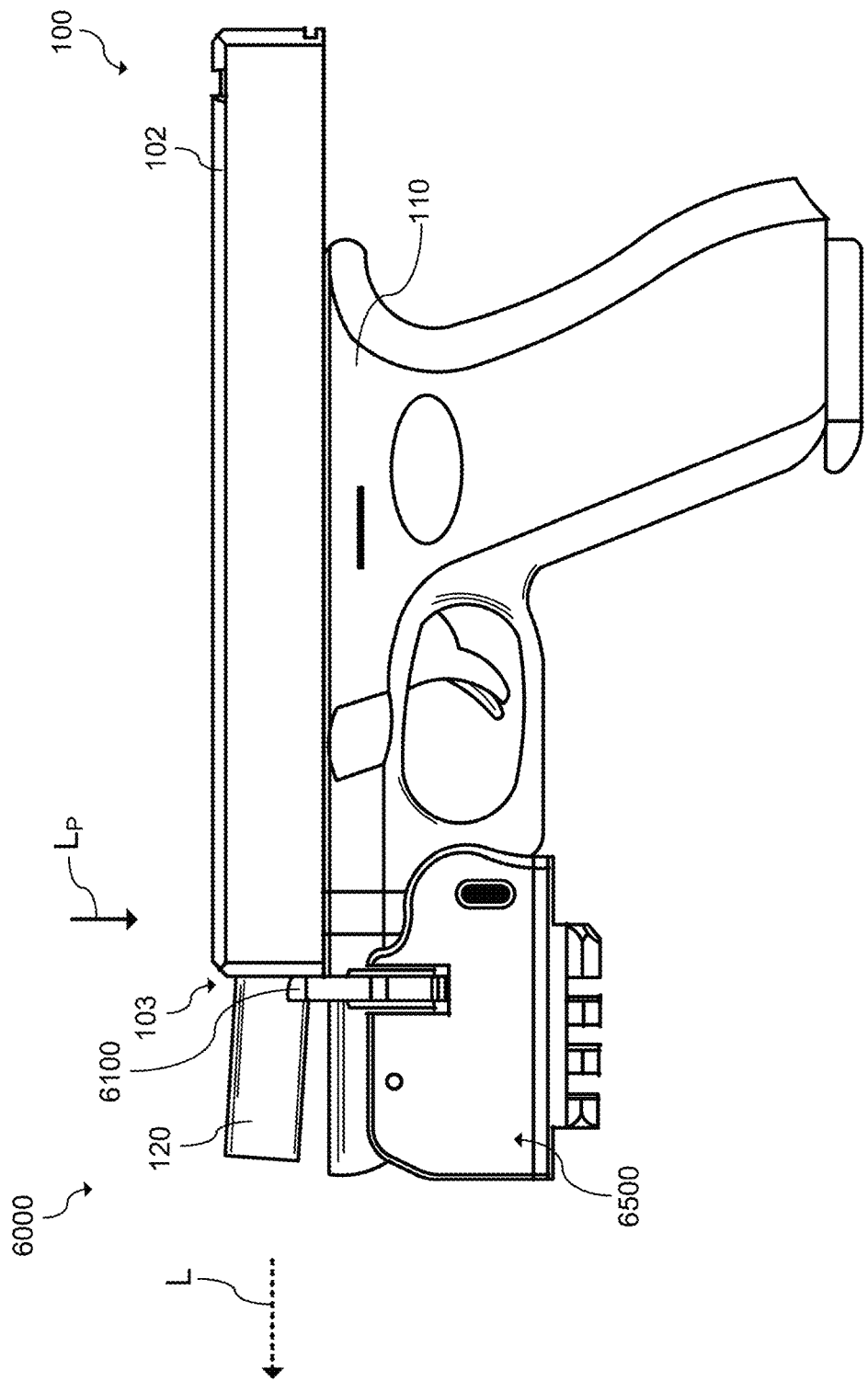
FIG. 26 is a side view of the firearm and safety system of FIG. 25 with the safety system being depicted in a lock configuration.

The safety systems described above (e.g., safety system 1000, safety system 2000, safety system 3000, safety system 4000, and/or safety system 5000) are described as being used with any firearm having a movable component associated with the firing operation. For example, FIGS. 25 and 26 depict a safety system 6000 coupled to a portion of the handgun 100, though the safety system 6000 can similarly be coupled to, and used to make safe, a shotgun 200, a rifle 300, and/or any other firearm having a movable component associated with the firing operation. As described for previous embodiments, in some embodiments the safety system 6000 develops a forced malfunction of the firearm (e.g., the handgun 100) that precludes the firearm from discharging when the safety system 6000 is in a locked configuration. Although shown and described as being coupled to the handgun 100, the safety system 6000 can be coupled to and/or used with any suitable firearm. The safety system 6000 can include any of the features or elements described herein in reference to any other safety system (e.g., safety system 1000, safety system 2000, safety system 3000, safety system 4000, and/or safety system 5000). The handgun 100 can include any of the features or elements described herein with reference to any other handgun.

Figure 27:
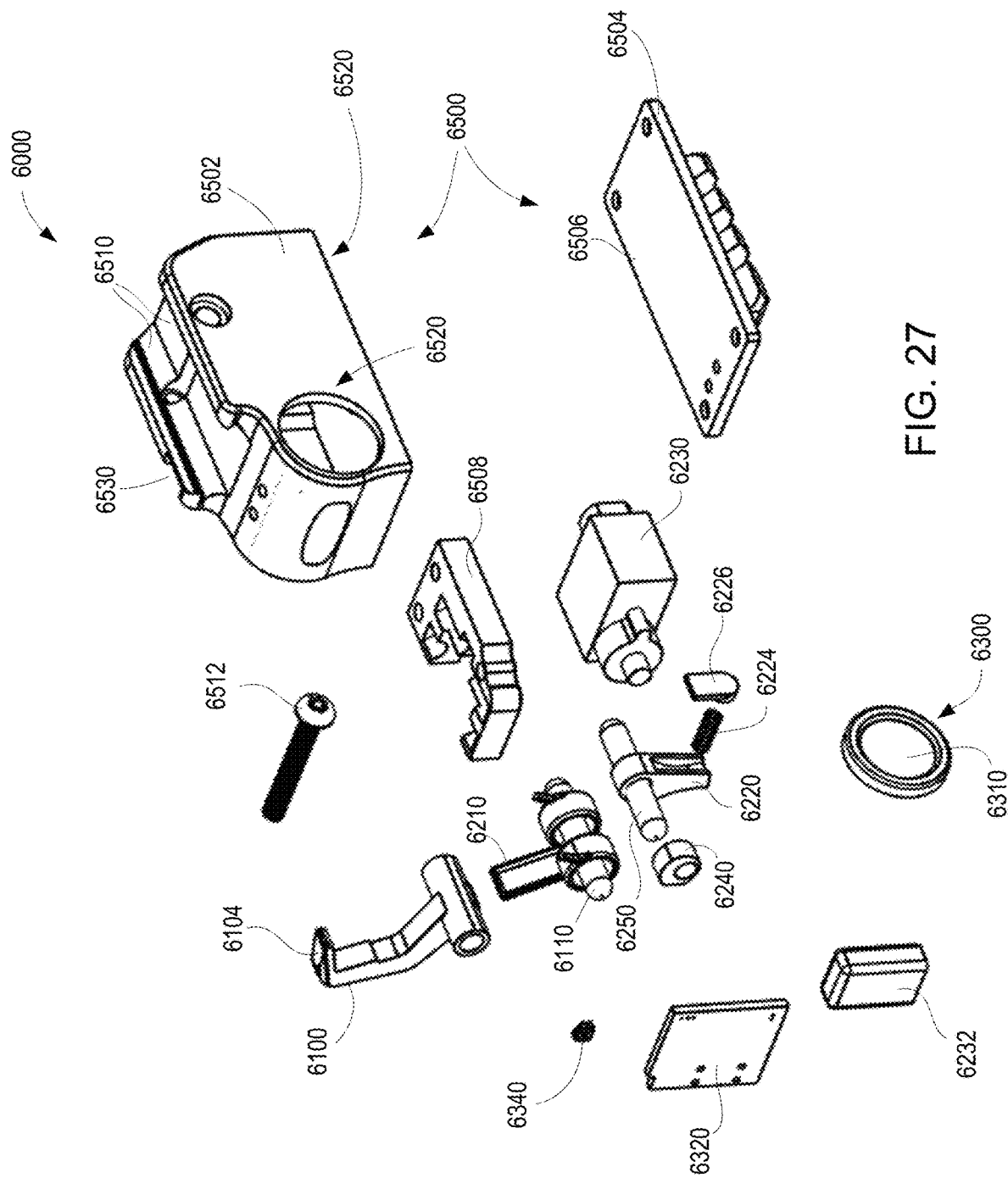
FIG. 27 is an exploded view of the safety system of FIG. 25.
Figure 28:
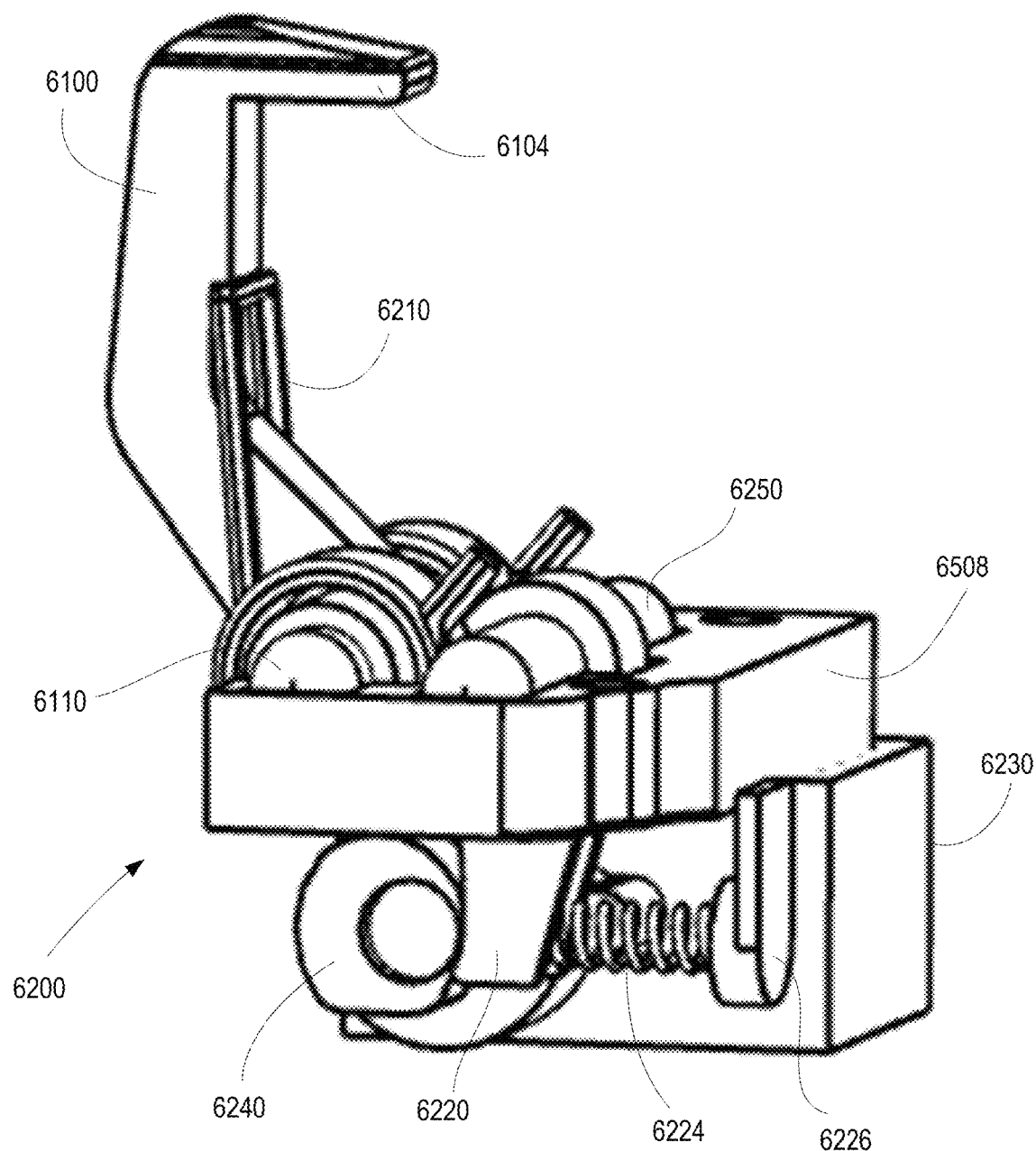
FIGS. 28 and 29 are a perspective views of a portion of the safety system of FIG. 21 with the housing and other components removed to display internal components of the safety system, the lock mechanism being depicted in an engaged state.
Figure 29:
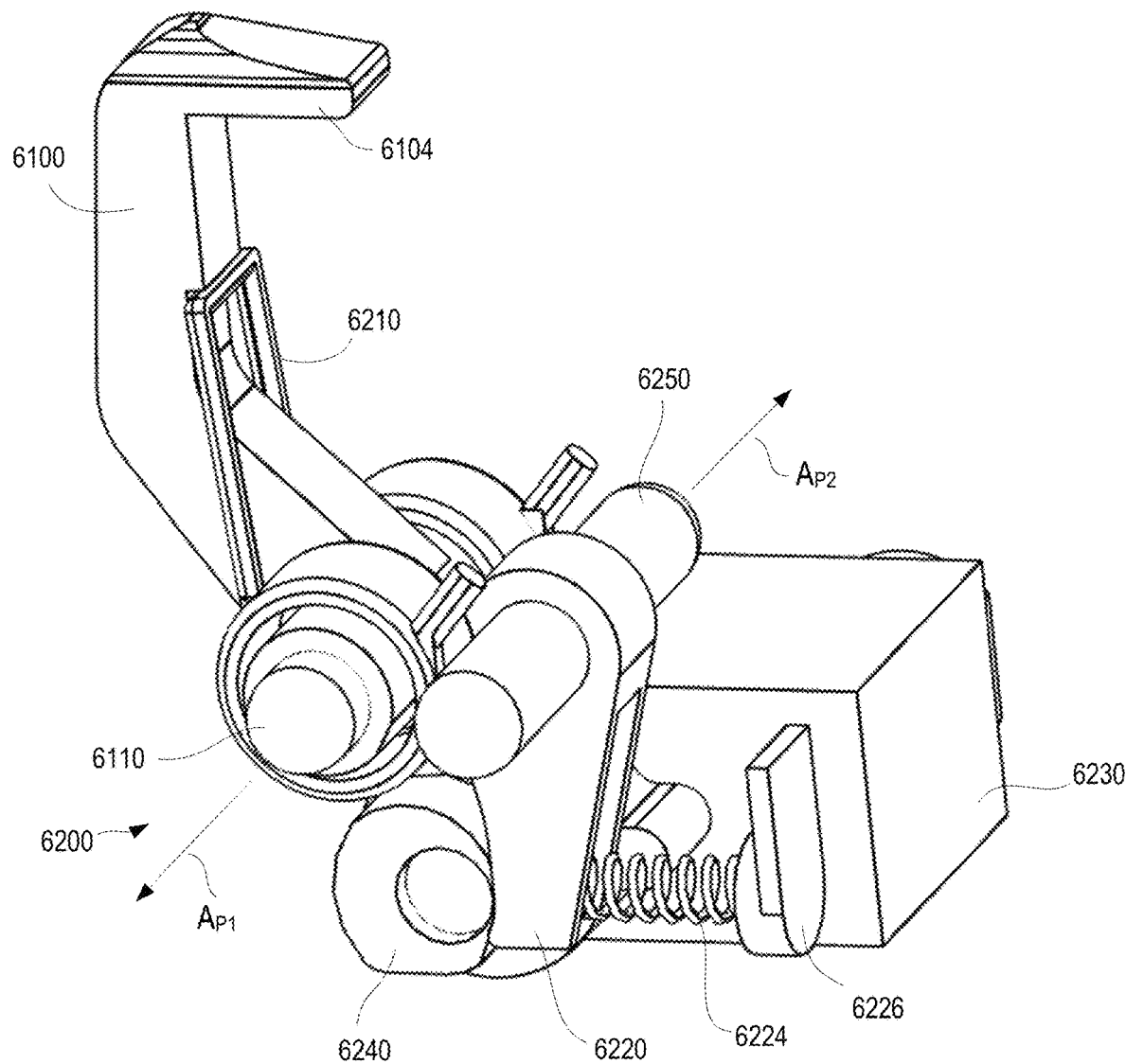
Figure 30:
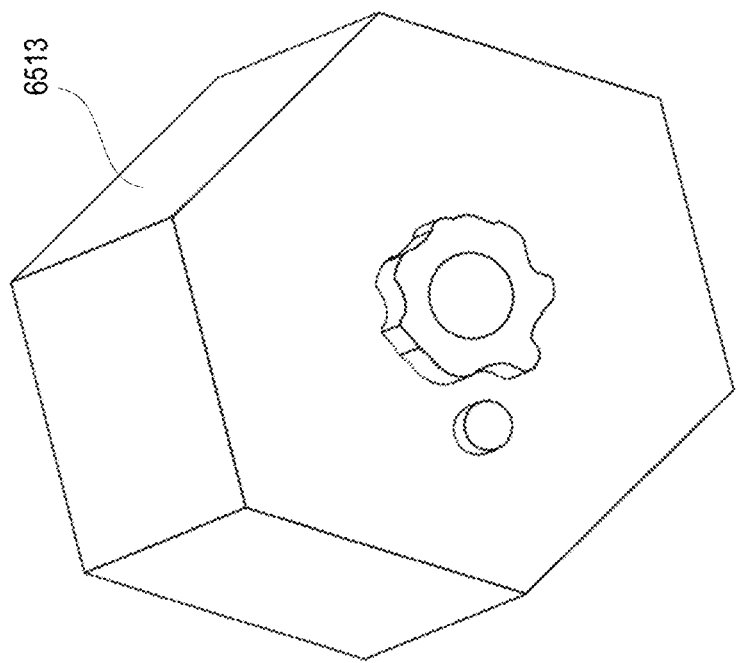
FIG. 30 is a perspective view of a proprietary security screw of the safety system of FIG. 21 and a proprietary tool for the removal thereof.
Figure 30:
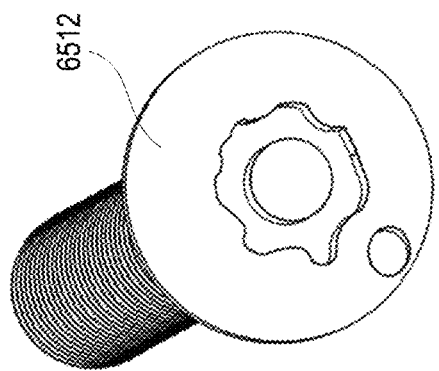

In FIG. 25, the safety system 6000 is depicted in an unlocked configuration, with an engagement member 6100 in an unlock position (UP), and the slide 102 in a default slide-forward position, wherein the handgun 100 may be discharged. In FIG. 26, the safety system 6000 is depicted in a locked configuration, with the engagement member 6100 in a lock position ($L_P$), and the slide 102 in a proximal position that precludes operation of the handgun 100. FIG. 27 is an exploded view of the safety system 6000. FIGS. 28 and 29 are a perspective views of a portion of the safety system 6000 with the housing 6500 and other components removed to display internal components of the safety system 6000 with the lock mechanism 6200 being depicted in an engaged state.

Referring to FIGS. 25-30, in some embodiments, the safety system 6000 includes an engagement member 6100, a lock mechanism 6200, a user interface 6300. As described in more detail below, the safety system 6000 can allow the handgun 100 to be selectively locked (or placed in a safe, "no-fire" condition) and unlocked while remaining coupled to the handgun 100. The engagement member 6100 is formed from a rigid material selected to resist tampering (e.g., prying) for a specified interval. The rigid material can have a yield strength of at least 340 mega pascals (e.g., at least 750 MPa), such as hardcoat anodized aluminum, a steel-iron-nickel alloy, stainless steel, tungsten, a titanium alloy, or other similar metals. In some embodiments, the engagement member 6100 is interchangeable or includes an interchangeable portion facilitating the use of the safety system 6000 on different firearms (e.g., different handgun models). The engagement member 6100 can include any of the features and elements described herein with reference to any other engagement member (e.g., engagement members 1100, 2100 3100, 4100, and 5100).

To transition between the unlock position ($U_P$) and the lock position ($L_P$), the engagement member 6100 is rotatable with, or about, a first shaft 6110 (such as depicted in FIGS. 27-29). In some embodiments, the first shaft 6110 is positioned within a housing 6500 of the safety system 6000. The first shaft 6110 defines a first pivot axis ($A_{P1}$) (FIG. 29). In some embodiments, such as depicted in FIGS. 25-29, the first pivot axis ($A_{P1}$) is parallel to the longitudinal axis (L). Additionally, in some embodiments, the first pivot axis ($A_{P1}$) is laterally displaced from the longitudinal axis (L). Said another way, on a condition that grip portion 112 is positioned in a hand of an operator of the handgun 100, the longitudinal axis (L) and the first pivot axis ($A_{P1}$) can lie on a plane that is substantially horizontal, with the first pivot axis ($A_{P1}$) being laterally offset from the longitudinal axis (L). In such embodiments, the engagement member 6100 pivots in the direction shown by arrow $A_5$ (FIG. 10) to transition from the lock position ($L_P$) to the unlock position ($U_P$) and in the direction shown by arrow $A_6$ (FIG. 11) to transition from the unlock position ($U_P$) to the lock position ($L_P$).

In some embodiments, the engagement member 6100 includes the contact face 6104 The contact face 6104 is configured to contact an outer surface of a distal portion 103 of the slide 102 or other movable component associated with the firing operation (e.g., a breechblock) on a condition that the engagement member 6100 is in the lock position ($L_P$). The contact between the contact face 6104 and the slide 102 can limit movement of the slide 102. In some embodiments, the contact face 6104 can be in contact with a portion of the slide 102 when the safety system 6000 is both in the locked configuration and in the unlocked configuration, but the engagement member 6100 limits a motion of the slide 102 only when the system is in the locked configuration. In other embodiments, a clearance may be established between the contact face 6104 and the portion of the slide 102 when the safety system 6000 is in the unlocked configuration, such as depicted in FIG. 25. Similarly stated, the contact face 6104 can be spaced apart from the slide 102 when the safety system 6000 is in the unlocked configuration, as depicted in FIG. 25. In some embodiments, the engagement member 6100 does not cross the midline ($L_M$) of the slide when the safety system 6000 is in the locked configuration. Although the contact face 6104 is shown as being a planar surface, in other embodiments, the contact face 6104 can have any suitable shape, such as tapered or curved.

As depicted in FIGS. 27-29, the safety system 6000 includes a lock mechanism 6200 operably coupled to the engagement member 6100. The lock mechanism 6200 is positioned to restrict the movement of the engagement member 6100 from the locked position ($L_P$) while the lock mechanism 6200 is in an engaged state (as depicted in FIGS. 28 and 29). In other words, the lock mechanism 6200 maintains the engagement member 6100 (and therefore the engaged slide 102) in a fixed position (e.g., the lock position ($L_P$)) relative to the frame 110. On a condition that the lock mechanism 6200 is transitioned to a disengaged state, the engagement member 6100 is released to rotate relative to the frame 110 about the first pivot axis ($A_{P1}$) from the lock position ($L_P$) toward the unlock position ($U_P$). The rotation of the engagement member 6100 with or about the first shaft 6110 can be in response to a motive force applied to the engagement member 6100. In some embodiments, the motive force can be developed by the transition of a deformable member (e.g., a spring and/or an elastomeric member) from a potential state to a released state. In some embodiments, the motive force can be developed by an electrical machine (e.g., a motor, a servo, or a piezoelectric motor). The electrical machine can be positioned to apply the motive force to the engagement member 6100 in response to the lock mechanism 6200 being transitioned to the disengaged state. In some embodiments, the motive force can be developed by the distal movement of the slide 102 in response to the force exerted on the slide 102 by the recoil spring assembly 104. In some embodiments, the engagement member 6100 is shaped such that a force vector resulting from a force (e.g., the motive force) applied to the engagement member 6100 by the distal movement of the slide 102 is non-parallel to the longitudinal axis (L) and produces a rotation of the engagement member 6100. In some embodiments, the motive force can be developed in part by the transition of a deformable member from a potential state to a released state and in part by the distal movement of the slide 102 in response to the force exerted on the slide 102 by the recoil spring assembly 104.

As depicted in FIGS. 27-29, and some embodiments, the deformable member is a spring 6210. The spring 6210 is positioned to apply the motive force to the engagement member 6100. In some embodiments, the spring 6210 can be supported by the first shaft 6110. Said another way, the spring 6210 can be coaxial with the engagement member 6100 about the first pivot axis ($A_{P1}$). The spring 6210 has a potential state on a condition that the engagement member 6100 is in the lock position ($L_P$). The spring 6210 has a released state on a condition that the engagement member 6100 is in the unlock position ($U_P$). In some embodiments, the spring 6210 is, as depicted, a torsion spring (e.g., a hammer spring). However, in other embodiments, the spring 6210 can have other suitable configurations configured to apply the motive force to the engagement member 6100.

As particularly depicted in FIGS. 27-29, in some embodiments, the lock mechanism 6200 includes a sear 6220, an electrical machine 6230, and a cam 6240. The sear 6220 is supported by a second shaft 6250 that defines a second pivot axis ($A_{P2}$). In some embodiments, the first pivot axis ($A_{P1}$) is parallel to the second pivot axis ($A_{P2}$). The sear 6220 is removably coupled to the engagement member 6100 on a condition that the engagement member 6100 is at the lock position ($L_P$) and the sear 6220 is at a restrain position, such as depicted in FIGS. 28 and 29. The sear 6220 is configured to preclude rotation of the engagement member 6100 from the lock position ($L_P$) when the sear 6220 is coupled to the engagement member 6100. The sear 6220 is movable (e.g., rotatable about the second pivot axis ($A_{P2}$)) to a release position that disengages the sear 6220 from the engagement member 6100 and permits the rotation of the engagement member 6100 from the lock position ($L_P$) to the unlock position ($U_P$). In other words, the sear 6220 is positioned to engage the engagement member 6100 when the engagement member 6100 is rotated (e.g., in response to a manual force applied to the engagement member 6100) from the unlock position ($U_P$) to the lock position ($L_P$). Therefore, in some embodiments, the sear 6220 is biased toward the restrain position by a sear spring 6224 that is positioned by a sear spring retainer 6226. Upon engaging a portion of the engagement member 6100, the sear 6220 precludes the rotation of the engagement member 6100 in response to the motive force applied by the spring 6210 so long as the sear 6220 is maintained at the restrain position, such as in response to a force applied to the sear 6220 by the sear spring 6210.

In some embodiments, the sear 6220 is a lever and includes a restraining structure (not shown) (e.g., restraining structure 3222). The restraining structure can, for example, be a protrusion, a tooth, a ledge, and/or other similar structure positioned to engage a mating structure (e.g. mating structure 3101) of the engagement member 6100. The mating structure can, for example, define a recess, or be a protrusion, a tooth, a ledge, and/or other similar structure positioned to engage the restraining structure when the engagement member 6100 is rotated to the lock position ($L_P$). For example, in some embodiments, a manual force can be applied by an operator of the handgun to the engagement member 6100 on a condition that the safety system 6000 is in an unlocked condition. The manual force can cause the engagement member 6100 to rotate about the first pivot axis ($A_{P1}$) toward the lock position ($L_P$). This rotation causes the mating structure to approach the restraining structure of the sear 6220, which is biased toward the restrain position by the sear spring 6224. Upon the engagement member 6100 achieving the lock position ($L_P$) the restraining structure engages the mating structure thereby removably coupling the sear 6220 to the engagement member 6100 and preventing a counter rotation of the engagement member 6100 in the direction of the unlock position ($U_P$).

In some embodiments, the cam 6240 is operably coupled to the electrical machine 6230. The electrical machine 6230 of the lock mechanism 6200 is operably coupled to the user interface 6300 and can be powered by an energy storage device 6232 (e.g., a battery). The electrical machine 6230 is configured to generate a rotational force that rotates the cam 6240. The rotational force transitions the lock mechanism 6200 from the engaged state to the disengaged state. Specifically, the cam 6240 is positioned to move the sear 6220 from the restrain position to the release position in response to the rotational force of the electrical machine 6230. In other words, as the cam 6240 rotates in response to the actuation of the electrical machine 6230, a portion of the cam 6240 is brought into contact with a portion of the sear 6220. A force applied by the cam 6240 on the sear 6220 is greater than a force applied on the sear 6220 by the sear spring 6224. Insofar as the sear 6220 is a lever, the contact between the cam 6240 and the sear 6220 causes the sear 6220 to pivot about a fulcrum (e.g., the second pivot axis ($A_{P2}$) toward the release position. The motion of the sear 6220 in response to the cam 6240 disengages the restraining structure from the mating structure. The disengagement of the restraining structure from the mating structure, permits the rotation of the engagement member 6100 from the lock position ($L_P$) to the unlock position ($U_P$).

In some embodiments, the safety system 6000 includes the user interface 6300, which is operably coupled to the lock mechanism 6200. The user interface 6300 is configured to transition the lock mechanism 6200 between an engaged state and a disengaged state. In other words, the user interface 6300 is employed by an authorized user to facilitate the movement of the engagement member 6100 between the lock position ($L_P$) and the unlock position ($U_P$) by locking or unlocking the lock mechanism 6200. Once unlocked, the safety system 6000 remains unlocked until the lock mechanism 6200 is affirmatively reengaged by an operator.

The user interface 6300 can include a biometric user identification (e.g., fingerprint identification) unit, a radio frequency identification reader, a numerical input apparatus, a microphone, a magnetic key, a mechanical key, and/or other input system configured to authenticate an authorized user. For example, in some embodiments, the user interface 6300 includes a fingerprint sensor 6310 operably coupled to a biometric processor 6320, a data storage device containing stored identification data for authorized users, and the energy storage device 6232. The fingerprint sensor may be an optical sensor, a thermal sensor, and/or a pressure sensor and may be configured as a static sensor or a swipe sensor. The user interface 6300 also be operably coupled to an energy storage device 6232. Additionally, in some embodiments the user interface 6300 includes a wireless communication unit that facilitates the remote operation of the safety system 6000 via a wireless network, a cellular network, and/or a Bluetooth connection.

In some embodiments, the user interface 6300 can include a program button 6340 that is occluded by the frame 110 on a condition that the safety system 6000 is coupled to the handgun 100. Actuating the program button 6340 can place the user interface 6300 in a record state during which the biometric parameters of a user can be stored via the data storage device. The occlusion of the program button 6340 while the safety system 6000 is coupled to the handgun 100 can preclude placing the user interface 6300 in the record state until the safety system 6000 is decoupled from the handgun 100. Accordingly, the positioning of the program button 6340 can preclude an unauthorized user from transitioning the lock mechanism 6200 to the disengaged state via the user interface 6300.

In some embodiments, the safety system 6000 includes a housing 6500. The housing 6500 provides the structure for support and mounting of the safety system 6000 to the handgun 100. The housing 6500 is formed from materials having sufficient strength to prevent access to internal components of the safety system 6000. For example, in various embodiments, the housing 6500 is formed from a metal, a reinforced plastic, and/or composite. In some embodiments, the housing 6500 is the unitary structure defining at least one internal cavity. In other embodiments, the housing 6500 is formed by the coupling of multiple housing members that are separately formed. For example, the housing 6500 may be formed at least from a first housing portion 6502 and a second housing portion 6504.

As depicted in FIGS. 27 and 28, in some embodiments, a support bracket 6508 can be positioned within the housing 6500. The support bracket 6508 can include a plurality of recesses sized to receive the first shaft 6110 and the second shaft 6250. Accordingly, the support bracket 6508 can be a bearing surface that facilitates the rotation of the first shaft 6110 and/or the second shaft 6250. In various embodiments, the support bracket is formed from a metal, a reinforced plastic, and/or composite. In some embodiments, the support bracket 6508 can be coupled to the first housing portion 6502 via a plurality of fasteners positioned within the housing 6500.

In some embodiments, the housing 6500 supports the user interface 6300. For example, the housing 6500 may define an external recess 6540 in which the user interface 6300 may be secured. The housing 6500 also includes a coupling portion 6510. The coupling portion 6510 is configured to receive a portion of the handgun 100, such as the mounting structure 116. In other words, the housing 6500, and thus the safety system 6000, may be fixedly coupled to the handgun 100 via an interface between the coupling portion 6510 and the mounting structure 116. Although shown as being against or engaged with the trigger guard 114, in other embodiments, the housing 6500 may, for example, be coupled to the handgun 100 and a position that is forward of the trigger guard 114. For example, the housing 6500 can be similar to the housing 1500 shown in FIGS. 6 and 4 and can establish a spacing between the housing 6500 and the trigger guard 114.

In some embodiments, safety system 6000 includes at least one fastener 6512. The fastener(s) 6512 is positioned adjacent the coupling portion 6510. For example, the fastener(s) 6512 may be inserted into a threaded passage defined by the first housing portion 6502 or a mount bracket, which can be formed from a resilient material (e.g. hardcoat anodized aluminum). The fastener(s) 6512 is positioned to secure the mounting structure 116 of the handgun 100 within the coupling portion 6510. In some embodiments, the fastener(s) 6512 can be a proprietary security screw that requires the use of a proprietary tool 6513 (FIG. 30) (e.g. an extractor) to loosen the fastener(s) 6512.

In some embodiments, the housing 6500 also defines a lock cavity 6520 supporting at least a portion of the lock mechanism 6200. The lock cavity 6520 may, for example, be defined by an inner face 6506 of the housing 6500. Additionally, the housing 6500 defines an interface orifice 6530. The interface orifice 6530 is oriented to facilitate the operable coupling of the engagement member 6100 to the lock mechanism 6200. The interface orifice 6530 may, for example, correspond to a slot or hole through which a portion of the engagement member 6100 may be inserted. The interface orifice 6530 is sized to facilitate a desired degree of travel of the engagement member 6100.

Figure 19:
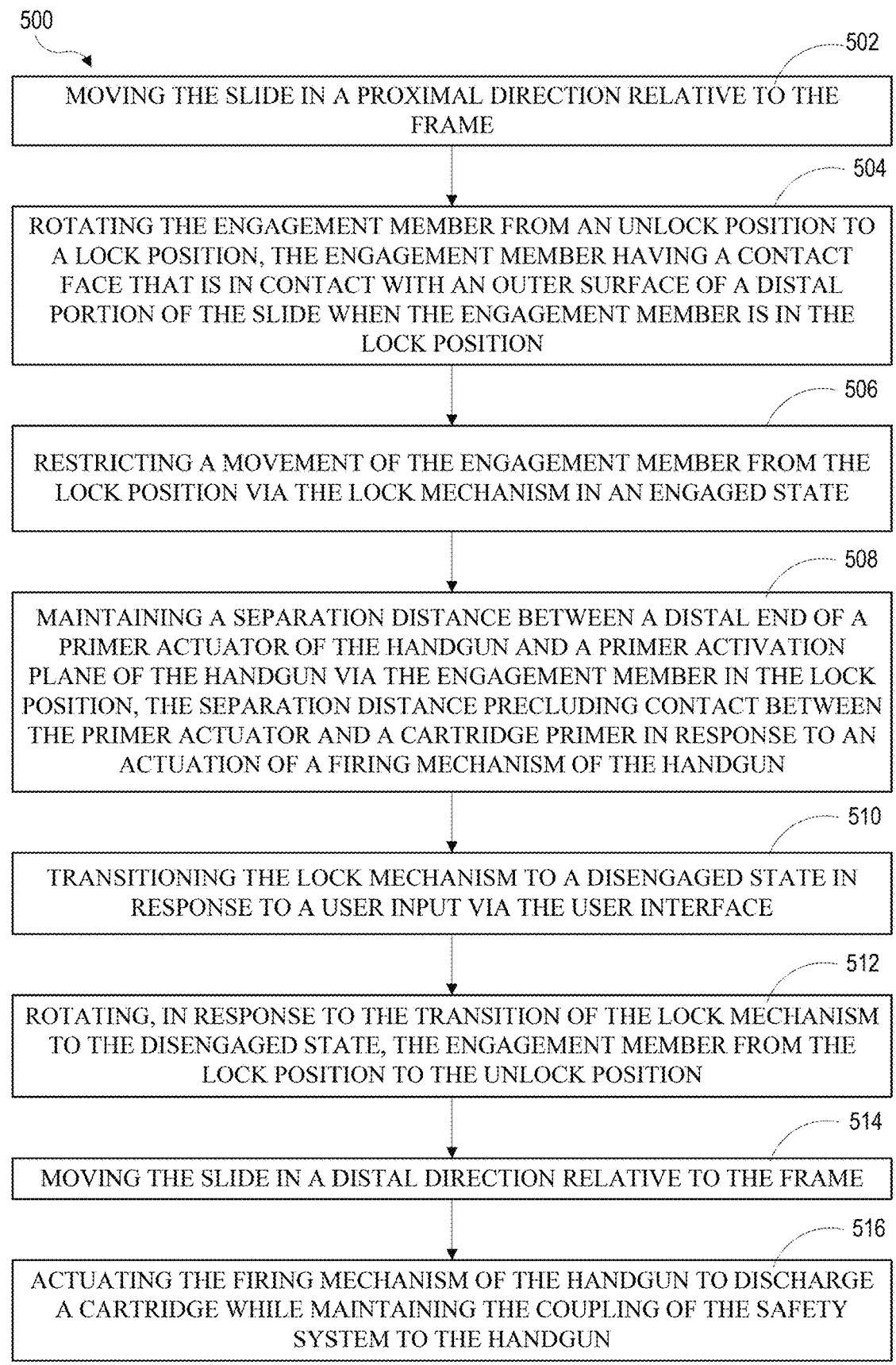
FIG. 19 is a flow chart of a method of operating a handgun with a safety system, according to an embodiment.

FIG. 19 is a flow chart of a method 500 for operating a handgun with a safety system according to an embodiment. The method 500 may, in an embodiment, be performed via a safety system, such as safety system 1000, safety system 2000, and safety system 3000 as described with reference to FIGS. 3-18. Accordingly, the method 500 may be implemented on any suitable device as described herein. Those of ordinary skill in the art, using the disclosures provided herein, will understand that various steps of the method 500 or any of the other methods disclosed herein may be adapted, modified, rearranged, performed simultaneously, or modified in various ways without deviating from the scope of the present disclosure.

As shown at (502), the method 500 includes moving the slide of the handgun in a proximal direction relative to the frame. As shown at (504), the method 500 includes rotating the engagement member of the safety system from an unlock position to a lock position. In some embodiments, the rotation of the engagement member can result from a manual force applied to the engagement member by an operator of the handgun. As shown at (506), the method 500 includes restricting a movement of the engagement member from the lock position via the lock mechanism in an engaged state. As shown at (508), the method 500 includes maintaining a separation distance between a distal end of a primer actuator of the handgun and a primer activation plane of the handgun via the engagement member in the lock position. The separation distance precludes contact between the primer actuator and a cartridge primer in response to an actuation of a firing mechanism of the handgun. As shown at (510), the method 500 includes transitioning the lock mechanism to a disengaged state in response to a user input via the user interface. In response to the transition of the lock mechanism to the disengaged state, as shown at (512), the method 500 includes rotating the engagement member from the lock position to the unlock position. As shown at (514), the method 500 includes moving the slide in a distal direction relative to the frame. Additionally, as shown at (516), the method 500 includes actuating the firing mechanism of the handgun to discharge a cartridge while maintaining the coupling of the safety system to the handgun.

In some embodiments, the method 500 includes rotating the engagement member from the lock position to the unlock position includes rotating the engagement member about a pivot axis that is parallel to the longitudinal axis in response to a motive force applied to the engagement member by a spring.

In some embodiments, the method 500 includes rotating the engagement member from the lock position to the unlock position includes rotating the engagement member about a pivot axis that is perpendicular to the longitudinal axis in response to a motive force applied to the engagement member by a distal movement of the slide of the handgun.

After rotating the engagement member from the unlock position to the lock position, in some embodiments, the method 500 includes actuating a slide release of the handgun to bring the distal portion of the slide into contact with the contact face of the engagement member in the lock position.

In some embodiments, the method 500 includes maintaining the coupling of the engagement member to the handgun when the engagement member is in the lock position, the unlock position, and during a transition between the lock position and the unlock position.

Figure 20:
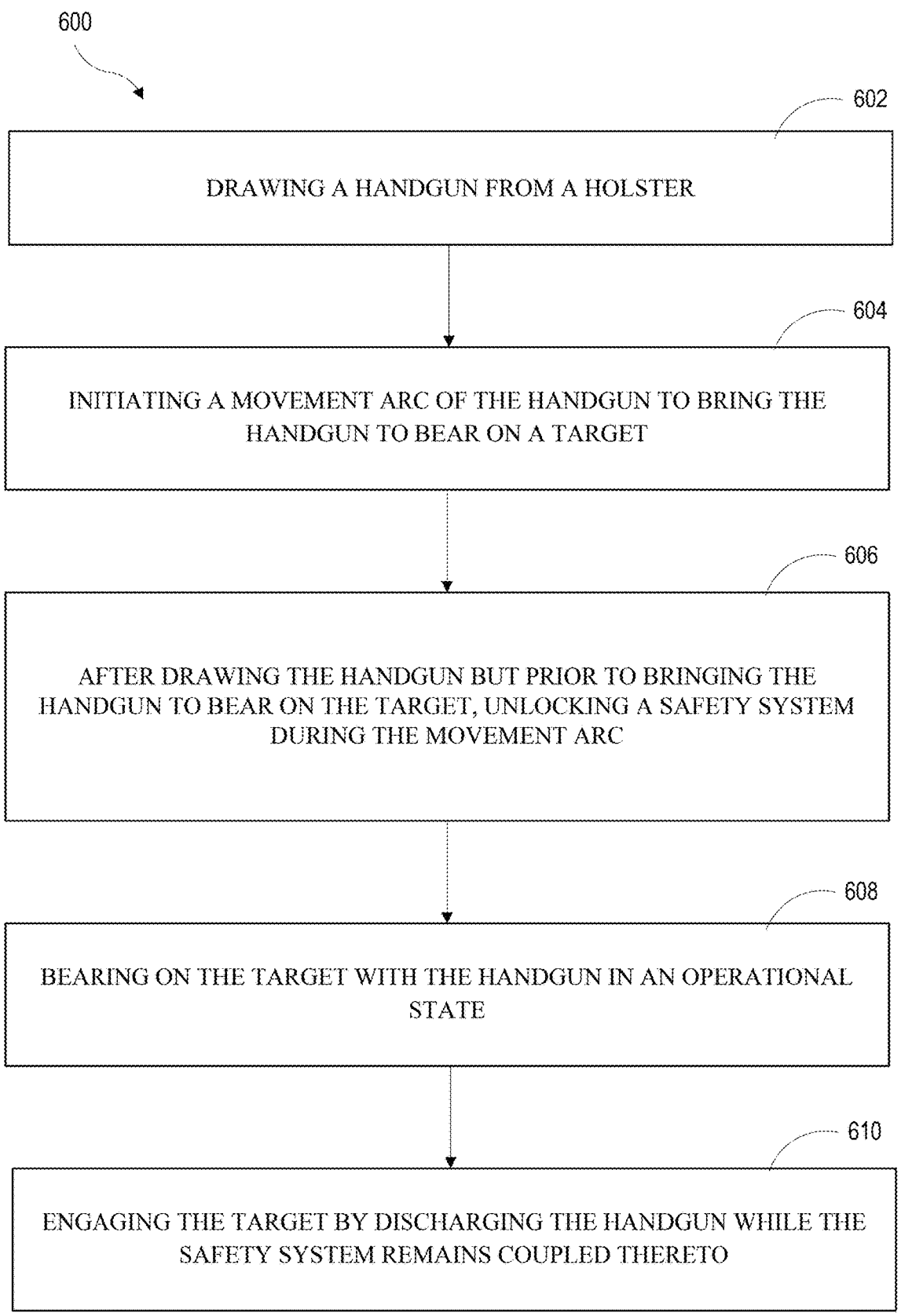
FIG. 20 is a flow chart of a method engaging a target via a handgun equipped with a safety system, according to an embodiment.

FIG. 20 is a flow chart of a method 600 for engaging a target via a handgun equipped with a safety system according to an embodiment. The method 600 may, in an embodiment, be performed via a safety system, such as safety system 1000, safety system 2000, safety system 3000, and safety system 3000 as described with reference to FIGS. 3-18. However, it should be appreciated that in various embodiments, aspects of the method 600 may be accomplished via additional embodiments of the safety system or components thereof, such as engagement member 6100 as described herein. Accordingly, the method 600 may be implemented on any suitable device as described herein. Those of ordinary skill in the art, using the disclosures provided herein, will understand that various steps of the method 500 or any of the other methods disclosed herein may be adapted, modified, rearranged, performed simultaneously, or modified in various ways without deviating from the scope of the present disclosure.

As shown at (602), the method 600 includes drawing a handgun from a holster. As shown at (604), the method 600 includes initiating a movement arc of the handgun to bring the handgun to bear on a target. After drawing the handgun but prior to bringing the handgun to bear on the target, the method 600 includes, as shown at (606), unlocking a safety system during the movement arc. The safety system being coupled to the handgun. As shown at (608), the method 600 includes bearing on the target with the handgun in an operational state. As shown at (610), the method includes engaging the target by discharging the handgun while the safety system remains coupled thereto. In other words, by unlocking the safety system during the movement arc the handgun is transitioned from a nonoperational state at the moment it is drawn from the holster to an operational state when it is brought to bear on the target. It should be appreciated that unlocking the safety system during the movement arc facilitates a more rapid target acquisition than may otherwise be possible with systems that require the unlocking of a holster, the removal of a locking apparatus, and/or the cycling of the handgun following the unlocking of the locking apparatus.

While various embodiments have been described above, it should be understood that they have been presented by way of example only, and not limitation. Where methods and/or schematics described above indicate certain events and/or flow patterns occurring in certain order, the ordering of certain events and/or operations may be modified. While the embodiments have been particularly shown and described, it will be understood that various changes in form and details may be made. For example, although the safety system 3000 is shown and described as including an electric motor to produce a motive force against the engagement member, in other embodiments, the safety system 3000 (and any of the safety systems described herein) can be devoid of a motive assembly. For example, in some embodiments the safety system 3000 can be manually manipulated by the user to move the engagement member.

As another example, although the although the safety system 3000 is shown and described as including a housing that is coupled to the handgun, in other embodiments, the safety system 3000 (and any of the safety systems described herein) can include a housing that is integrally formed with the frame of the handgun.

As another example, although the method 500 and the method 600 are described as being methods of operating a handgun, in other embodiments, any of the methods described herein can be applicable to any firearm having a movable component associated with the firing operation. For example, any of the methods described herein (e.g., method 500 and the method 600) can be applicable to a firearm that has a breechblock (e.g., a pump-action shotgun, a semi-automatic shotgun, a bolt-action rifle, an automatic/semi-automatic rifle, such as an AR-style carbine, and/or other suitable firearm).

Although various embodiments have been described as having particular features and/or combinations of components, other embodiments are possible having a combination of any features and/or components from any of embodiments as discussed above.

What is claimed is:

1. A safety system for a firearm having a longitudinal axis, the firearm having a breechblock movably coupled to a frame, the safety system comprising:
an engagement member movably coupled to the frame, the engagement member being rotatable between an unlock position and a lock position while remaining movably coupled to the frame, the engagement member having a contact face that is in contact with an outer surface of a distal portion of the breechblock in the lock position, a distal end of a primer actuator of the firearm being maintained spaced apart from a primer activation plane of the firearm by a separation distance in response to the engagement member being in the lock position;
a lock mechanism operably coupled to the engagement member and positioned to restrict a movement of the engagement member from the lock position while the lock mechanism is in an engaged state; and
a user interface operably coupled to the lock mechanism and configured to transition the lock mechanism between the engaged state and a disengaged state.

2. The safety system of claim 1, wherein:
the lock mechanism is positioned within a housing of the safety system; and
the user interface is coupled to a portion of the firearm at a distance from the housing.

3. The safety system of claim 1, wherein:
the engagement member is rotatable about a pivot axis that is parallel to the longitudinal axis;
the contact face is at a first lateral location in response to the engagement member being in the lock position and a second lateral location in response to the engagement member being in the unlock position; and
the second lateral location is displaced from the longitudinal axis a greater distance than the first lateral location.

4. The safety system of claim 3, wherein:
the first lateral location of the contact face is laterally offset from the longitudinal axis when the engagement member is in the lock position.

5. The safety system of claim 1, wherein:
the engagement member is rotatable about a pivot axis that is perpendicular to the longitudinal axis;
the pivot axis is laterally displaced from the longitudinal axis;
the contact face is on a plane that is orthogonal to the longitudinal axis on a condition that the engagement member is in the lock position; and
the contact face is configured to traverse an arc of at least 90 degrees on a condition that the engagement member is rotated to the unlock position.

6. The safety system of claim 1, wherein:
the engagement member is rotatable about a pivot axis that is perpendicular to the longitudinal axis;
the pivot axis is vertically displaced from the longitudinal axis;
the contact face is at a first longitudinal location when the engagement member is in the lock position and a second longitudinal location when the engagement member is in the unlock position; and
the second longitudinal location is distal to the first longitudinal location.

7. The safety system of claim 1, wherein:
the engagement member is configured to rotate from the lock position to the unlock position in response to a motive force applied to the engagement member.

8. The safety system of claim 7, further comprising:
a spring positioned to apply the motive force to the engagement member, the spring having a potential state on a condition that the engagement member is in the lock position and a released state on a condition that the engagement member is in the unlock position.

9. The safety system of claim 7, further comprising:
an electrical machine positioned to apply the motive force to the engagement member in response to the lock mechanism being transitioned to the disengaged state.

10. The safety system of claim 7, wherein:
the engagement member is shaped such that a force vector resulting from the motive force is non-parallel to the longitudinal axis and produces the rotation of the engagement member.

11. The safety system of claim 1, wherein the lock mechanism further comprises:
a sear removably coupled to the engagement member on a condition that the engagement member is at the lock position and the sear is at a restrain position, the sear configured to preclude the rotation of the engagement member from the lock position when the sear is coupled to the engagement member, the sear being movable to a release position that permits the rotation of the engagement member from the lock position to the unlock position;
an electrical machine operably coupled to the user interface, the electrical machine being configured to generate a rotational force to transition the lock mechanism from the engaged state to the disengaged state; and
a cam operably coupled to the electrical machine, the cam being positioned to move the sear from the restrain position to the release position in response to the rotational force of the electrical machine.

12. The safety system of claim 1, further comprising:
a housing supporting the user interface, the housing including:
a coupling portion oriented to receive a mounting structure of the firearm,
a lock cavity defined by an inner face of the housing, the lock cavity containing at least a portion of the lock mechanism, and
an interface orifice oriented to facilitate the operable coupling of the engagement member to the lock mechanism.

13. The safety system of claim 12, further comprising:
a fastener positioned adjacent the coupling portion and oriented to secure the mounting structure of the firearm within the coupling portion, the fastener being at least partially occluded by the engagement member when in the lock position thereby precluding a loosening of the fastener.

14. The safety system of claim 1, wherein:
the user interface includes at least one of a fingerprint reader, a radio frequency identification reader, a numerical input apparatus, a microphone, a magnetic key, or a mechanical key.

\* \* \* \* \*